(12) United States Patent
Biswas et al.

(10) Patent No.: US 10,447,410 B2
(45) Date of Patent: Oct. 15, 2019

(54) ULTRASONIC COMMUNICATION SYSTEM

(71) Applicant: Board of Trustees of Michigan State University, East Lansing, MI (US)

(72) Inventors: Subir Biswas, Okemos, MI (US); Stephan Lorenz, Lake Orion, MI (US); Bo Dong, Sunnyvale, CA (US); Qiong Huo, Sunnyvale, CA (US)

(73) Assignee: Board of Trustees of Michigan State University, East Lansing, MI (US)

( * ) Notice: Subject to any disclaimer, the term of this patent is extended or adjusted under 35 U.S.C. 154(b) by 325 days.

(21) Appl. No.: 15/039,243

(22) PCT Filed: Nov. 26, 2014

(86) PCT No.: PCT/US2014/067609
§ 371 (c)(1),
(2) Date: May 25, 2016

(87) PCT Pub. No.: WO2015/084669
PCT Pub. Date: Jun. 11, 2015

(65) Prior Publication Data
US 2017/0126332 A1 May 4, 2017

Related U.S. Application Data

(60) Provisional application No. 61/910,952, filed on Dec. 2, 2013.

(51) Int. Cl.
H04B 11/00 (2006.01)
H04W 4/38 (2018.01)
(Continued)

(52) U.S. Cl.
CPC ............ *H04B 11/00* (2013.01); *H04L 7/0037* (2013.01); *H04L 7/02* (2013.01); *H04W 4/38* (2018.02);
(Continued)

(58) Field of Classification Search
USPC .......................................................... 367/117
See application file for complete search history.

(56) References Cited

U.S. PATENT DOCUMENTS 5,154,081 A  10/1992  Thompson et al.
5,675,554 A  10/1997  Cole et al.
(Continued)

OTHER PUBLICATIONS

International Search Report and Written Opinion of Application PCT/US2014/067609, dated Apr. 13, 2015, 15 pages.
(Continued)

*Primary Examiner* — James R Hulka
(74) *Attorney, Agent, or Firm* — Harness, Dickey & Pierce, PLC

(57) ABSTRACT

A sensor network includes a sink and multiple sensor nodes. The sink is coupled to a substrate and configured to transmit a periodic ultrasonic pulse on the substrate. A first one of the sensor nodes is coupled to the substrate. The first sensor node is configured to (i) receive the periodic ultrasonic pulse from the substrate, (ii) synchronize an internal clock of the first sensor node to the sink based on the periodic ultrasonic pulse, (iii) selectively detect an event in a region surrounding the first sensor node, and (iv) in response to detecting the event, transmit a first ultrasonic pulse toward the sink on the substrate.

19 Claims, 39 Drawing Sheets

(51) Int. Cl.
| | |
|---|---|
| H04W 4/70 | (2018.01) |
| H04L 7/00 | (2006.01) |
| H04L 7/02 | (2006.01) |
| H04W 56/00 | (2009.01) |
| G08B 25/00 | (2006.01) |

(52) U.S. Cl.
CPC ......... *H04W 4/70* (2018.02); *H04W 56/0015* (2013.01); *G08B 25/009* (2013.01)

(56) References Cited

U.S. PATENT DOCUMENTS

| | | | | |
|---|---|---|---|---|
| 6,127,942 | A * | 10/2000 | Welle | H02J 17/00 340/870.16 |
| 7,037,270 | B2 | 5/2006 | Seward | |
| 7,354,400 | B2 | 4/2008 | Asafusa et al. | |
| 8,499,632 | B1 | 8/2013 | Ihn et al. | |
| 8,873,335 | B1 * | 10/2014 | Ray | G01V 1/223 367/77 |
| 9,397,759 | B2 * | 7/2016 | Coonrod | E21B 33/0355 |
| 9,505,031 | B2 * | 11/2016 | Wilt | B06B 1/06 |
| 9,559,788 | B2 * | 1/2017 | Kovach | H04B 11/00 |
| 2003/0189488 | A1 | 10/2003 | Forcier et al. | |
| 2004/0100394 | A1 | 5/2004 | Hitt | |
| 2004/0212504 | A1 | 10/2004 | Forcier et al. | |
| 2005/0134574 | A1 | 6/2005 | Hill | |
| 2006/0178156 | A1 | 8/2006 | Kim | |
| 2007/0167133 | A1 * | 7/2007 | Tomlinson, Jr. | G01N 29/07 455/39 |
| 2008/0048605 | A1 | 2/2008 | Franke | |
| 2008/0048905 | A1 | 2/2008 | McEwan | |
| 2009/0059842 | A1 * | 3/2009 | Maltseff | H04W 8/005 370/328 |
| 2010/0027379 | A1 | 2/2010 | Saulnier et al. | |
| 2010/0328075 | A1 | 12/2010 | Rahamim et al. | |
| 2011/0268139 | A1 | 11/2011 | Caracas et al. | |
| 2011/0285516 | A1 | 11/2011 | Ritter | |
| 2012/0275274 | A1 * | 11/2012 | Gochnour | H04B 11/00 367/134 |
| 2012/0300586 | A1 * | 11/2012 | Ray | G01V 1/223 367/77 |
| 2013/0148472 | A1 * | 6/2013 | Kovach | H04B 11/00 367/138 |
| 2013/0223190 | A1 * | 8/2013 | Coonrod | E21B 33/0355 367/133 |
| 2014/0043944 | A1 * | 2/2014 | Wilt | G10K 9/122 367/180 |
| 2014/0098641 | A1 * | 4/2014 | Ray | G01V 1/223 367/77 |

OTHER PUBLICATIONS

J. Rao, et al., "Network Assisted Sink Navigation for Distributed Data Gathering: Stability and Delay-Energy Tradeoffs", ECCJ. Feb. 1, 2010, 16 pages.
J. Rao, et al., "Stability Analysis of Multi-hop Routing in Sensor Networks with Mobile Sinks", ICDCN, Jan. 3-6, 2010.
Zheng Yuanjin, et al., "A New Synchronization Algorithm for UWB Impulse Radio Communication Systems", IEEE, 2004, 5 pages.
Jain, et al., "Benefits of Packet Aggregation in Ad-Hoc Wireless Network", Department of Computer Science, Aug. 1, 2003, 25 pages.
Zijian Wang, et al., "A Distributed Target Tracking with Binary Sensor Networks", IEEE, 2008, 5 pages.
C. Fragouli, et al., "Silence is Golden and Time is Money: Power-aware Communication for Sensor Networks", 2005, 10 pages.
Eunsung Oh, et al., "Toward Dynamic Energy-Efficient Operation of Cellular Network Infrastructure", 2011, 6 pages.
S. Haykin, et al., "Modern Wireless Communications", 2004, 289 pages.
M.Z. Win, et al., "Impulse Radio: How it Works", IEEE, Feb. 1998, 3 pages.
Van Poucke, et al., "Ultra-Wideband Communication for Low-power Wireless Body Area Networks", 2005, 4 pages.
"IEEE 802.15 Working Group for Wireless Personal Area Networks (WPANs) DS-UWB Physical Layer Submission to 802.15 task group", Sep. 2005, 47 pages.
M. Ghavami, et al., "Ultra Wideband Signals and Systems in Communication Engineering", John Wiley and Sons, 2004, 278 pages.
Yu. Andreyev, et al., "Qualitative Theory of Dynamical Systems, Chaos and Contemporary Wireless Communications", Nov. 2005, 14 pages.
C.R. Farrar, et al., "Sensing Network Paradigms for Structural Health Monitoring", Journal of Structural Control and Health Monitoring, 2011, 21 pages.
E. Minazara, et al., "Piezoelectric diaphragm for Vibration Energy Harvesting", Ultrasonics, Jun. 9, 2006, 5 pages.
H. Nikookar, et al., "Introduction to Ultra Wideband for Wireless Communications", Springer, 2009.
T. Ikegami, et al., "Interference Mitigation Study for UWB Radio", IEEE 2003, 5 pages.
M. Flury, et al., "Interference Mitigation by Statistical Interference Modeling in an Impulse Radio UWB Receiver", IEEE, Jun. 1, 2011, 7 pages.
A. Nosratinia, et al., "Cooperative Communication in Wireless Networks", IEEE Comm, Magazine, Oct. 2004, 7 pages.
Z. Chen, et al., "Self-Organization and Energy-Efficient TDMA MAC Protocol by Wake up for Wireless Sensor Networks", IEEE, 2004, 7 pages.
Ian F. Akyildiz, et al., "Wireless Sensor and Actor Networks: Research Challenges", May 19, 2004, 23 pages.
Munir, et al., "Low-Energy, Adaptive, and Distributed MAC Protocol for Wireless Sensor-Actuator Networks", IEEE, 2007, 5 pages.
Boukerche, et al., "A Novel QoS Based Routing Protocol for Wireless Actor and Sensor Networks", IEEE Globecom, Nov. 1, 2007, 4 pages.
David W. Allen, et al., "The Science of Timekeeping", Hewett Packard, Jun. 1997, 88 pages.
Peter H. Dana, et al., "The Role of GPS in Precise Time and Frequency Dissemination", GPSworld, Jul./Aug. 1990, 6 pages.
Q. Huo, et al., "Pulse Switching: Toward a Packet-less Protocol Paradigm for Event Sensing", IEEE Transactions on Mobile Computing, Oct. 20, 2011, 16 pages.
Q. Huo, et al., "A Cellular Pulse Switching Paradigm for Ultra Low Power Sensor Networks", 2013, 24 pages.
Qiong Huo, et al., "Cellular Pulse Switching: An Architecture for Event Sensing and Localization in Sensor Networks", ICDCN, 2013, 17 pages.
Qiong Huo, et al., "A Cellular Pulse Switching Architecture for Binary Event Sensing", IEEE Globecom, Dec. 3, 2012, 6 pages.
Qiong Huo, et al., "A Novel Concept of UWB Pulse Switching in Sensor Networks", ICWMC, Jun. 24, 2012, 4 pages.
Q. Huo, et al., "Pulse Switching for Static Event Sensing in Sensor Networks", IEEE Globecom, Dec. 1, 2011, 6 pages.
Q. Huo, et al., "Ultra Wide Band Impulse Switching Protocols for Event and Target Tracking Applications", IEEE SECON, 2011, 9 pages.
Qiong Huo, et al., "Self-Organized Pulse Switching for Binary Sensing and Actuation", SPIE, May 1, 2013, 8 pages.
S. Lorenz, et al., "Pulse Based Sensor Networking Using Mechanical Waves Through Metal Substrates", SPIE, May 28, 2013, 8 pages.
Qiong Huo, et al., "Pulse Switching: A Packet-less Networking Paradigm for Energy-constrained Monitoring Applications", CRC Press, Sep. 1, 2013, 41 pages.
J. Rao, et al., "Analyzing Multi-hop Routing Feasibility for Sensor Data Harvesting Using Mobile Sinks", JPDC, Mar. 1, 2011, 14 pages.
G.J. Saulnier, et al., "P1G-4 Through-Wall Communication of Low-Rate Digital Data Using Ultrasound", IEEE, 2006, 5 pages.

(56) References Cited

OTHER PUBLICATIONS

X. Zhao, et al., "Active Health Monitoring of an Aircraft Wing with Embedded Piezoelectric Sensor/Actuator Network: I. Defect Detection, Localization and Growth Monitoring", Smart Matter Structure, Jun. 29, 2007, 11 pages.

V. Giurgiutiu, et al., "Damage Identification in Aging Aircraft Structures with Piezoelectric Wafer Active Sensors", Journal of Intelligent Material Systems and Structures, Sep./Oct. 2004, 16 pages.

V. Giurgiutiu, "Lamb-wave Generation with Piezoelectric Wafer Active Sensors for Structural Health Monitoring", Smart Structures and Materials, 2003, 12 pages.

Zhang, et al., "Lamb Wave Propagation Modeling for Structure Health Monitoring" Front. Mech. Eng., Sep. 1, 2009, 6 pages.

Zhu, et al., "Low-Power Distributed Event Detection in Wireless Sensor Networks", Proc. IEEE Infocom, 2007, 5 pages.

J. Gummeson, et al., "On the Limits of Effective Hybrid Micro-Energy Harvesting on Mobile CRFID Sensors", Proc. ACM MobiSys, Jun. 15-18, 2010, 14 pages.

Zhu, et al., "Challenges: Communication Through Silence in Wireless Sensor Networks", Proc. ACM MobiCom, Aug. 28-Sep. 2, 2005, 8 pages.

J. Peng, et al., "A Wireless MAC Protocol with Collision Detection", IEEE Trans. Mobile Computing, Dec. 2007, 13 pages.

T. Van Dam, et al., "An Adaptive Energy Efficient MAC Protocol for Wireless Sensor Networks", SenSys, Nov. 5-7, 2003, 10 pages.

J. Polastre, et al., "Versatile Low Power MAC for Wireless Sensor Networks", SenSys, Nov. 3-5, 2004, 13 pages.

G. Halkes, et al., "Comparing Energy-Saving MAC Protocols for Wireless Sensor Networks", ACM Mobile Networks and Applications, 2005, 9 pages.

G. Lu, et al., "Minimum Latency Scheduling and Routing in Sensor Networks", Ad Hoc Networks, Mar. 9, 2007, 12 pages.

L. Feeney, et al., "Investigating the Energy Consumption in an Ad Hoc Networking Environment", Proc. IEEE Infocom, 2001, 10 pages.

S.T. Abrah, et al., "Experimental Demonstration of 2 Gbps IR-UWB Transmission over 100m GI-POF using Novel Pulse Generation Technique", ECOC, Sep. 19-23, 2010, 3 pages.

B. Karp, et al., "GPSR: Greedy Perimeter Stateless Routing for Wireless Networks", Proc. ACM MobiCom, 2000.

A. Sawides, et al., "The Bits and Flops of the N-Hop Multilateration Primitive for Node Localization Problems", WSNA '02, Sep. 28, 2002, 10 pages.

J. Polastre, et al., "Telos: Enabling Ultra-Low Power Wireless Research", IEEE, Proc. Fourth Int'l Symp. Information Processing in Sensor Networks, 2005, 6 pages.

Zeinalpour-Yazdi, et al., "Bit Error Probability Analysis of UWB Communications with a Relay Node", IEEE Trans. Wireless Comm., Feb. 2010, 12 pages.

F.S. Lee, et al., "A 2.5nJ/b 0.65V 3-to-5GHz Subbanded UWB Receiver in 90nm CMOS", Proc. IEEE Int'l Conf. Solid-State Circuits, 2007, 3 pages.

W.R. Heinzelman, et al., "Energy-efficient communication protocol for wireless microsensor networks", 2000, 10 pages.

Jin Wang, et al., "Analysis of Energy Consumption in Direct Transmission and Multi-hop Transmission for Wireless Sensor Networks", IEEE, 2007, 6 pages.

Amre El-Hoiydi, et al., "Low power downlink MAC protocols for infrastructure wireless sensor networks", ACM Mobile Networks and Applications, 2005, 16 pages.

Yanmin Zhu, et al., "Low-Power distributed event detection in wireless sensor networks", IEEE, 2007, 5 pages.

Winex Corporation Inc., "Research kit for ultra-wideband sensor networks", http://www.winex-instrument.com/reskit.php, 2013, 3 pages.

Wei Ye, et al., "An energy-efficient MAC protocol for wireless sensor networks", Infocom, 2002, 10 pages.

Biswas, et al., Pulse Switching for Point-to-Point Binary Sensing and Actuation Applications, 2013, 14 pages.

Qiong Huo, "Pulse Switching: An Ultra-Light Network Paradigm Without Packet Abstraction ("Mandy's Thesis")", MSU PhD Dissertation, 2013, 216 pages.

S. Lorenz, et al., "Pulse based sensor networking using mechanical waves through metal substrates", May 28, 2013, 8 pages.

* cited by examiner

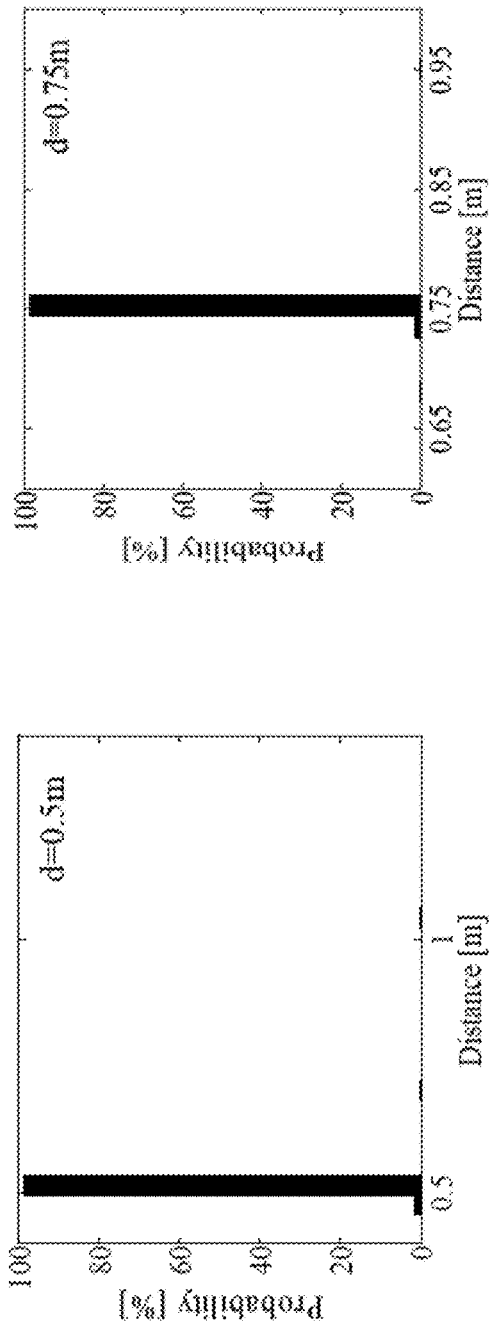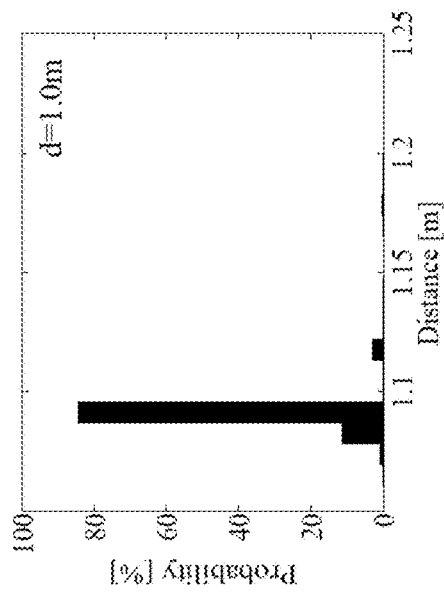
FIG. 13A
FIG. 13B
FIG. 13C

| Node | Neighbors | Reception Times |
|---|---|---|
| S | 2<br>3 | $T_1$<br>$T_1$ |
| Node 1 | 2 | $T_1$ |
| Node 2 | S<br>3 | $T_0$<br>$T_1$ |
| Node 3 | S<br>2 | $T_0$<br>$T_1$ |
| Node 4 | 3 | $T_1$ |
| Node 5 | - | - |

| Node | Neighbors | Reception Times |
|---|---|---|
| S | 2<br>3 | $T_1$<br>$T_1$ |
| Node 1 | 2 | $T_1$ |
| Node 2 | S<br>3<br>1 | $T_0$<br>$T_1$<br>$T_2$ |
| Node 3 | S<br>2<br>4 | $T_0$<br>$T_1$<br>$T_2$ |
| Node 4 | 3 | $T_1$ |
| Node 5 | 4 | $T_2$ |

| Node | Neighbors | Reception Times |
|---|---|---|
| S | 2<br>3 | $T_1$<br>$T_1$ |
| Node 1 | 2 | $T_1$ |
| Node 2 | S<br>3<br>1 | $T_0$<br>$T_1$<br>$T_2$ |
| Node 3 | S<br>2<br>4 | $T_0$<br>$T_1$<br>$T_2$ |
| Node 4 | 3<br>5 | $T_1$<br>$T_3$ |
| Node 5 | 4 | $T_2$ |

ULTRASONIC COMMUNICATION SYSTEM

GOVERNMENT RIGHTS

This invention was made with government support under Contract No. CNS-0915851 awarded by the National Science Foundation. The government has certain rights in the invention.

CROSS-REFERENCE TO RELATED APPLICATIONS

This application is a National Phase Entry of International Application Serial. No PCT/US2014/067609, filed on Nov. 26, 2014, which claims the benefit of U.S. Provisional Application No. 61/910,952, filed on Dec. 2, 2013, both of which are incorporate by reference herein.

FIELD

The present disclosure relates to multi-hop networks and more particularly to multi-hop networks communicating using ultrasonic pulses to encode event information.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In wireless sensor networks, sensors are responsible for detecting, monitoring, and tracking events with as low an energy consumption as possible. A specific application of sensor networks is binary event sensing. An example application for such sensing is structural health monitoring. For example, a sensor network may monitor the structural integrity of a bridge. In various implementations, each sensor may simply determine whether or not the presence of an abnormality, such as a crack, has been sensed. The sensor may be configured to send a fatigue event notice in response to sensing the abnormality and remain silent otherwise.

In another example, a sensor network may perform intrusion detection. Each sensor may transmit an intrusion event notice in response to sensing intrusion in its vicinity. A sink receives transmitted event notices. The sink, or a further processing system, can analyze the timing and approximate location of multiple binary failure events or intrusion events to study the dynamics of structural failure or the path of an intruding entity.

Simply transmitting an indication of the occurrence of an event requires a single bit of information (i.e., binary information). Traditional packet communication is highly energy inefficient when transmitting a single bit of actual data. Such inefficiency stems from communication, processing, and buffering overhead for each packet (including header, checksum, and synchronization preamble). Instead of incurring the overhead of a packet, sensors may transmit a single pulse to signify the occurrence of an event. In a multi-hop network (i.e., where one or more sensors cannot transmit directly to the sink), sensors may relay pulses from other sensors toward the sink.

Hop-Angular

A pulse generated by a sensor represents the occurrence of the event as well as its location of origin. A concept of hop-angular event area can be used for event localization. The network is logically divided into a fixed number of angular sectors. In FIG. 1, for example, there are 16 22.5°-wide sectors. Given a pre-defined sector width (22.5° in FIG. 1), the location of a sensor can be represented by the tuple [sector_id, hop_distance], where hop_distance is the number of transmissions required for a pulse to arrive at the sink. Meanwhile, if the sectors are numbered counter clockwise, with the first sector above 0° being sector 1, the location of the hashed Event Area in FIG. 1 can be represented as [15, 3]. This means the node is located in the 15th sector and has a hop_distance of 3 from the sink. This tuple for an event's origin is carried to the sink by the corresponding pulse.

The concept of event area does not assume any specific shape (i.e., circular or otherwise) of a node's transmission coverage area. It could be of any arbitrary shape as shown in FIG. 1. While the angle for a node is pre-programmed at deployment time, its hop distance may be dynamically discovered. The worst-case resolution for event localization increases with increasing sector width and increasing transmission range.

Frame Structure

Nodes are time-synchronized by the sink at the beginning of each frame, which defines the times during which the sink and the sensors can transmit. See FIG. 2 for the frame definition. Each slot can be used for sending a single pulse. The slot includes a guard time so that even with the maximum amount of clock drift, a pulse transmission will still occur within the desired slot.

As shown in FIG. 2, the frame contains an uplink (toward the sink) portion and a downlink (away from the sink) portion. The uplink portion includes a control sub-frame and an event sub-frame. The downlink portion of the frame includes a synchronization slot in which the sink transmits a full-power pulse to all the nodes for synchronizing the clocks. The two following downlink slots of the downlink portion and the reconfiguration portion of the uplink control sub-frame are used for hop-distance discovery. The reconfiguration area in the control sub-frame has (H+1) slots, where H is the maximum hop-distance. The forwarding flag area is designed for routing pulses toward the sink. The H-slot-wide routing area of the control sub-frame is used for energy management.

The event sub-frame contains H slot clusters, with each cluster containing 360/α slots, where α is the sector width. Each of the slots therefore corresponds to a different specific [sector-id, hop-distance] tuple. An event-originating node transmits a pulse during the dedicated event sub-frame slot that corresponds to the [sector-id, hop-distance] of the node's event area.

Pulse Forwarding

While routing the pulse toward the sink, at each intermediate node, the pulse is transmitted in the same event sub-frame slot that corresponds to the [sector-id, hop-distance] of its event area of origin. In other words, while being forwarded, the transmission slot for the pulse at all intermediate nodes does not change with respect to the frame. This is how information about the location of origin of an event is preserved during routing. Upon reception, the sink can infer the event area of origin from the [sector-id, hop-distance] value corresponding to the slot during which the pulse is received.

A hop-distance discovery process may be periodically executed by the network for each node to discover its own hop-distance from the sink node. When a pulse is transmitted by a node at hop-distance h, only neighboring nodes at hop area (h−1) forward the pulse toward the sink. In other words, the nodes at hop area h and (h+1) should ignore the pulse. This logic ensures that a pulse is eventually delivered to the sink.

While transmitting a pulse in the event sub-frame, the sensor also transmits a pulse in the corresponding slot of the forwarding flag area of the control sub-frame. That is, while forwarding a pulse from a hop area h node, a pulse is also transmitted in the $h^{th}$ time slot of the forwarding flag area. By looking at the received pulse in the forwarding area, all the receivers of the pulse can decide if it should be discarded or forwarded toward the sink. This can protect against detection of a false pulse and also ensure that a pulse from hop-area h is forwarded only by nodes in hop-area (h−1).

For additional information regarding hop-angular routing, see Q. Huo and S. Biswas, "A Novel Concept of UWB Pulse Switching in Sensor Networks," ICWMC 2012 and Q. Huo, A. Plummer, and S. Biswas, "Pulse Switching for Static Event Sensing in Sensors Networks," IEEE Globecomm, December 2011, the entire disclosures of which are hereby incorporated by reference into this application.

BRIEF DESCRIPTION OF THE DRAWINGS

The present disclosure will become more fully understood from the detailed description and the accompanying drawings, wherein:

FIGS. 13A-13C are probability density functions for distance estimation performed according to the principles of the present disclosure;

In the drawings, reference numbers may be reused to identify similar and/or identical elements.

DETAILED DESCRIPTION

Introduction

Figure 1:
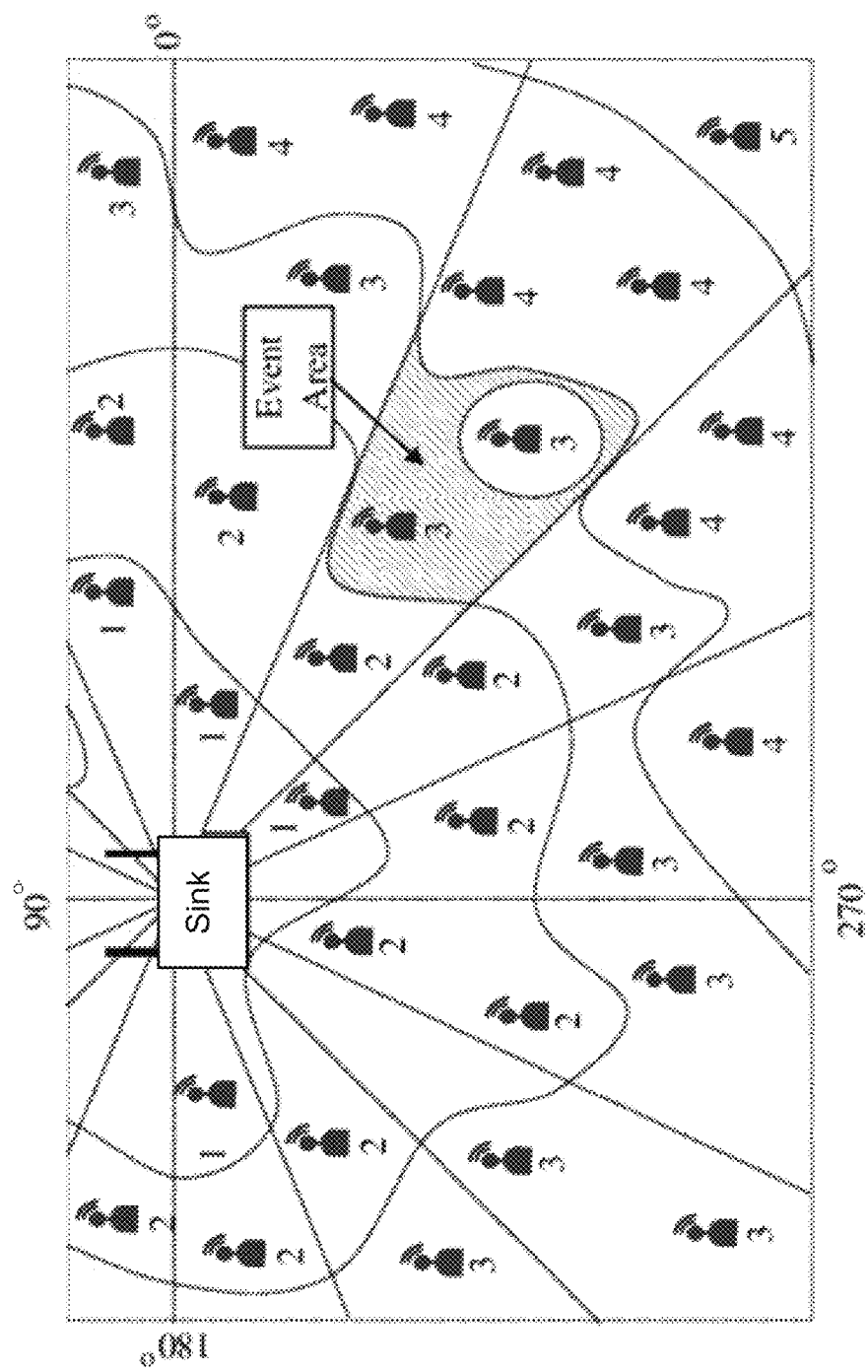
FIG. 1 is a graphical example of hop-angular network layout according to the prior art.
Figure 2:
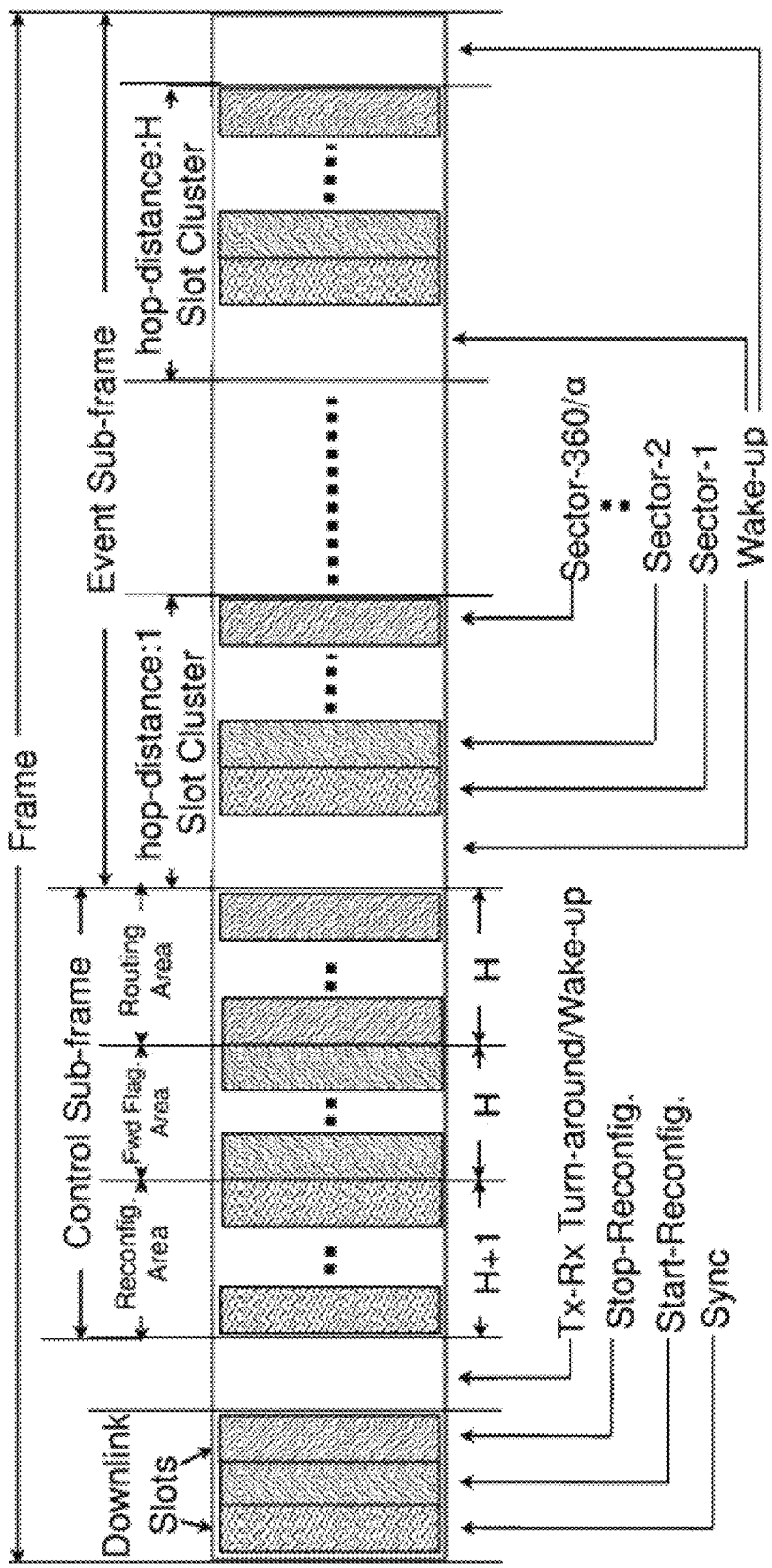
FIG. 2 is a graphical depiction of a frame definition for use with hop-angular routing according to the prior art.

This disclosure introduces energy efficient systems and methods for communication in wireless sensor networks. Contrary to standard packet-based data exchange, this disclosure uses pulse switching, in which information is conveyed by either transmission or absence of transmission of a single pulse. This type of communication is directly applicable to event detection and localization, where a binary signal indicating whether an event has occurred is sufficient.

Traditional event detection sensor networks use multi-bit packets in order to exchange data with each other. By using a single pulse, the overhead per data exchange can be significantly reduced. Multiple nodes, also referred to as sensors, can be distributed about an area to be monitored and each is configured to transmit a pulse when occurrence of an event is sensed. The sensors may communicate with each other and/or may relay information to a controller, also called a sink. The sink may process data and make decisions, such as whether to send commands to an actuator and/or whether to issue an alert based on detected events. In addition, the sink may provide data to a separate processing system. Although the present disclosure discusses a single sink, multiple sinks can be supported using, for example, multi-band operation and syntax extensions.

For larger areas to be monitored, some of the sensors may not be able to directly communicate with the sink, and therefore multi-hop capability is implemented so that sensors can relay pulses from other sensors toward the sink. As pulses are forwarded toward the sink, information about their origin is maintained so that the sink can localize the event (i.e., determine where the event occurred).

Instead of traditional wireless sensor networks, which use radio frequency wireless transmission, sensors mounted to a structure (such as the wing of an aircraft) can use the structure itself to transfer signals. For example, ultrasonic waves can be injected onto the structure by one sensor and detected by the sink or intermediary sensors. In traditional wireless sensor networks, the radio interface often requires the most energy at any given node. This means that reductions in energy consumption for communication can have a significant effect on total energy consumption in the network.

Applications

The present disclosure is well suited for small networks (e.g., with less than a few dozen event areas) distributed within a restricted geographical area. The energy benefits of the architecture may depend on a relatively low event frequency, in which event occurrence is the exception rather than the rule. These qualities are compatible with non-invasive, persistent structural health monitoring, such as for detecting stresses and cracks in a structure, such as a bridge, aircraft wing, or nuclear power plant. Wireless sensor networks are also used in, for example, the medical, environmental, agricultural, civil engineering, aviation, and industrial fields.

In addition to detecting events to allow for preventative or mitigating measures to be taken, data may be gathered that would be of interest to the builders and manufacturers of structures being monitored. Since the network performs continuous event monitoring, the sink can maintain a database that allows monitoring the performance of certain structures (e.g., aluminum, composite, or concrete) under real conditions to determine failure modes and estimate usable lifetime.

In addition to sensors, actuators may be present in the wireless sensor network. Actuators may receive instructions from the sink and/or make decisions based on information received from sensors. For example, sensors in an office may monitor the temperature, and transmit event pulses in response to the temperature being above a predefined comfortable upper temperature. Actuators may increase an air-conditioning output to address the over-temperature condition. Another example wireless sensor network is a fire extinguishing system, in which sensors detect the presence of a fire based on smoke and/or abnormally high temperature. Actuators may activate water sprinklers in response to the detection of fire. See also J. Rao and S. Biswas, "Analyzing Multi-hop Routing Feasibility for Sensor Data Harvesting Using Mobile Sinks," JPDC Volume 72 Issue 6, June, 2012, J. Rao and S. Biswas, "Network Assisted Sink Navigation for Distributed Data Gathering: Stability and Delay-Energy Tradeoffs," Journal Computer Communications Volume 33 Issue 2, February 2010, and J. Rao and S. Biswas, "Stability Analysis of Multi-hop Routing in Sensor Networks with Mobile Sinks" ICDCN 2010, the entire disclosures of which are hereby incorporated by reference into this application.

Physical Layer

Pulses can be transmitted from one sensor to another using various technologies, including ultra-wideband impulse radio and/or ultrasonic transducers. For more information on ultra-wideband impulse radio, see Q. Huo, J. Rao, and S. Biswas, "Pulse Switching: Toward a Packet-Less Protocol Paradigm for Event Sensing," IEEE Transactions on Mobile Computing, vol. 12, no. 1, pp. 35-50, January 2013, and Q. Huo, A. Plummer, and S. Biswas, "Ultra Wide Band Impulse Switching Protocols for Event and Target Tracking Applications," IEEE SECON 2011, Q. Huo, B. Dong, and S. Biswas, "Cellular Pulse Switching: An Architecture for Event Sensing and Localization in Sensor Networks," ICDCN 2013, and Q. Huo, B. Dong, and S. Biswas, "A Cellular Pulse Switching Architecture for Binary Event Sensing," IEEE Globecom 2012 the entire disclosures of which are hereby incorporated by reference into this application.

An ultrasonic transducer, such as a piezoelectric wafer active sensor (PWAS), can be used to create an ultrasonic wave on a medium. For example only, the PWAS may be obtained from APC International, such as a piezoelectric disk having an outer diameter of 9.55 mm, a thickness of 1.00 mm, and a wrap-around (also known as with feedback, WFB) using APC material #850, which has a relative dielectric constant of 1900. For testing and evaluation purposes, the PWAS may be controlled by a wireless sensor platform, such as the Mica2 mesh network radio module from MEMSIC Inc.

Figure 3:
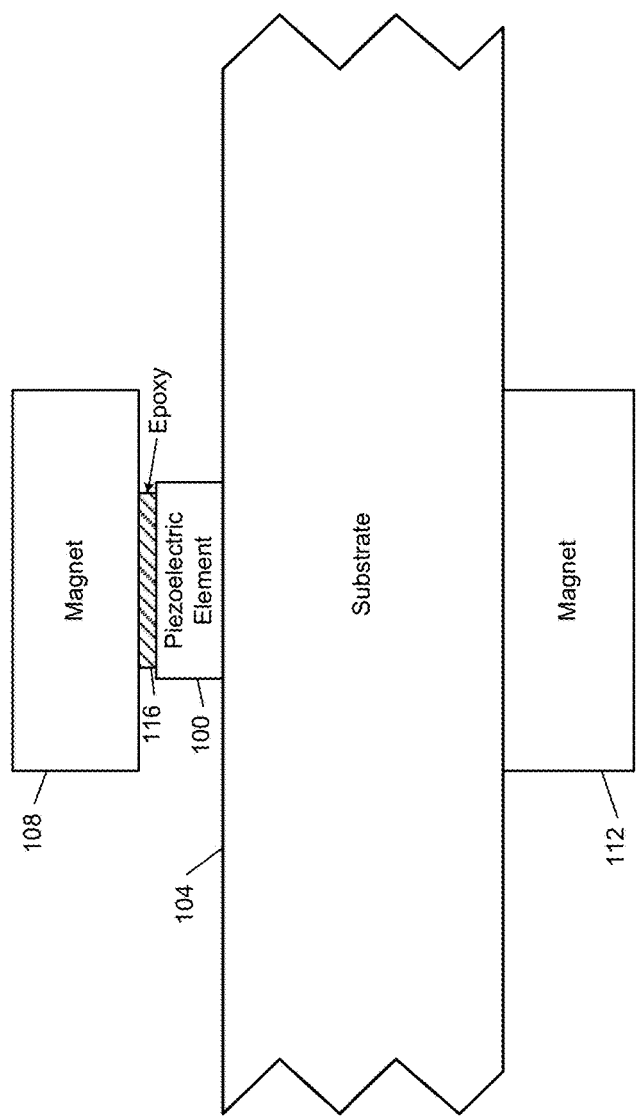
FIG. 3 is a cross-sectional view of a mechanism for coupling an ultrasonic transducer to a substrate.

When performing testing and prototyping, moving the piezoelectric element may be necessary. A mechanism for attaching the piezoelectric element to a substrate so that the piezoelectric element is strongly coupled to the substrate and yet can be relocated easily is desirable. A mechanism that, in some implementations, has both of these characteristics is shown in FIG. 3. A piezoelectric element 100 is coupled to a substrate 104 by the force of opposing magnets 108 and 112. An epoxy 116 secures the piezoelectric element 100 to the magnet 108.

Frequency Response

To maximize efficiency, a frequency (the resonance frequency) at which a particular PWAS transfers a maximum amount of energy to the substrate may be determined. To determine the resonance frequency, a constant input voltage can be provided to the PWAS while varying the frequency. A receiver, such as a second PWAS, measures the received signal strength, and the resonance frequency can be chosen based on the frequency at which the received signal strength is the greatest.

Figure 4:
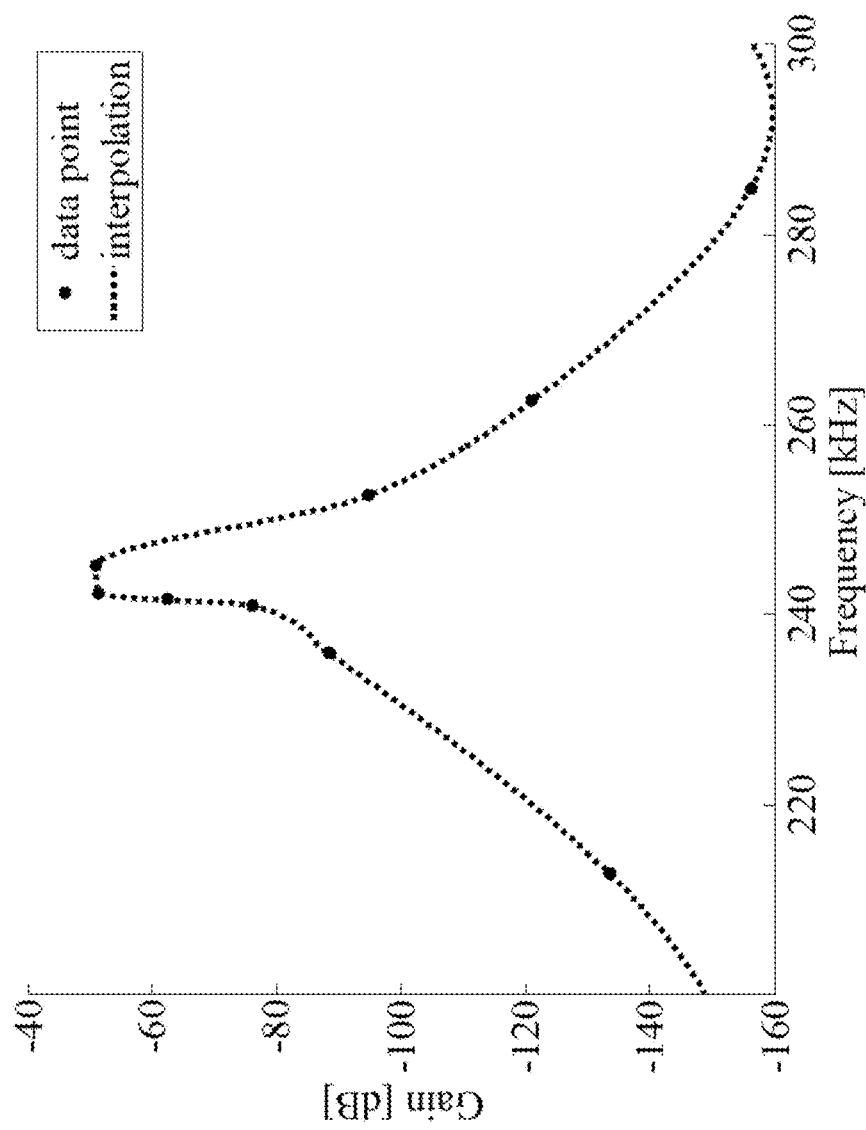
FIG. 4 is a plot of gain versus ultrasonic pulse frequency.

For example only, this approach was used with a 2024 alloy aluminum sheet 3.6 m long, 1.2 m wide, and 1 mm thick. In FIG. 4, the measured gain is plotted against frequency, where gain is the ratio of the received power to the transmitted power. From FIG. 4, it can be seen that on this substrate, the PWAS was most sensitive at roughly 245 kHz. Therefore, for the following examples, 245 kHz was used to excite the PWAS.

Pulse Width

Another metric to determine for transmitting ultrasonic pulses is the pulse width for a transmission. If the chosen pulse width is too small, the communication range may be insufficient, which may require more nodes to span an object of interest. If the chosen pulse width is too large, the extra energy may not lead to any greater communication capability, and instead is simply wasted energy. One approach to identify the desired pulse width is to vary the pulse width of a transmitted signal, and monitor the received signal at a receiver, such as by using an oscilloscope.

Figure 5A:
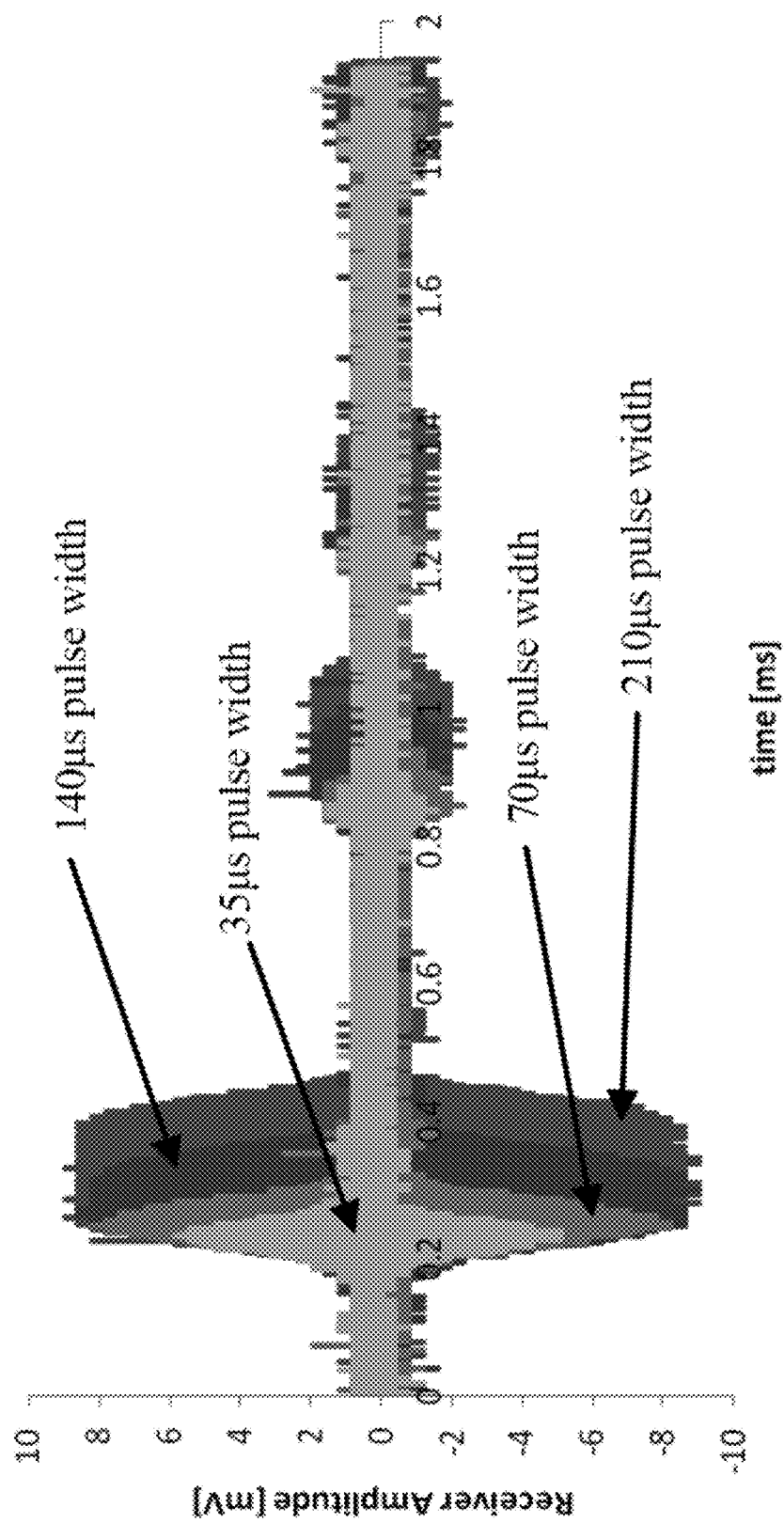
FIG. 5A is a plot of received amplitude versus ultrasonic pulse width.

FIG. 5A shows traces of received signals at a distance of 1 m for varying pulse widths: specifically, 35 µs, 70 µs, 140 µs, and 210 µs. From FIG. 5A, it can be seen that the amplitude of the received signal is greater for the 70 µs pulse width than for the 35 µs pulse width. However, the amplitude of the received signals corresponding to 140 µs pulse width and the 210 µs pulse width are approximately the same as the 70 µs pulse width. This implies that the receiver PWAS is maximally excited with a pulse width of approximately 70 μs. Larger values of the pulse width do not result in larger signal amplitude at the receiver, since maximum excitation has already been achieved. For the further examples below, therefore, a pulse width of approximately 70 μs will be used.

Figure 5B:
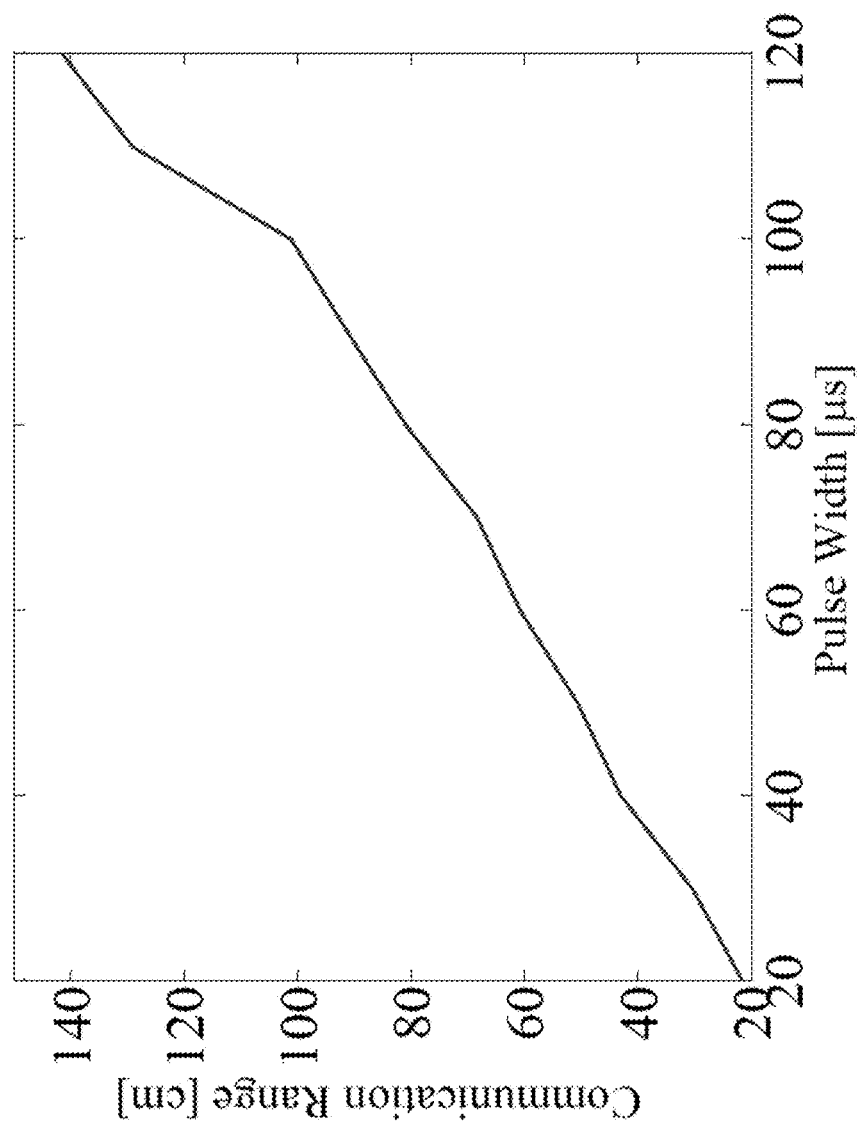
FIG. 5B is a plot of communication range versus ultrasonic pulse width.

Note that longer distances may require a wider pulse width, and shorter distances may permit narrower pulse widths. See FIG. 5B, which plots maximum communication range versus pulse width based on experimental data. In various implementations, the pulse width may be variable so that sensors can be installed in various applications with different inter-sensor distances. The sensors can then be instructed to use the correct pulse width according to the given installation.

Propagation Delay

The propagation of mechanical waves in thin metallic substrates can be described by Lamb waves. Lamb waves propagate in two different forms: symmetric (longitudinal) waves and asymmetric (transverse) waves. The symmetric waves propagate faster and show lower dispersion. The asymmetric waves, meanwhile, propagate slower and have more dispersion. The different symmetric (S) modes are labeled $S_0, S_1, \ldots,$ and $S_N$. The asymmetric (A) modes are labeled $A_0, A_1, \ldots,$ and $A_N$.

The number of possible modes depends on the thickness of the medium as well as the signal's frequency. In 2024 alloy aluminum, the theoretical velocity of the symmetric wave is roughly 5400 m/s, while the asymmetric wave propagates at approximately 3100 m/s. In the example system described here, where a 1 mm thick 2024 aluminum alloy has been used and the signal frequency is set to 245 kHz, two wave modes ($S_0$ and $A_0$) dominate.

For various purposes, including synchronizing timing, determining the propagation delay of a wave from transmitter to receiver is valuable. Because the symmetric wave has a higher velocity than the asymmetric wave, the symmetric wave arrives earlier. Therefore, separation in time between the received symmetric and asymmetric waves is an indication of distance between the transmitter and receiver, and therefore propagation delay.

Figure 6:
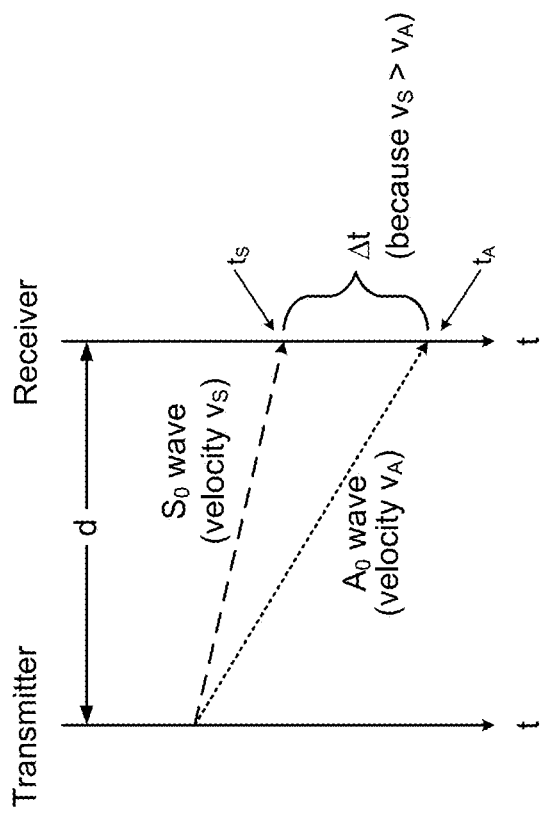
FIG. 6 is a graphical representation of using different transmission mode velocities to estimate distance.

FIG. 6 shows a graphical depiction of propagation of the $S_0$ and $A_0$ waves. Because the velocity of the $S_0$ wave ($v_S$) is greater than the velocity of the $A_0$ wave ($v_A$), the $A_0$ wave arrives at the transmitter after a delay of Δt compared with the $S_0$ wave. The velocities $v_S$ and $v_A$ may be predetermined according to the transmission frequency and the material characteristics.

If $t_S$ is the arrival time at the receiver of the $S_0$ wave and $t_A$ is the arrival time of the $A_0$ wave, the time difference can be defined as $\Delta t = t_A - t_S$. The distance d between the transmitter and receiver can be used to express the time difference as $$\Delta t = \frac{d}{v_A} - \frac{d}{v_S}.$$

The distance d can be solved for, resulting in:

$$d = \frac{\Delta t}{v_A^{-1} - v_S^{-1}}.$$

Then, it the propagation time is defined as the time from the beginning of a transmission until a wave (the $S_0$ wave) first reaches the receiver, the propagation delay is $$t_{prop} = \frac{d}{v_S}.$$

Figure 7:
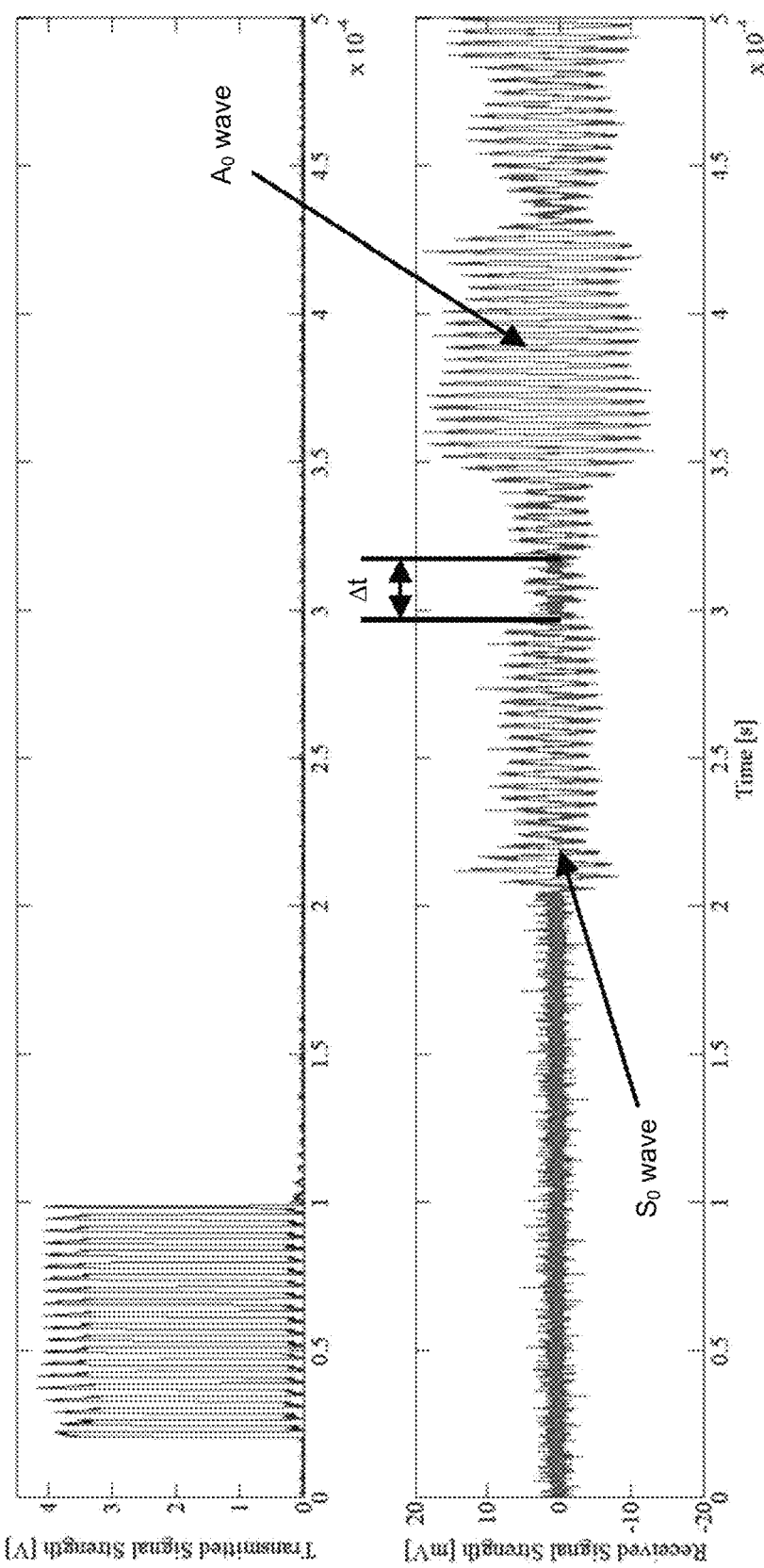
FIG. 7 is an example trace of transmitted signal strength and received signal strength on a common timescale.

FIG. 7 shows a voltage trace of example $S_0$ and $A_0$ waves being received, with an indication of how Δt can be defined. If the distance between transmitter and receiver is too small, the $S_0$ and $A_0$ waves may overlap to the extent that it is not possible to differentiate between the waves. Therefore a propagation delay may not be accurately calculated for distances below a certain threshold. For example only, using the parameters above, the threshold is approximately 0.5 m. To allow for accurate propagation delay estimation, the minimum distance between sensors may be set at or above this threshold.

Delay Spread

Figure 8:
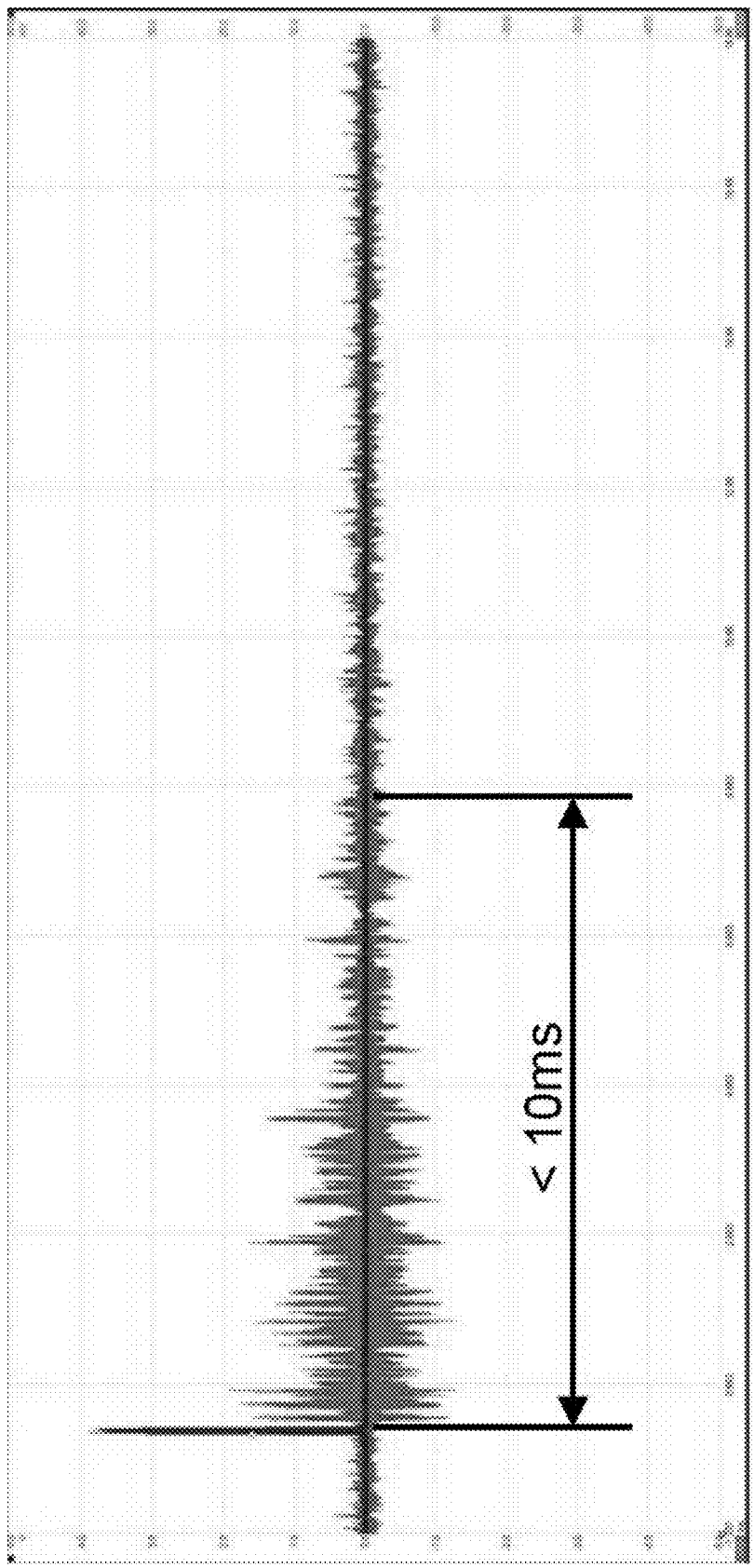
FIG. 8 is an example trace of multipath interference.

The necessary size of a slot, during which a pulse can be transmitted, is determined by the accuracy of the time at which the pulse will be transmitted, and the amount of delay in receiving the pulse. In FIG. 8, a plot of received signal strength over time is shown for a received pulse. After performing a number of measurements using the above example substrate and pulse characteristics, it has been determined that the delay spread was below 10 ms. Therefore, the slot size should be at least 10 ms, and in the examples below it is 15 ms.

Tx/Rx and Envelope

Figure 9:
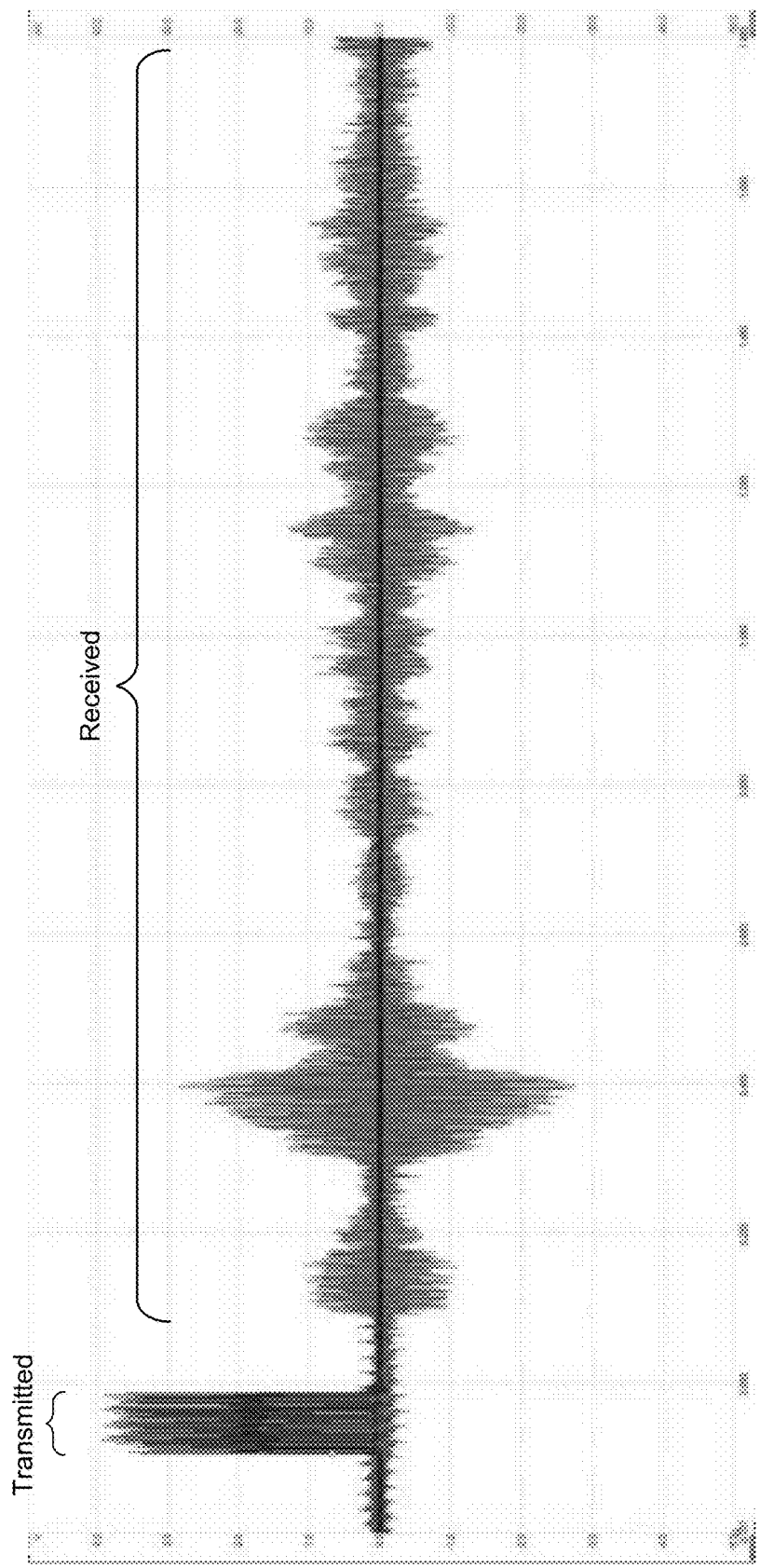
FIG. 9 is an example trace, on a common axis, of transmitted signal strength and received signal strength.

In FIG. 9, a transmitted signal is shown on a single time axis along with the received signal at a distance of 1 m. As seen in FIG. 9, the received signal has one section with a large amplitude, and also has quite a few sections where the signal amplitude is higher than the noise floor. To convert this analog-domain information into a form that can be processed, an envelope function can be applied to the received signal.

Figure 10:
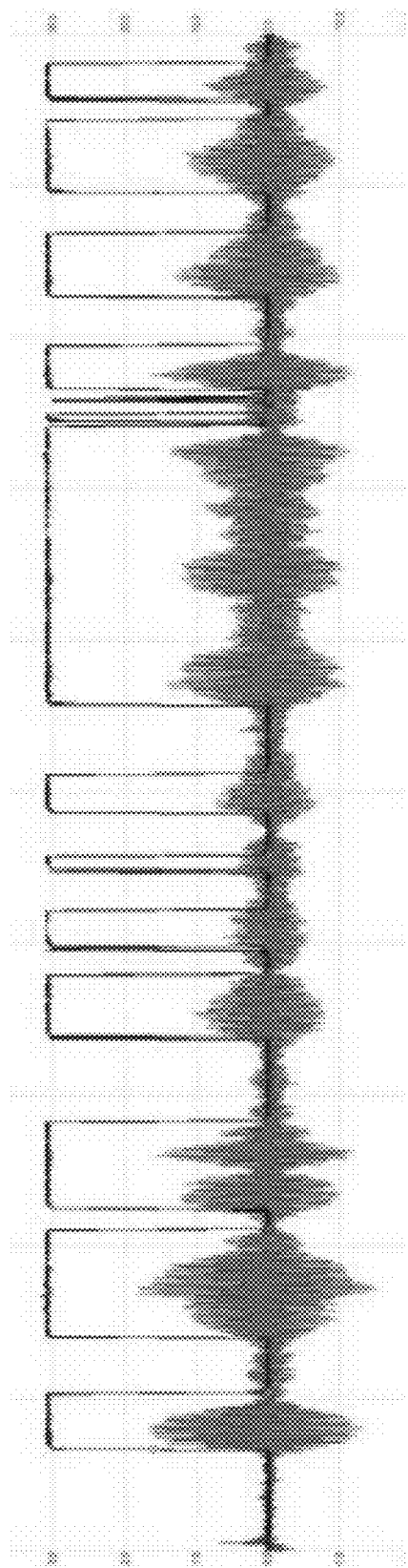
FIG. 10 is an example trace, on a common axis, of received signal strength and a processed signal resulting from application of an envelope function.

In FIG. 10, operation of an envelope function on an example received signal is shown. The envelope function produces an irregular square wave from the received signal. The threshold used for envelope detection may be adjusted to achieve a balance between low false pulse rate and low pulse loss rate.

In various implementations, only the timing of the first rising edge of the envelope output is used to determine timing of the received pulse. For example, the rising edge may be used to trigger an interrupt in processing circuitry. Similar processing may be performed on each of the $S_0$ and $A_0$ pulses.

Pulse Stacking

As discussed in more detail below, two different sensors may both transmit a pulse during a slot corresponding to a certain event area. This may occur, for example, when two sensors in the event area are both indicating detection of an event, or when two sensors outside of the event area are both retransmitting a pulse for the same event area. In traditional wireless networking, simultaneous transmission is called a collision, and generally results in a failed transmission.

Figure 11:
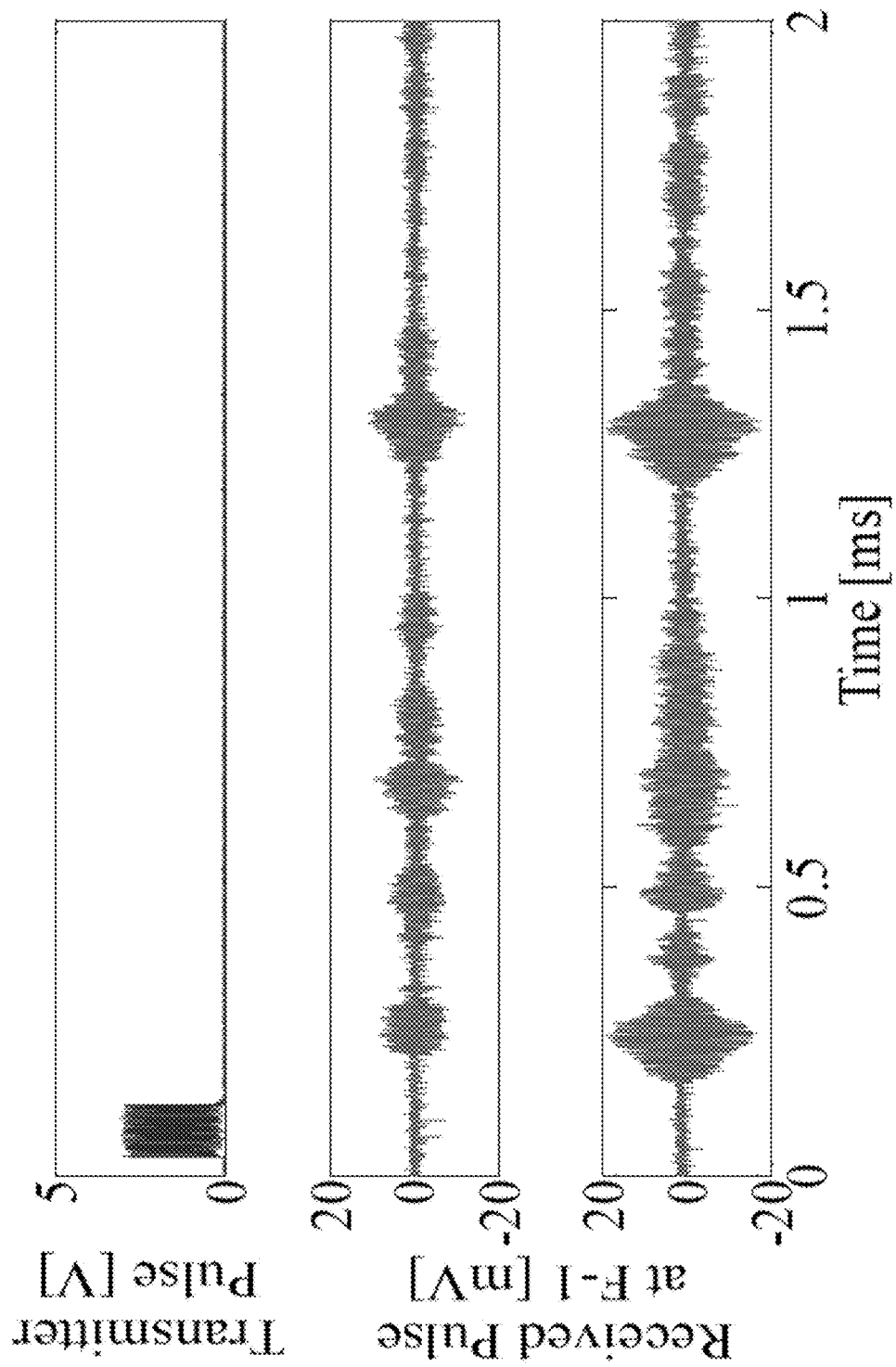
FIG. 11 is an example pair of traces comparing a received signal strength from a single transmission to a received signal strength from two transmissions.

According to the present disclosure, however, the information conveyed in a transmission is simply a single pulse, and therefore transmitting multiple copies of the same pulse simultaneously results in a single received pulse, often one whose amplitude is magnified. For example only, see FIG. 11. The first plot shows transmitted signal strength of a pulse, which at a distance of 0.6 m results in the received signal strength shown in the second plot. By contrast, when two transmitters both transmitted the signal shown in the first plot, the result was as shown in the third plot. Note that the signal in the third plot has a greater amplitude, which is why transmitting multiple simultaneous pulses may be referred to as pulse stacking.

Transceiver

Figure 12A:
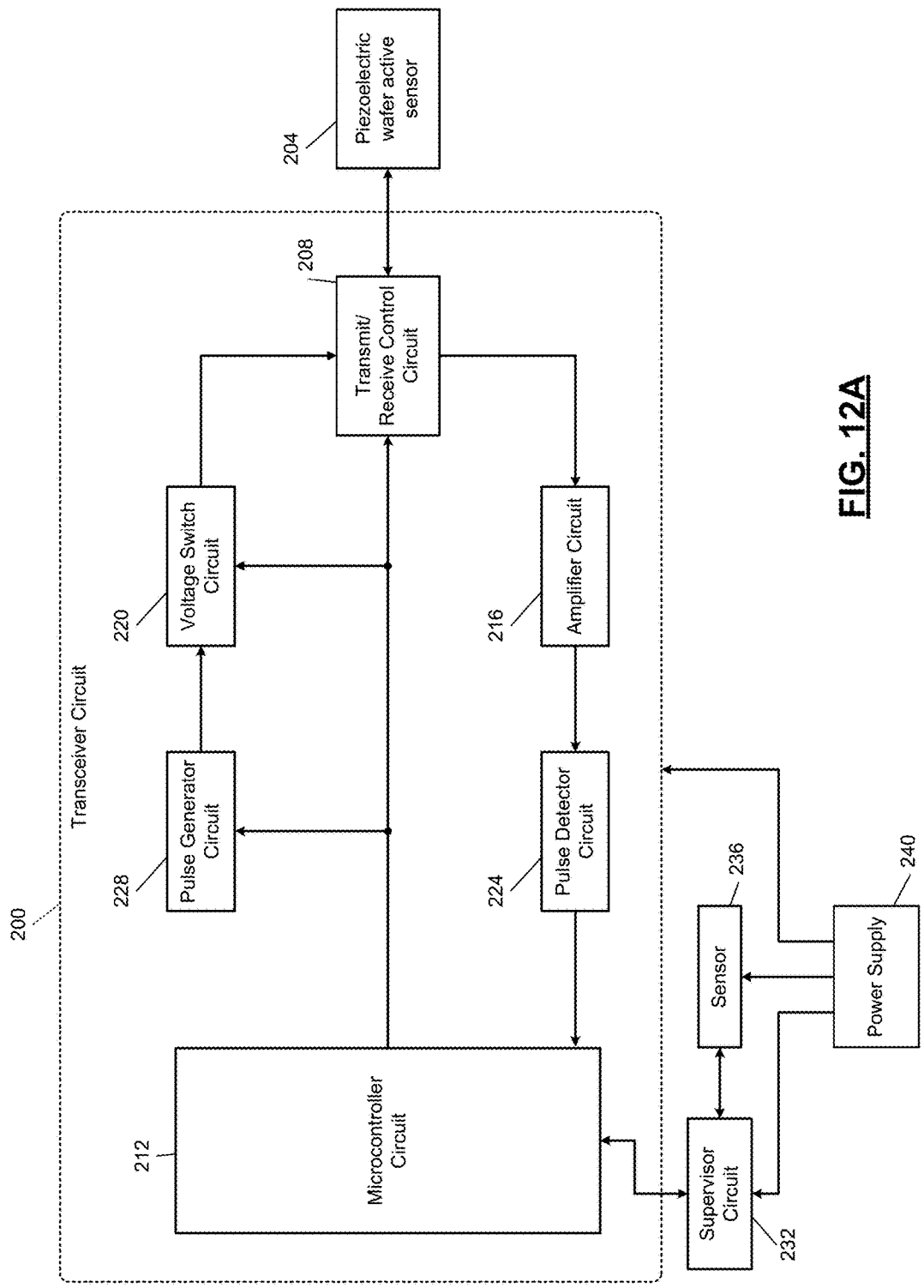
FIG. 12A is a block diagram of an example transceiver circuit.

FIG. 12A is a functional block diagram of an example transceiver circuit 200. The transceiver circuit 200 receives signals coupled to a piezoelectric wafer active sensor (PWAS) 204 from a substrate to which the PWAS 204 is attached. The transceiver circuit 200 also transmits signals to the PWAS 204 for coupling onto the substrate.

The transceiver circuit 200 includes a transmit/receive control circuit 208 that interfaces with the PWAS 204. A mode of the transmit/receive control circuit 208 is controlled by a microcontroller circuit 212. In a receive mode, the transmit/receive control circuit 208 provides signals to an amplifier circuit 216, while in a transmit mode, the transmit/receive control circuit 208 sends signals from a voltage switch circuit 220 to the PWAS 204.

The amplifier circuit 216 amplifies a received signal and provides an amplified signal to a pulse detector circuit 224. The pulse detector circuit 224 determines start times of pulses, and may apply an envelope filter to the amplified signal. Information related to existence and timing of pulses is provided to the microcontroller circuit 212. In various implementations, the pulse detector circuit 224 may simply drive a single wire to an active state to trigger an interrupt in the microcontroller circuit 212.

The microcontroller circuit 212 instructs the voltage switch circuit 220 as to which voltage to use. For example, a high voltage may be used for global synchronization pulses that should be received throughout the entire substrate, while a lower voltage is used for local communication pulses. A pulse generator circuit 228 provides pulse waveforms to the voltage switch circuit 220. Operation of the pulse generator circuit 228 and the voltage switch circuit 220 are controlled by the microcontroller circuit 212. For example, the microcontroller circuit 212 may instruct the pulse generator circuit 228 when to generate a pulse, and may instruct the pulse generator circuit 228 on how wide to make the pulse. The microcontroller circuit 212 may command the voltage switch circuit 220 based on whether the pulse will be for local or global transmission.

A supervisor circuit 232 may control the sensor node at a high level, receiving sensor inputs from a sensor 236 and communicating to and from the sink using the transceiver circuit 200. For example only, the sensor 236 may sense temperature, pressure, acceleration, humidity, and/or force. A power supply 240 provides power to the transceiver circuit 200, the supervisor circuit 232, and the sensor 236. In various implementations, the responsibilities of the supervisor circuit 232 may be assumed by the microcontroller circuit 212, similar to what is shown in FIG. 12B.

Figure 12B:
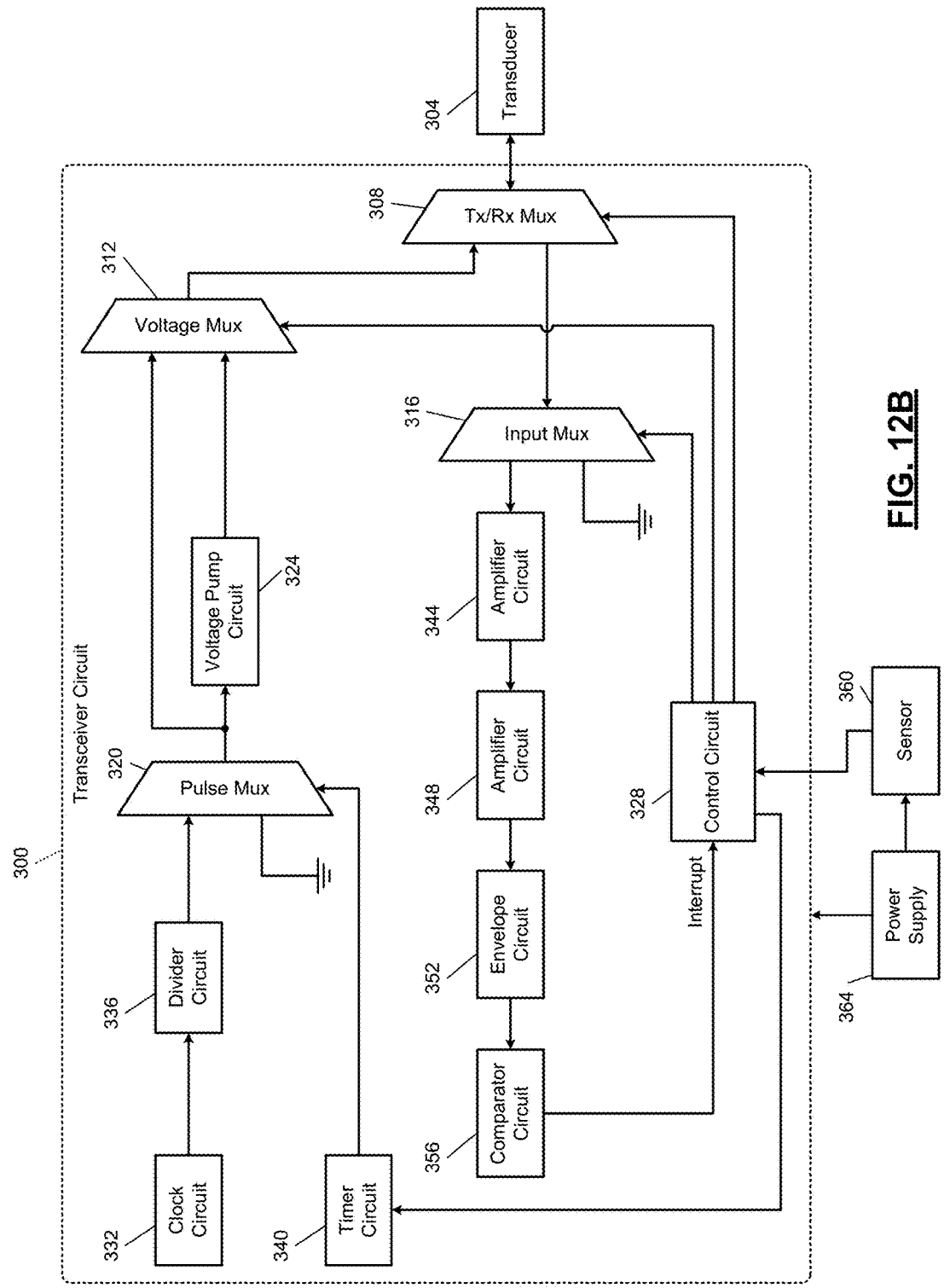
FIG. 12B is a block diagram of another example transceiver circuit adapted for sink or node use.

In FIG. 12B, another example transceiver circuit 300 is shown. A transducer 304, such as a piezoelectric wafer active sensor, is interfaced with the transceiver circuit 300. A transmit/receive (Tx/Rx) multiplexer 308 determines whether a signal from a voltage multiplexer 312 is output to the transducer 304 or whether a signal from the transducer 304 is provided to an input multiplexer 316.

The voltage multiplexer 312 receives a pulse from a pulse multiplexer 320. The voltage multiplexer 312 also receives a higher voltage version of the pulse from a voltage pump circuit 324. The voltage multiplexer 312 outputs either the pulse or the higher voltage pulse depending on a signal from a control circuit 328.

A clock circuit 332 generates a sinusoidal clock signal at a high frequency. For example only, the clock circuit 332 may include a crystal oscillator, which may or may not be temperature-compensated. The clock from the clock circuit 332 is provided to a divider circuit 336, which reduces a frequency of the clock signal to a frequency that efficiently creates an ultrasonic wave in the substrate to which the transducer 304 is attached.

The divided clock signal from the divider circuit 336 is a continuously repeating periodic square wave. In order to turn that square wave into discrete pulses, the pulse multiplexer 320 alternately outputs a burst of the divided clock signal in between outputting a zero voltage. Operation of the pulse multiplexer 320 is controlled by a timer circuit 340. The timer circuit 340 causes the pulse multiplexer 320 to switch from outputting zero to outputting the divided clock signal for a predetermined period of time. That predetermined period of time establishes the pulse width. The beginning of that predetermined period of time may be initiated by a signal from the control circuit 328.

When the control circuit 328 instructs the Tx/Rx multiplexer 308 to provide signals from the transducer 304 to the input multiplexer 316, the control circuit 328 also instructs the input multiplexer 316 to connect the Tx/Rx multiplexer 308 to an amplifier circuit 344. Otherwise, the input multiplexer 316 connects the Tx/Rx multiplexer 308 to ground. This reduces crosstalk between the inputs to the Tx/Rx multiplexer 308.

In various implementations, signal conditioning may be performed on the received signal prior to amplification by the amplifier circuit 344. For example only, low-pass and/or high-pass filtering may be performed. The amplifier circuit 344 generates an amplified signal, which is further amplified by an amplifier circuit 348. This twice-amplified signal is processed by an envelope circuit 352 and the processed result is fed to a comparator circuit 356. The comparator circuit 356 outputs a compare result to the control circuit 328. For example, the comparator circuit 356 may output an active signal to the control circuit 328 when the output of the envelope circuit 352 exceeds a threshold.

In various implementations, the envelope circuit 352 may be implemented as a germanium diode. Although two amplifier circuits 344 and 348 are shown, more or fewer amplifiers may be used. Multiple amplifiers may be used to improve various parameters, such as frequency response, stability, output swing, etc. when compared to a single amplifier. In various implementations, the amplifier circuits 344 and 348 may each be non-inverting amplifiers, inverting amplifiers, or a combination of the two.

A sensor 360 provides data to the control circuit 328. The sensor 360 may detect an event or provide information to the control circuit 328 from which the control circuit 328 can determine an event has occurred. A power supply 364 powers the transceiver circuit 300 and the sensor 360.

In one example implementation, the clock circuit 332 is a 7.86432 MHz crystal oscillator with a sinusoidal output. The divider circuit 336 reduces the frequency to 245 kHz and creates a square wave with a 50% duty cycle at that frequency. The divider circuit 336 may include a phase-locked loop (PLL). In order to create a 70 μs pulse, the timer circuit 340 outputs an active signal to the pulse multiplexer 320 for a duration of 70 μs. The timer circuit 340 may output this active signal once every 30 ms or on command from the control circuit 328.

In various implementations, the voltage pump circuit 324 may double voltage of the pulse. To allow for standard AA batteries to be used, the base voltage may be a multiple of 1.5 V, such as 3 V. The voltage pump circuit 324 may boost that to 6 V. In the example used in this disclosure, a 6 V pulse can be detected at one corner when transmitted from an opposite corner. A 6 V pulse is therefore suitable as the global synchronization pulse.

The timer circuit 340 may be implemented as 555 monostable integrated circuit. The control circuit 328 may be implemented as a Mica2 mesh network radio module. The control circuit 328 may be programmed with software that controls the select inputs of the Tx/Rx multiplexer 308, the voltage multiplexer 312, the input multiplexer 316, and the timer circuit 340. The output of the comparator circuit 356 may be attached to an interrupt input of the control circuit 328. The outputs from the control circuit 328 may be general purpose input/output (GPIO) pins programmable in software.

Figure 12C:
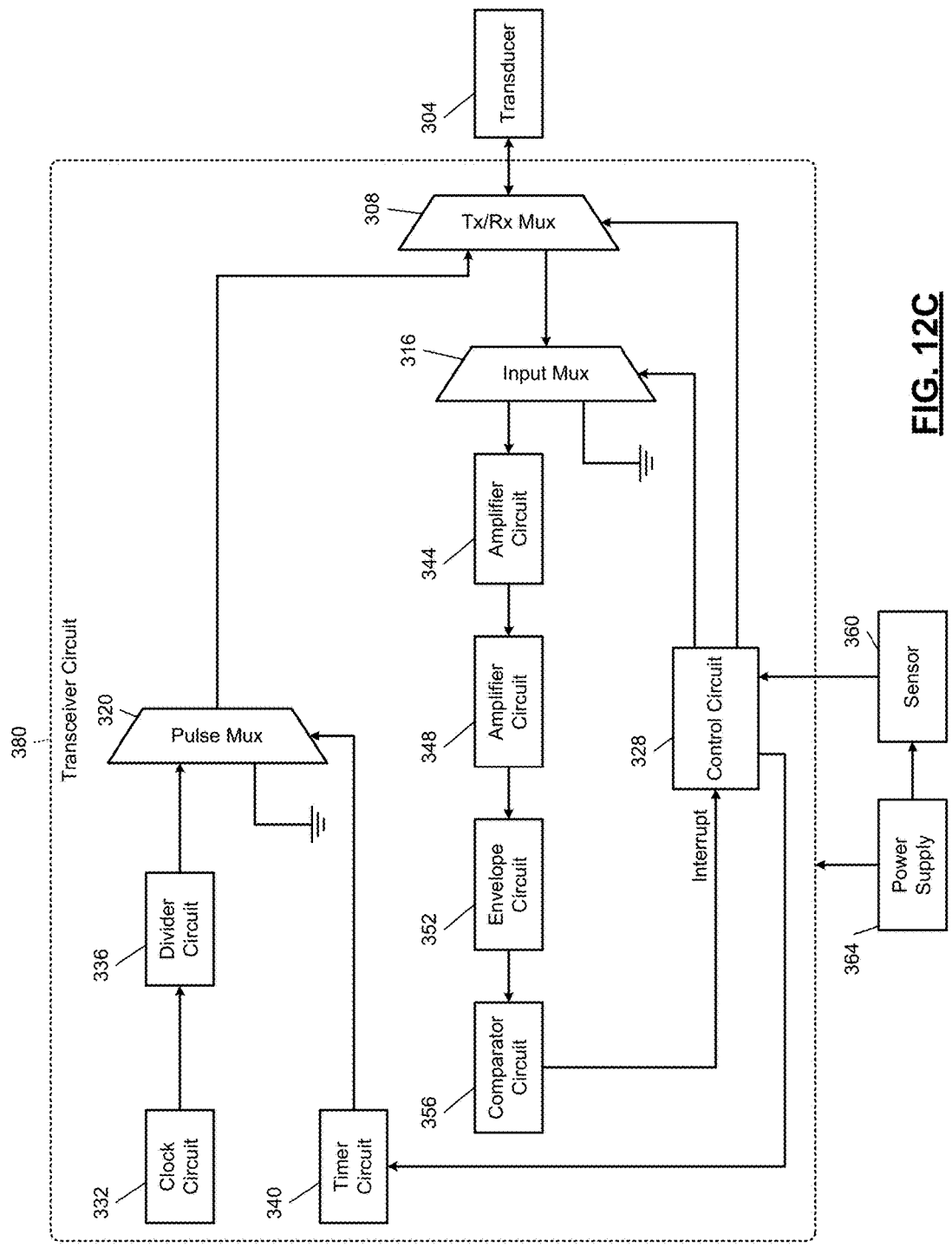
FIG. 12C is a block diagram of an example transceiver circuit adapted for node use.

In FIG. 12C, a transceiver circuit 380 adapted for use by a node, but not by a sink, may omit the voltage pump circuit 324 and the voltage multiplexer 312 of FIG. 12B. This is because a node is not responsible for transmitting a global synchronization pulse. To save space and cost, these components may therefore be omitted.

Experimental Results

To test the above transmission parameters and hardware, test pulses were sent at varying distances: specifically, 0.5 m, 0.75 m, 1.0 m, and 3.8 m. The maximum distance of 3.8 m was chosen based on the size of the piece of aluminum used for testing. For each distance, a number of cycles were performed—in each cycle, a pulse was transmitted. A pulse loss rate is determined by dividing the number of pulses not received by the total number of pulses transmitted. Further, a false pulse is defined to be a pulse being detected even though no pulse was being transmitted at the time. A false pulse rate is determined by dividing the number of false pulses received by the total number of actual pulses transmitted.

| Distance | Pulse Loss Rate | False Pulse Rate | Pulse Voltage | # of cycles |
|---|---|---|---|---|
| 0.5 m | <2.16e−6 | 4.0e−6 | 3.0 V | 925,936 |
| 0.75 m | <1.05e−5 | 3.37e−4 | 3.0 V | 189,880 |
| 1.0 m | 3.32e−7 | 1e−6 | 3.0 V | 6,026,342 |
| 3.8 m | <1.62e−6 | 9.4e−5 | 6.0 V | 617,190 |

FIG. 8 shows the results of distance estimation for measured distances between the transmitter and receiver of 0.5 m, 0.75 m, and 1.0 m. When the physical distance was set to be 0.5 m, the distance was estimated 462,967 times, and the resulting estimation was 0.5002 m±0.0015 m. This result shows rather high accuracy as well as a low variation in the determination of the distance. See FIG. 13A.

For a measured distance of 0.75 m, 94,940 pulses were used to estimate distance, with the resulting estimation being 0.7495 m±0.002 m. See FIG. 13B. For a set distance of 1.0 m, 3,013,171 pulses were analyzed to estimate distance, with the resulting estimation being 1.09 m±0.007 m. Given the precision of each of these estimations, the consistent offset of 9 cm for the 1.0 m distance may be attributable to setup inaccuracy, where the transmitter and receiver were placed slightly further than 1.0 m apart. See FIG. 13C.

Additional information regarding the ultrasonic physical layer can be found in S. Lorenz, B. Dong, Q. Huo, W. J. Tomlinson, and S. Biswas, "Pulse Based Sensor Networking Using Mechanical Waves Through Metal Substrates," Proceedings of SPIE, Volume 8753, id. 875306 (May 28, 2013), the entire disclosure of which is hereby incorporated by reference into this application.

Cell-Based Routing

Figure 14:
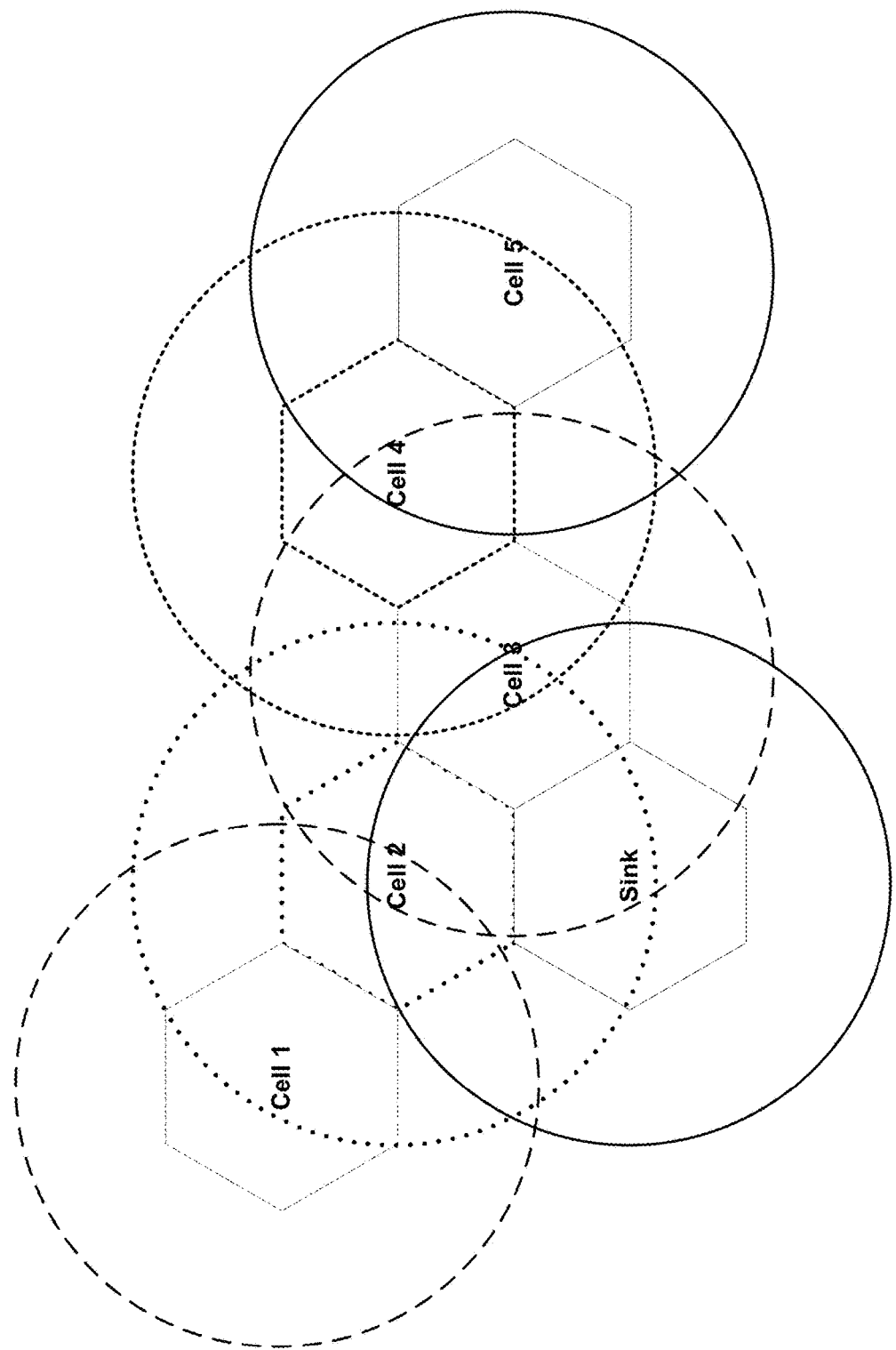
FIG. 14 is a graphical depiction of network cells and approximate transmission regions.

In contrast to the hop-angular routing shown in FIG. 1, cell-based routing is graphically depicted in FIG. 14. In FIG. 14, a sink and five example cells are shown. Although, as discussed in more detail below, the cells can be of any shape, hexagons are shown for simplicity of illustration. See also Q. Huo, B. Dong, and S. Biswas, "Pulse Switching: A Packet-less Networking Paradigm for Energy-constrained Monitoring Applications," in Wireless Sensor Networks: Theory and Application, CRC Press, September 2013, the entire disclosure of which is hereby incorporated by reference into this application.

The sink and each of the cells is shown with a corresponding approximate circular transmission range. For example, the dashed circle surrounding cell 1 overlaps with cell 2, but does not reach cell 3 or the sink. As a result, cell 1 and cell 2 are considered neighbors, but cell 1 and cell 3 are not considered neighbors.

Each of these cells may include one or more sensors. In various implementations, the sensors are not individually addressable, and are identified only by cell number. The cell number may need to be preprogrammed into the node during installation and setup. In various implementations, nodes in each cell may also be preprogrammed with a list of IDs indicating neighbor cells. Because multiple nodes in a cell may each detect the same event, multiple nodes in a cell may transmit pulses at the same time. While this may be energy inefficient, the resulting pulse should still be intelligible to the receiver, and may in fact be a stronger signal.

Each cell may include one or more sensor nodes and/or one or more actuator nodes. However, because the nodes are not individually addressable, and are programmed to operate solely based on the cell in which they are located, this disclosure uses the terms node and cell interchangeably. In other words, when stating that a cell transmits a pulse, this means that one or more of the nodes within the cell transmit that pulse. Similarly, saying that a cell detects an event means that one or more of the nodes within the cell detected that event. Further, stating that a cell operates as a next hop in a forwarding route means that the nodes within that cell will forward on an event.

Returning to FIG. 14, multi-hop transmission is used to relay information about an event from a cell that is not a neighbor of the sink to the sink. For example, an event detected by cell 1 will first be transmitted to cell 2, which will retransmit the pulse to the sink. As described below, the sink and cells may engage in a self-discovery process on an intermittent basis to determine routes to the sink.

Cell-based routing does not require predefined shapes of cells as the hop-angular approach of FIG. 1 dictates. Further, the cells can be of any arbitrary size, where with hop-angular routing event areas farther away from the sink are larger in size. Further hop-angular routing assumes that routes to the sink will essentially follow a radial path toward the sink. This may not be possible due to communication issues and/or node failure. By contrast, cell-based routing allows a node to transmit a pulse toward the sink along any route no matter how circuitous as long as that route is shorter than a predetermined number of hops.

The predetermined number of hops may be imposed as a limitation to ensure that route discovery is completed within a deterministic period of time. Further, in implementations in which the entire route discovery process is completed within a single frame, the number of slots dedicated to the route discovery process is a fixed number and therefore limits the potential number of hops in a route.

Frame Definition

Communication in the pulse-based system of the present disclosure is synchronized to a repeating frame. All nodes in the network are synchronized to know when each frame begins. An example frame structure shown in FIGS. 15A-15D includes three areas: synchronization, route discovery, and pulse forwarding.

In the synchronization area, the sink injects a high-power synchronization pulse into the medium, which can be heard by all the nodes in the network. A node may use the arrival time of the synchronization pulse as the start of the frame, which is less accurate. Or a node may correct the arrival time based on propagation delay to achieve a more accurate time reference for the start of the frame. As discussed above, propagation delay can be estimated based on the characteristics of asymmetric versus symmetric modes of ultrasonic waves. If propagation delay is not taken into account, there will be inaccuracies in timing among the nodes and the sink, and as a result, larger slots for pulse transmission will be needed.

After the synchronization area is a delay of length $\beta$ followed by the route discovery area. Route discovery allows each node to determine the best node to forward a pulse to so that the pulse will arrive at the sink. Following the route discovery area is another delay period of length $\beta$, and then the pulse forwarding area. During the pulse forwarding area, a node can transmit a pulse indicating that an event has been detected. In addition, the pulse forwarding area is used to forward pulses toward the sink from other nodes. A further delay frame of length $\beta$ ends the frame and, in various implementations, the same frame pattern then immediately repeats. The total length of the frame is $\lambda$.

Figure 15A:
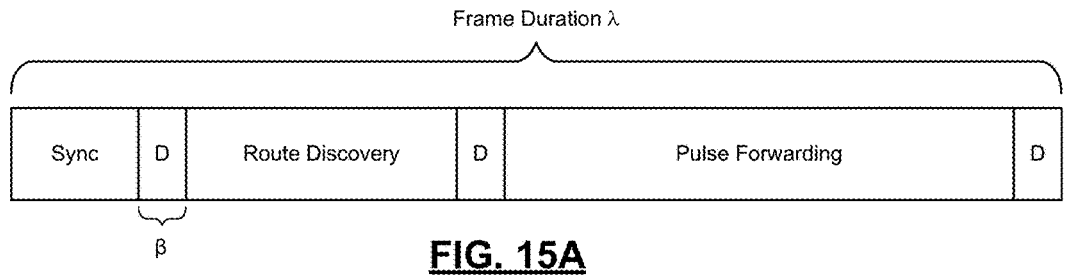
FIGS. 15A-15D are a graphical depiction of a frame definition for cell-based routing.
Figure 15B:
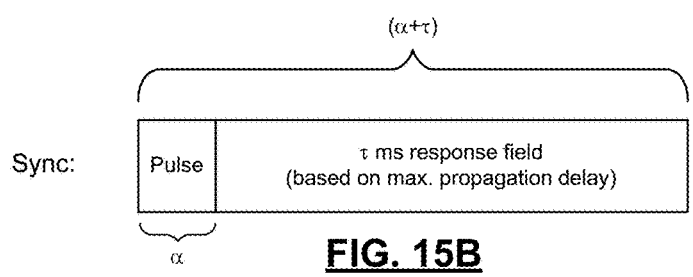

In FIG. 15B, an example of the synchronization area is shown. A synchronization pulse of length $\alpha$ is transmitted, and a time frame of length $\tau$ is allotted to allow the synchronization pulse to travel the length of the medium. In other words, $\tau$ may be based on the maximum delay from one end of the medium to the other. Note that FIGS. 15A-15D are not to scale. In fact, for example, in actual implementations, $\alpha$ may be significantly shorter than $\beta$.

Figure 15C:
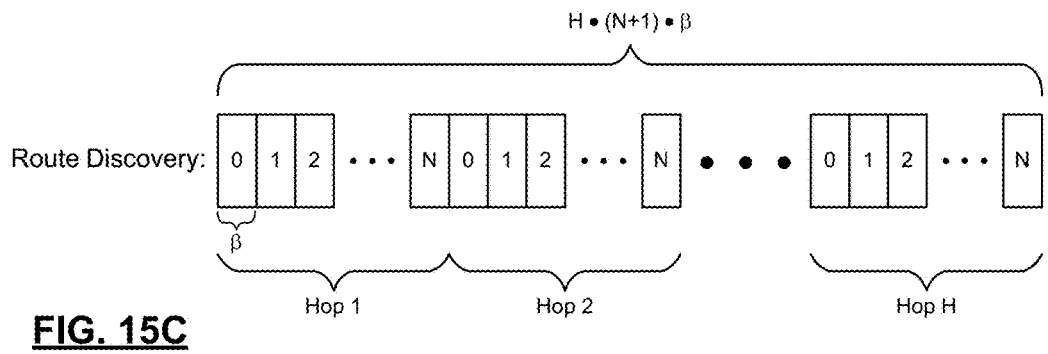

In FIG. 15C, an example of the route discovery area is shown. A route discovery pulse is transmitted by the sink, and forwarded by each receiving node. As the pulse propagates outward from the sink, each node can determine a path back to the sink according to where the route discovery pulse was received from. In general, the first time a node receives a discovery pulse, whichever node had sent that discovery pulse represents the best path to get it back to the sink.

The network may be characterized as having up to a number H hops from the sink to the outermost node. The route discovery area therefore has H sections, one for each possible hop. In each section there are N+1 slots corresponding to the N nodes and 1 sink. In the first of the H sections, the sink sends the route discovery pulse. This first section corresponds to the first hop away from the sink. The route discovery pulse is placed in the slot corresponding to the transmitter, which in this case is the sink and, in the convention of this implementation, slot 0.

The nodes that receive this first hop discovery pulse from the sink will broadcast their own broadcast discovery pulse in the second section of the H sections. Each of these receiving nodes will transmit the route discovery pulse in the slot of the second section that corresponds to that node. Because the number of hops between the sink and any given node is not predefined, the route discovery area includes a slot for each node in every one of the H sections. One possible optimization, however, would be to make the first of the H sections a single slot long, where that single slot corresponds to the sink. Because the first route discovery pulse originates at the sink, the slots for nodes 1-N in the first section may be eliminated.

Figure 15D:
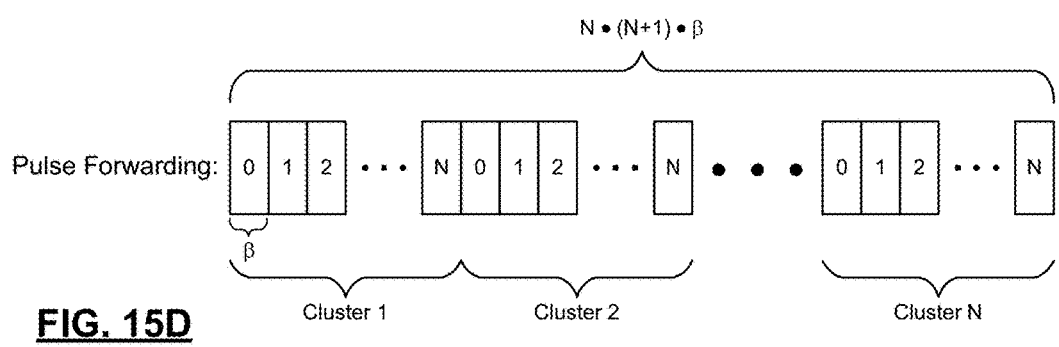

In FIG. 15D, an example of the pulse forwarding area is shown. The pulse forwarding area includes N clusters of slots. Within each of the N clusters are N+1 slots, which correspond to the N nodes plus the 1 sink. A pulse located in cluster 1 indicates that an event has been detected by a node within cell 1. The slots within cluster 1 are used as a receiver (or, next hop) address. A pulse is transmitted within the slot corresponding to the node to which the pulse is being immediately transmitted. On the pulse's final hop to the sink, the pulse will be located in slot 0 because the sink is the receiver.

All the way from the originating node to the sink, the pulse will be transmitted within the same cluster in each successive frame. As a result, when the sink receives a pulse within, for example, cluster N, the sink knows that an event was detected by node N. In other words, if node N detects an event, node N generates a pulse within cluster N of the immediately subsequent frame. Which slot in cluster N will be used is based on which node is the best next hop toward the sink from node N. When that next hop node receives the pulse in cluster N, the next hop node will generate a pulse in cluster N in the following frame. The slot is chosen to transmit to a node that is one step closer to the sink or is the sink itself.

Total frame size $\lambda$ is $(\alpha+\tau)+\beta*H*(N+1)+\beta*N*(N+1)+3*\beta$. As an example only, pulse width $\alpha$ is 80 µs, slot size $\beta$ is 15 ms, and the maximum propagation delay $\tau$ is 1 ms. If the number of nodes N in the network is 9, and the maximum number of hops is 3, the resulting frame size $\lambda$ is $0.08+15*(3*10+9*10+3)=1845.08$ ms.

Route Discovery

An example of route discovery is shown in FIGS. 16A-16D. For simplicity, only 5 nodes are shown. Note that in this discussion, each cell may include multiple nodes. However, for architectural purposes, including pulse forwarding and route discovery, the nodes within a cell are interchangeable and therefore each cell is treated as a single node for ease of explanation. In practice, different nodes within a single cell may build up slightly different routing tables. This may be an advantage by leading to an increase in route diversity. Nevertheless, each of the nodes is programmed to perform the same operations.

Figure 16A:
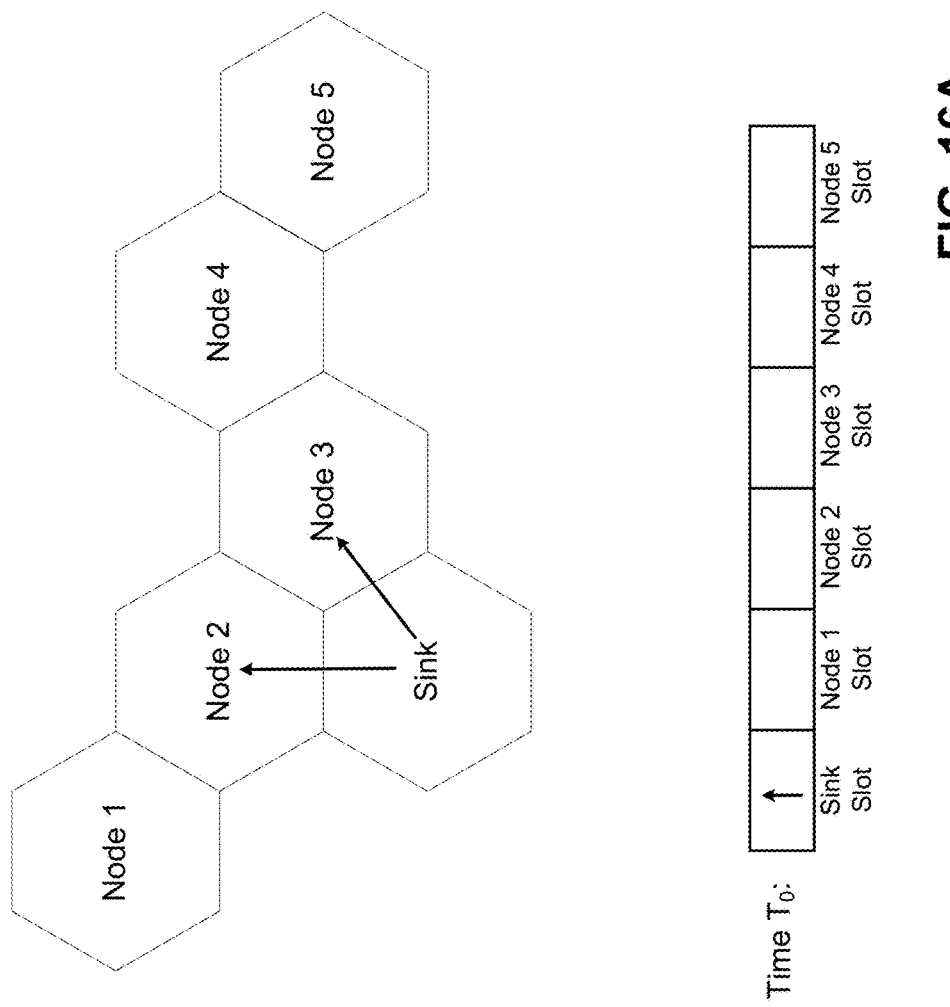
FIGS. 16A-16D illustrate route discovery using the frame definition of FIGS. 15A-15D.

In FIG. 16A, at time $T_0$ (i.e., a first section of the route discovery area of a first frame) the sink transmits a route discovery pulse. Because the route discovery pulse is transmitted by the sink, the pulse is located in the slot corresponding to the sink (slot 0). Nodes 2 and 3 are within the transmission range of the discovery pulse, and therefore each of nodes 2 and 3 update their respective routing tables based on the reception of the route discovery pulse. The nodes recognize that the pulse came from the sink, and that the pulse was received at time $T_0$.

Figure 16B:
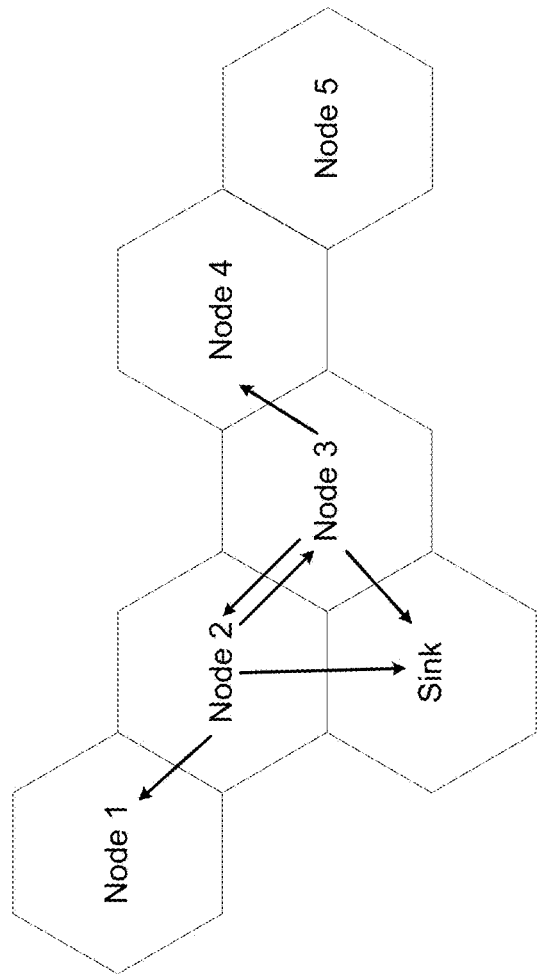
Figure 16B:
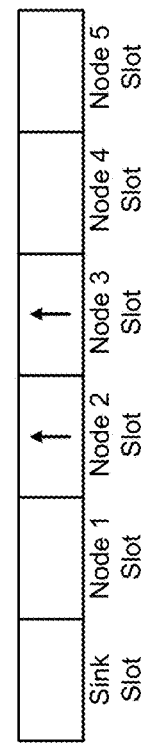

In FIG. 16B, nodes 2 and 3, which have each just received a route discovery pulse, transmit their own route discovery pulses in the second section (time $T_1$) of the route discovery area of the first frame. Node 2 transmits the route discovery pulse in the slot corresponding to node 2, while node 3 transmits a route discovery pulse in the slot corresponding to node 3. The sink may note that nodes 2 and 3 are both neighbors of the sink although in various implementations this information is not used. Node 1 recognizes that node 2 is a neighbor, and that the discovery pulse was received from node 2 at time $T_1$. Nodes 2 and 3 recognize that each other are neighbors with corresponding reception times of $T_1$. Further, node 4 recognizes that node 3 is a neighbor, and that the route discovery pulse from node 3 was received at time $T_1$.

Figure 16C:
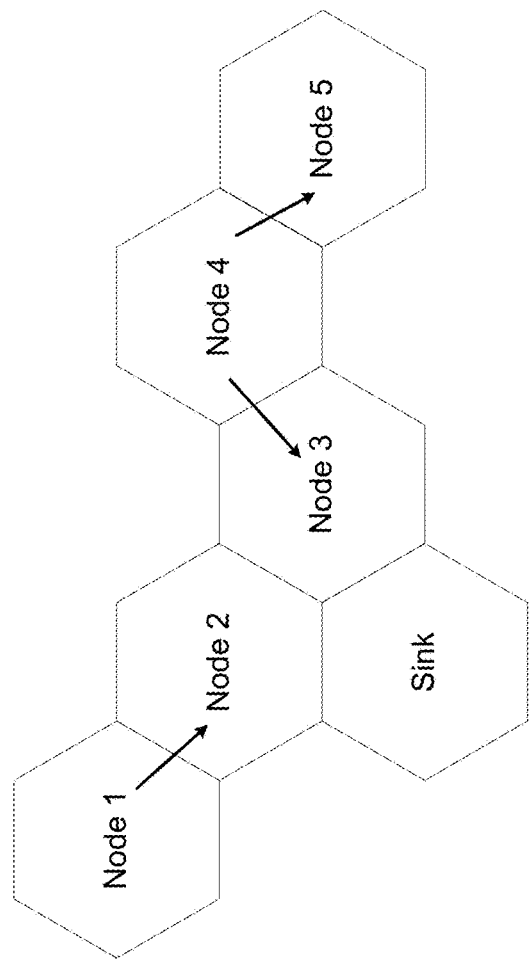
Figure 16C:
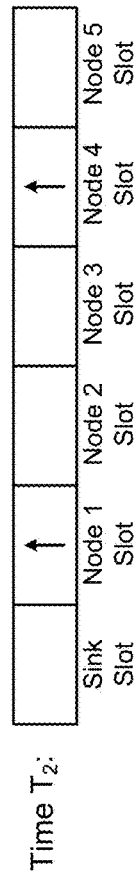

In FIG. 16C, nodes 2 and 3 have already transmitted route discovery pulses and therefore do not transmit further route discovery pulses in the current frame. Node 1, meanwhile, transmits a route discovery pulse, which is received by node 2. Node 2 updates its routing table to indicate that node 1 is a neighbor, and that the route discovery pulse from node 1 was received at time $T_2$. Similarly, nodes 3 and 5 note that node 4 is a neighbor with a corresponding time of $T_2$.

Figure 16D:
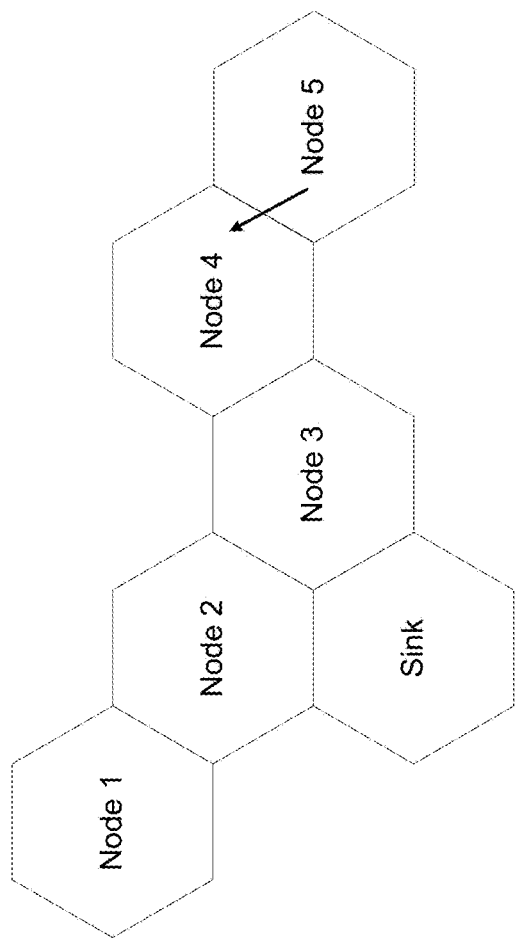
Figure 16D:
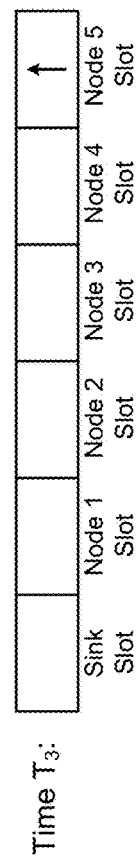

In FIG. 16D, node 5 transmits a route discovery pulse, and the only node to receive the pulse, node 4, notes that node 5 is a neighbor with a reception time of $T_3$. Each node now has one or more paths to follow toward the sink. The quickest, and therefore generally best, path to the sink is indicated by the neighbor having the lowest reception time. For example, node 2 has 3 neighbors, with the lowest reception time being the route discovery pulse from the sink. As would be expected, therefore, node 2 will transmit pulses to the sink directly. However, if communication from node 2 to the sink is severed and node 2 is able to detect that failure based on response mechanisms discussed below, node 2 can look at the routing table. Node 2 can then determine that node 3 is the next best way to reach the sink because it has the second-lowest corresponding reception time.

Pulse Forwarding

Figure 17A:
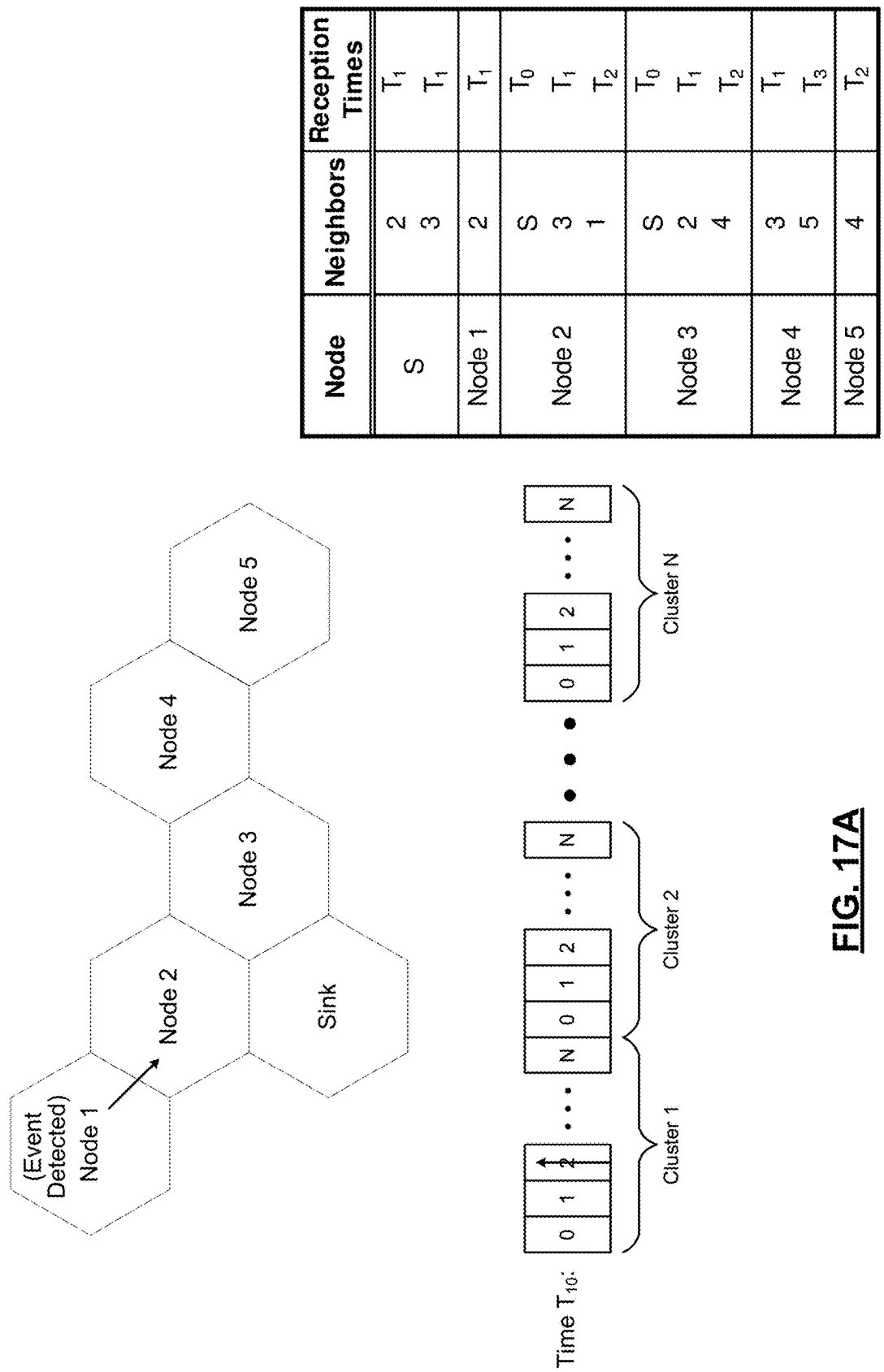
FIGS. 17A-17B illustrate event forwarding using the frame definition of FIGS. 15A-15D.
Figure 17B:
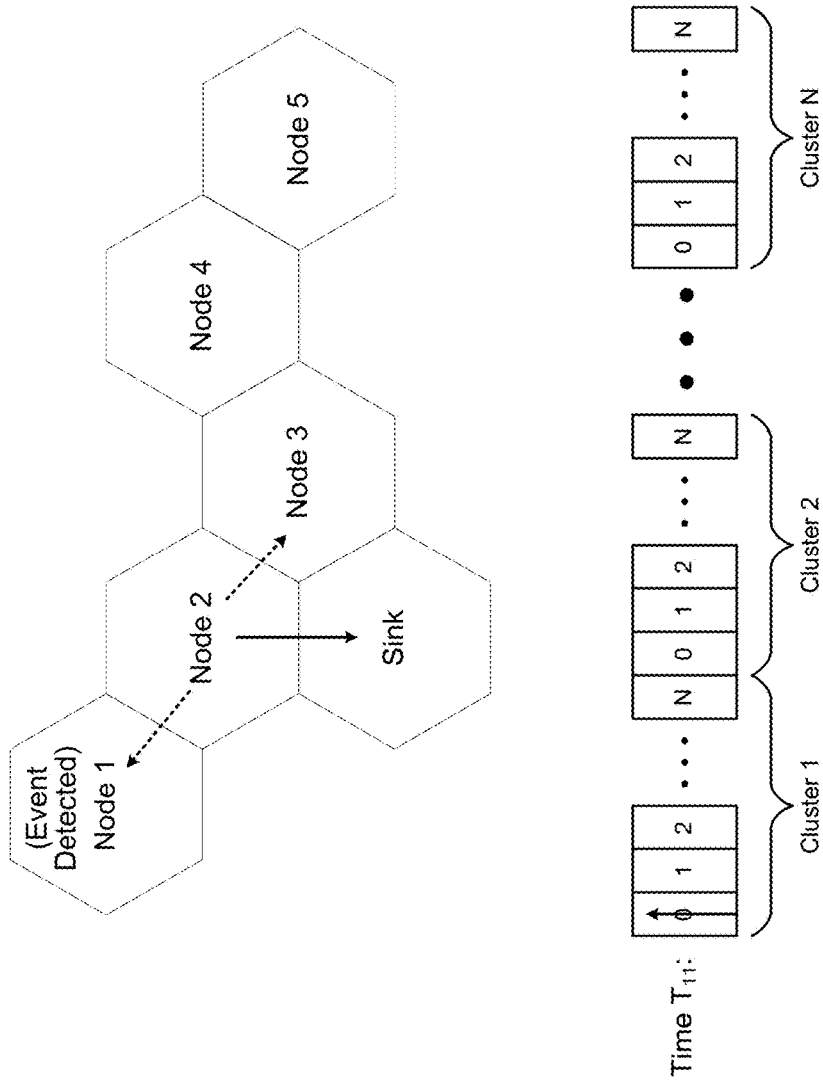

In FIGS. 17A-17B, an example of pulse forwarding is presented. Assume that an event is detected at node 1. Based on the routing table, node 1 recognizes that the pulse should be forwarded to node 2. Therefore, in the first cluster, which corresponds to the first node, of the pulse forwarding area, node 1 transmits a pulse. Specifically, node 1 transmits a pulse in slot 2 to indicate that the pulse is being transmitted to node 2.

In FIG. 17B, node 2 has received the pulse from node 1, and based on node 2's routing table, node 2 decides to forward the pulse directly to the sink. Because the pulse originated at node 1, node 2 will forward the pulse still within cluster 1. Note that this is cluster 1 of the following frame. Because node 2 is transmitting the pulse to the sink, the pulse is placed in slot 0 of the first cluster. Because transmission is omnidirectional, node 1, node 3, and the sink all receive the pulse. However, because the pulse is in slot 0, nodes 1 and 3 recognize they are not the intended recipients and can ignore the pulse. Given that the pulse is located in cluster 1, the sink recognizes that the event was detected in node 1.

Block Diagram

Figure 18:
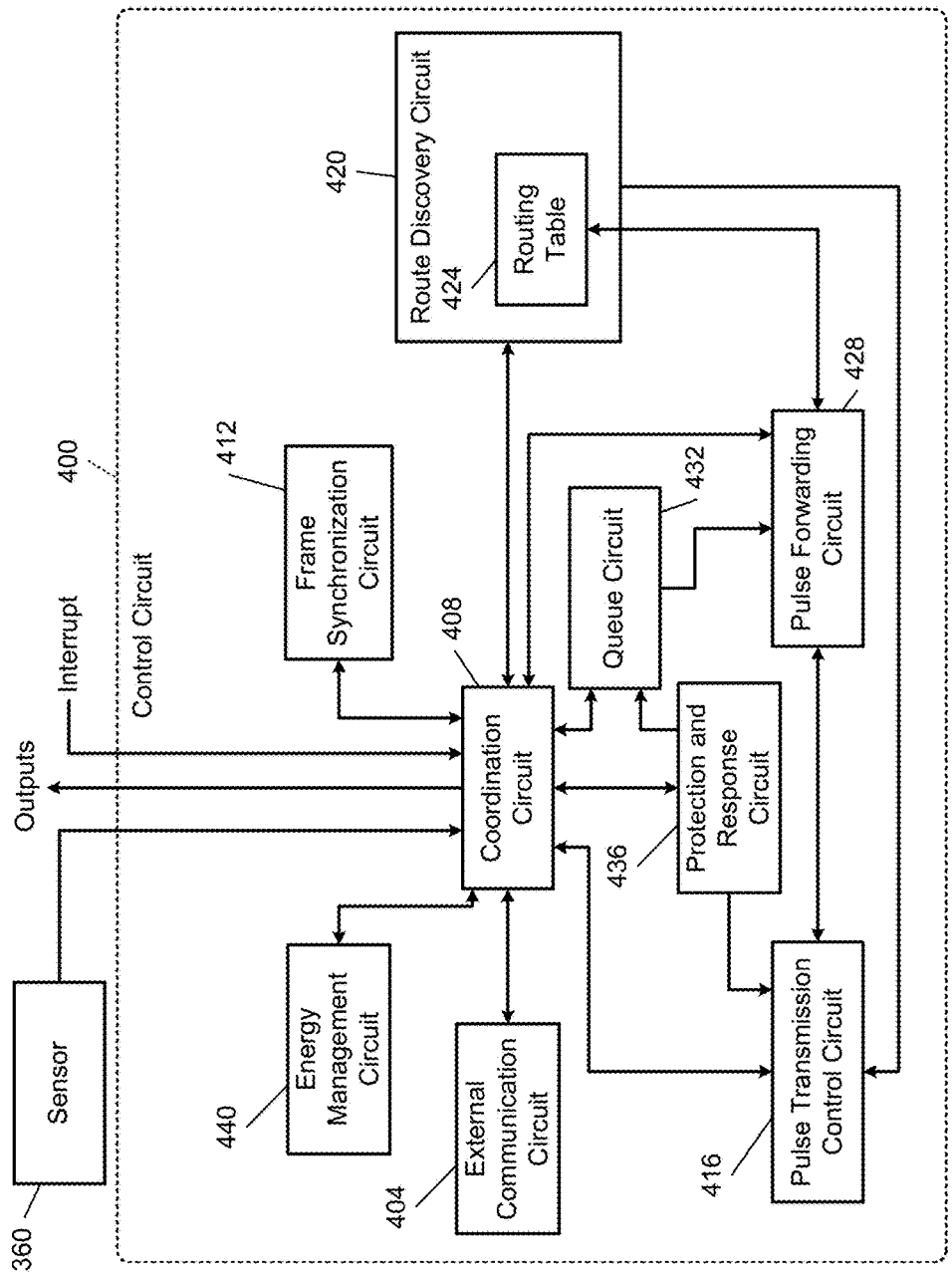
FIG. 18 is a block diagram of an example control circuit.

FIG. 18 is an example functional block diagram of a control circuit 400. The control circuit 400 may be used for a sensor node, an actuator node, or a sink. An external communication circuit 404 allows the control circuit 400 to communicate with an external processing system. For example, when the control circuit 400 is used in a sink, the external communication circuit 404 may use a wired or wireless local area network to send data to a monitoring computer. The monitoring computer may be connected to a wide area network to allow for remote monitoring.

In other implementations, the external communication circuit 404 itself includes a wide area network transceiver, such as a cellular radio modem. When the control circuit 400 is used for sensor or actuation nodes, the external communication circuit 404 may be omitted to reduce costs and power consumption. A coordination circuit 408 controls operation of the external communication circuit 404.

The coordination circuit 408 also receives signals related to received pulses. In various implementations, signals related to received pulses may be provided to the coordination circuit 408 as interrupts. The coordination circuit 408 may also output control signals to control various aspects of a transceiver, such as multiplexers and switches.

A frame synchronization circuit 412 receives data regarding the synchronization pulse or pulses, and synchronizes timing of the control circuit 400 with the beginning of the frame. The frame synchronization circuit 412 may also determine which frame definition is currently in use in implementations where different frames are used at different points in time. A pulse transmission control circuit 416 determines when within the frame various pulses should be transmitted for purposes such as route discovery and pulse forwarding.

A route discovery circuit 420 maintains a routing table 424 indicating neighbor nodes and next hops toward the sink and/or other nodes. The route discovery circuit 420 instructs the pulse transmission control circuit 416 to transmit discovery pulses as dictated by the route discovery process. A pulse forwarding circuit 428 transmits pulses toward specified destinations, either a sink or another node. The pulse forwarding circuit 428 determines next hop information from the routing table 424.

A queue circuit 432 stores event pulses protected by the node in which the control circuit 400 is located, as well as pulses that have been received from other nodes. The queue circuit 432 instructs the pulse forwarding circuit 428 to transmit the pulses to the next hop or hops. In various implementations, the queue circuit 432 operates in a first-in, first-out manner. In various implementations, the queue circuit 432 may operate in a first-in, first-out manner, but prioritize events for transmission that have occurred in the node that includes the control circuit 400.

A protection and response circuit 436 signals successful or unsuccessful reception of data, and may further indicate whether a collision has been detected. The protection and response circuit 436 may also execute processes that protect against false positives, such as by calculating and verifying a false pulse protection code. The protection and response circuit 436 instructs the pulse transmission control circuit 416 regarding when to send pulses indicating successful or unsuccessful reception.

An energy management circuit 440 transitions some or all components the control circuit 400 and some or all components of a connected transceiver. The energy management circuit 440 may consider the current location within the frame, and whether any transmissions are scheduled or any reception is expected.

Irregular Cells

Figure 19:
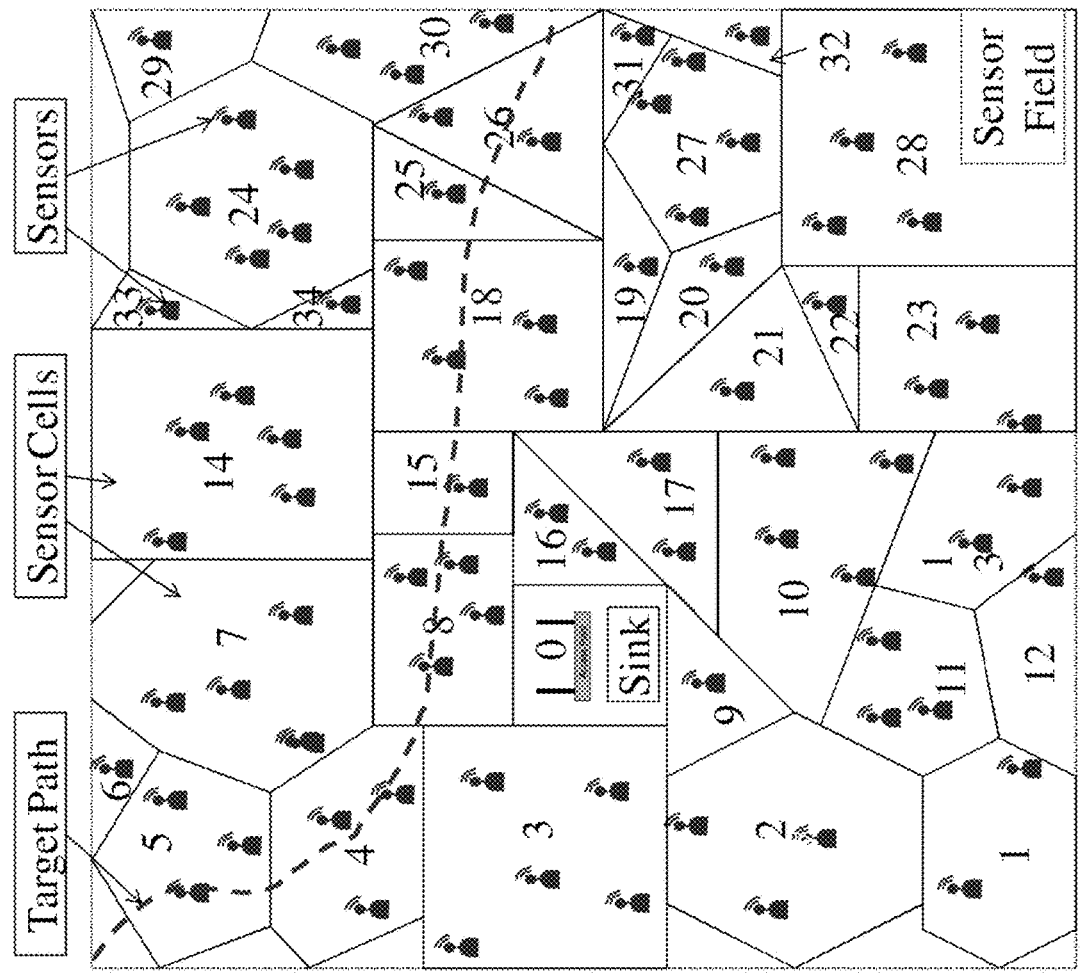
FIG. 19 is a graphical example of a cellular sensor network layout according to the principles of the present disclosure.

FIG. 19 is an example of a network layout in which the sensors are not uniformly distributed and the cells are of differing sizes and shapes. This emphasizes that there is no requirement that the cells be of equal size or shape or that they be oriented in a grid-like pattern, such as a honeycomb. Note that the sink is labeled as cell 0, while the other cells are labeled as 1 to 34.

For example only, a target path is shown along which a target travels past various ones of the sensors. For example only, the target may be a person and the sensors may include motion detectors. As the target passes sensors within a cell, those sensors will transmit pulses toward the sink indicating that an event has been sensed within that cell. FIG. 19 also demonstrates that each cell may include multiple sensors. The sensors operate independently but are programmed such that each of the sensors within a single cell operates on behalf of the cell. Therefore, the sensors may not be individually addressable and may not include any unique identifier other than which number cell they are installed into.

Methods

Figure 20A:
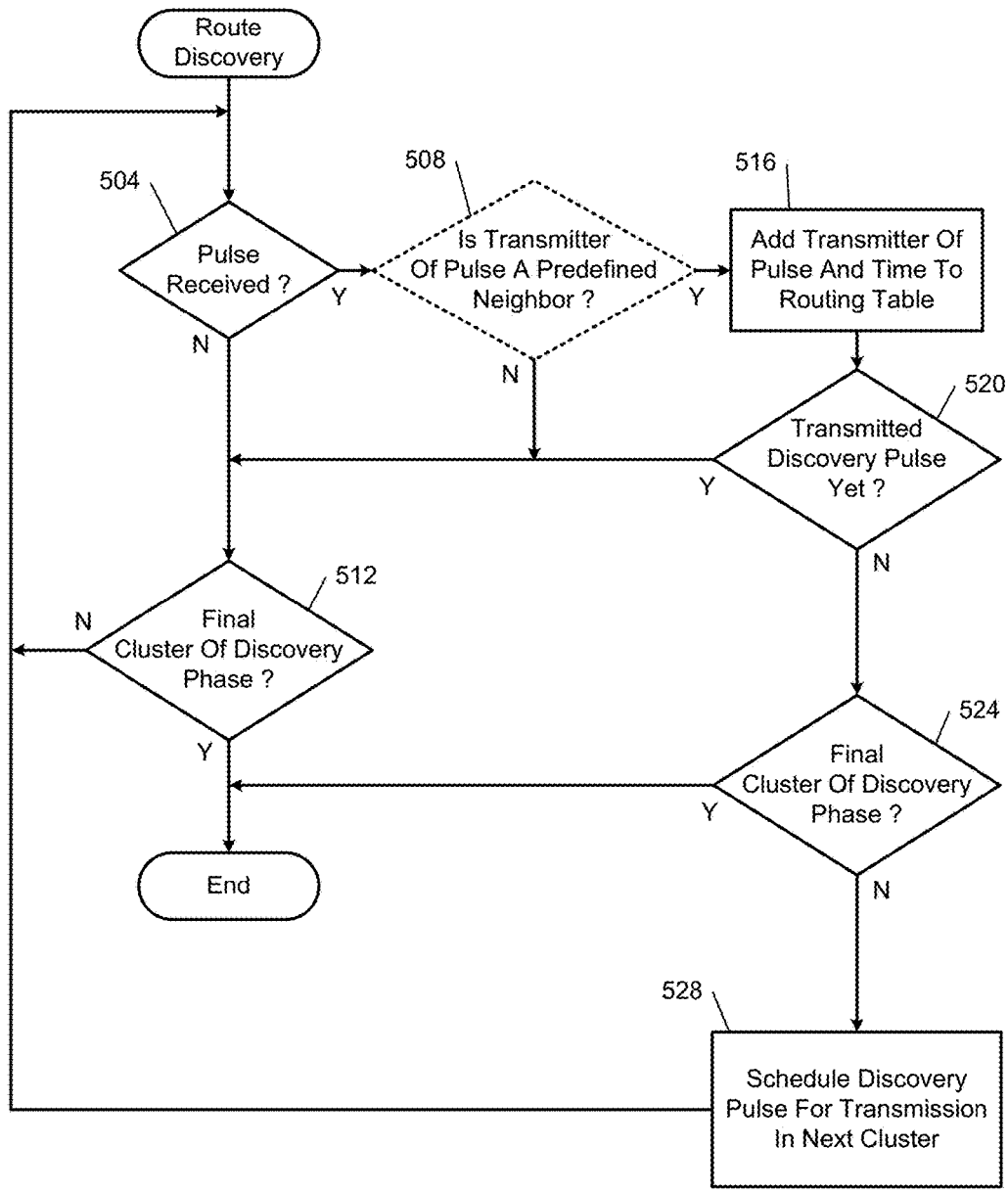
FIG. 20A is an example method of route discovery using the frame definition of FIGS. 15A-15D.

FIG. 20A shows an example method of performing route discovery using the frame definition of FIGS. 15A-15D. Route discovery begins during the route discovery portion of each frame at 504. At 504, control determines whether a pulse has been received in a cluster of slots of the route discovery area of the frame. If so, control transfers to 508; otherwise, control transfers to 512. At 512, if the final cluster of slots of the route discovery portion has finished, control ends; otherwise, control returns to 504.

At 508, control determines whether the transmitter of the pulse is a predefined neighbor of the current node. If so, control continues at 516; otherwise, control ignores the pulse and transfers to 512. In various implementations, the nodes may not be programmed with neighbor information, and therefore 508 may be omitted, with control proceeding directly from 504 to 516.

At 516, control adds an entry to the routing table based on the node that transmitted the received pulse. The transmitter node is therefore a next hop toward the sink. The time at which the pulse was received is also added to the routing table. An earlier time for a routing table entry indicates that the corresponding next hop is a quicker path to the sink. Control then continues at 520.

At 520, if the node has transmitted a discovery pulse already, control transfers to 512; otherwise, control transfers to 524, where control determines whether the final cluster of the discovery phase has finished. If so, control ends. Otherwise, control transfers to 528 to schedule transmission of a discovery pulse in the next cluster of slots of the route discovery area of the frame. Control then returns to 504.

Figure 20B:
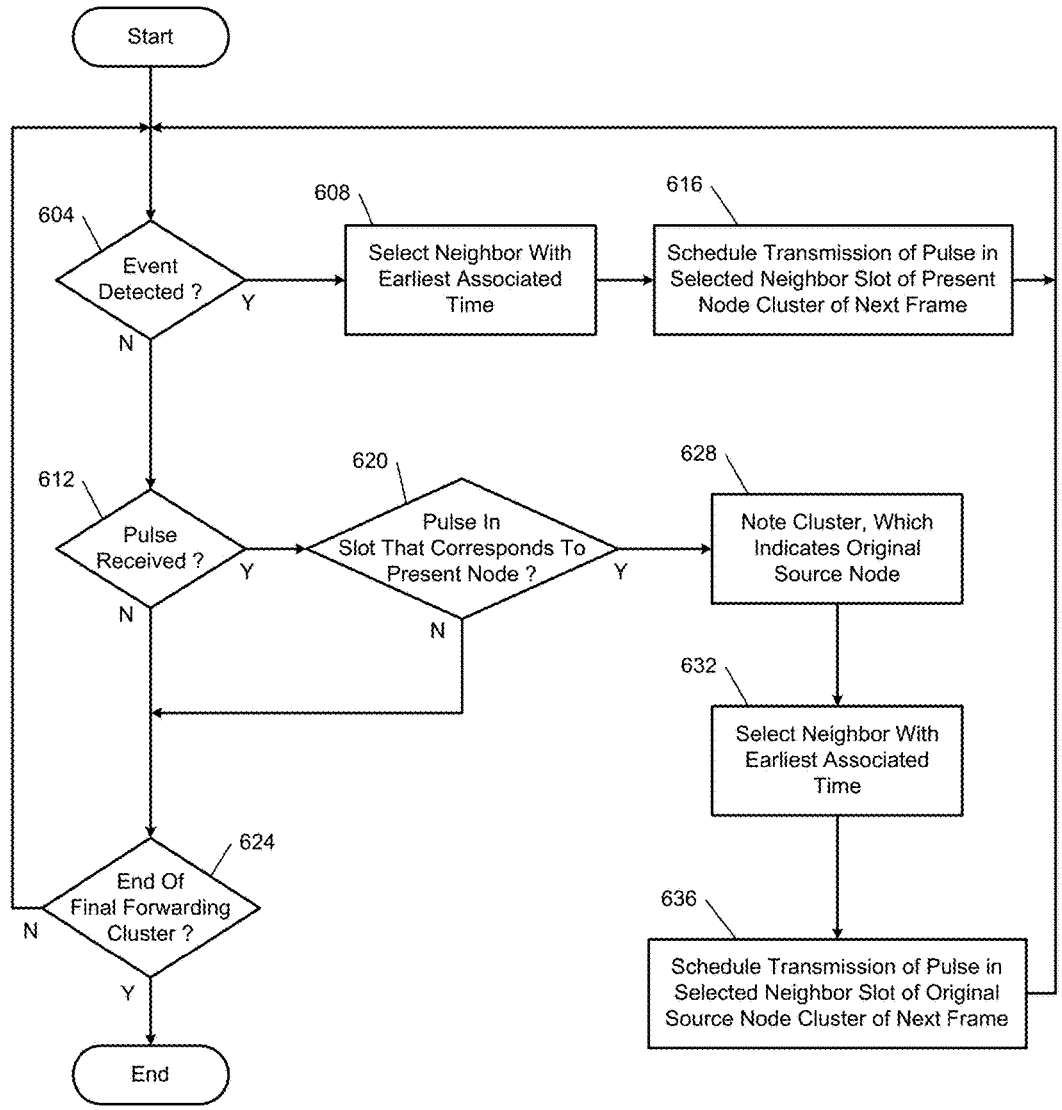
FIG. 20B is an example method of pulse generation and forwarding using the frame definition of FIGS. 15A-15D.

In FIG. 20B, example forwarding operation of a node using the frame definition of FIGS. 15A-15D is shown. Control begins with the pulse forwarding area of each frame at 604. Control determines whether an event has been detected by the node and, if so, control transfers to 608; otherwise, control transfers to 612.

At 608, control selects a best hop for transmission of the pulse toward the sink. This may be done by choosing the neighbor with the earliest associated time. Control continues at 616, where control schedules transmission of a pulse in the slot corresponding to the neighbor selected in 608 during the cluster of slots corresponding to the present node within the pulse forwarding area of the following frame. Control then returns to 604.

At 612, control determines whether a pulse has been received. If so, control transfers to 620; otherwise, control transfers to 624. At 620, control determines whether the slot in which the pulse was received corresponds to the present node. If so, control continues at 628; otherwise, control ignores the pulse and transfers to 624.

At 628, control notes the cluster in which the pulse was received, which indicates the original source node of the event resulting in that pulse. Control continues at 632, where a next hop is chosen to forward the pulse toward the sink. Control continues at 636, where control schedules transmission of a pulse in the slot corresponding to the neighbor selected in 632 during the cluster of slots corresponding to the original source node determined in 628 of the following frame. Control then returns to 604. In 624, control determines whether the end of the final cluster of slots of the pulse forwarding area of the frame has been reached. If so, control ends; otherwise, control returns to 604.

Modifications

Frame Definition

Figures 21A, 21B, 21C:
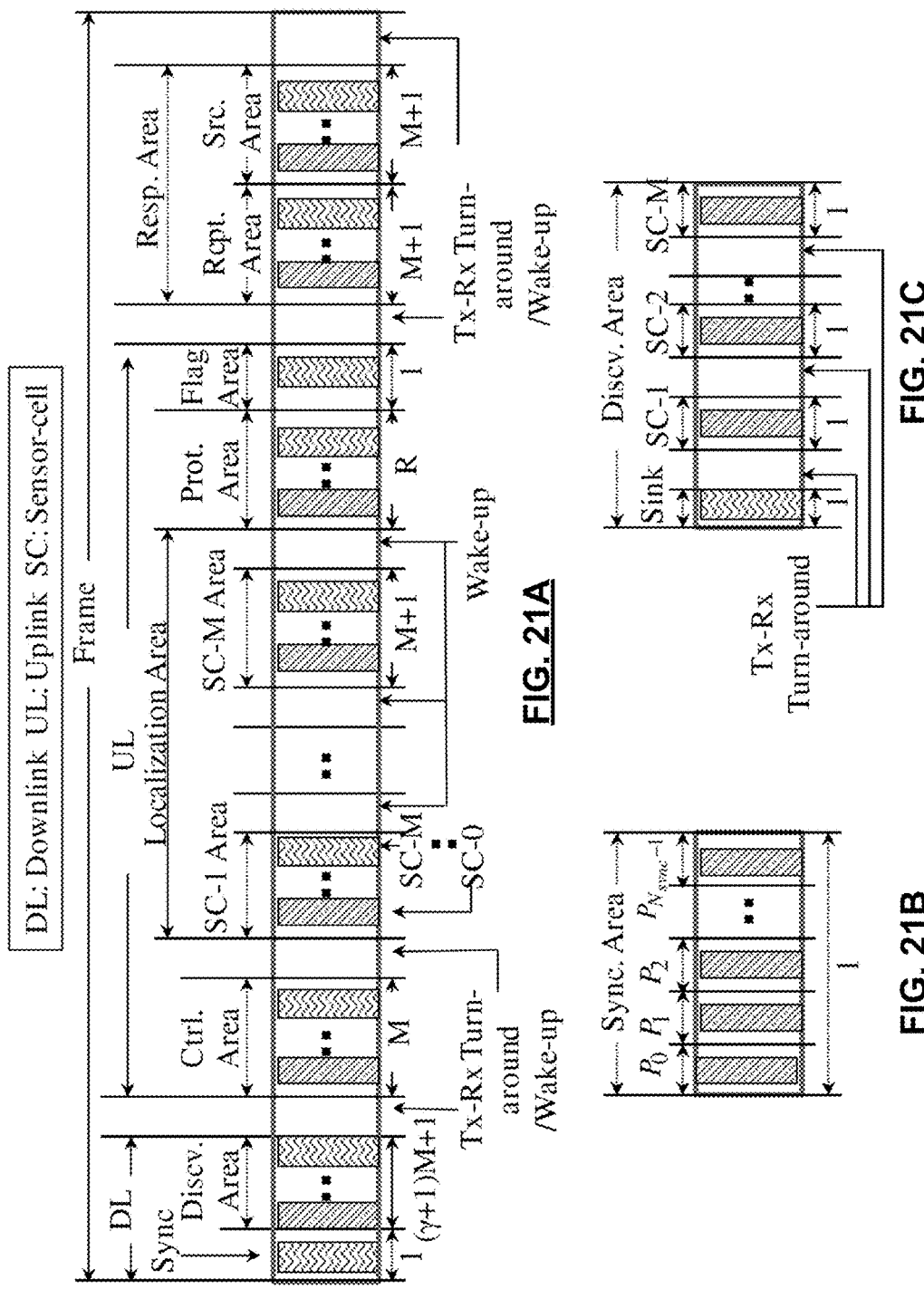
FIGS. 21A-21C are a graphical depiction of a frame definition for cell-based routing including false pulse and lost pulse protection features.

FIG. 21A shows an example of a frame definition including modifications made to the frame definition of FIGS. 15A-15D. The frame includes a downlink (away from the sink) area including a synchronization area shown in more detail in FIG. 21B and a discovery area shown in more detail in FIG. 21C. Note that the letter M is used to indicate the number of nodes in FIGS. 21A-21C.

The frame also includes an uplink (toward the sink) area including a control area for energy management, a localization area for pulse forwarding, a protection area for avoiding false positives, and a flag area for avoiding routing loops. The frame also includes a response area to increase reliability by providing a mechanism for a node to determine whether a transmitted pulse has been received.

Within each slot, the pulse is transmitted at the midpoint of the slot. This is to account for the fact that relative clock drift between nodes may occur in either direction. With the pulse targeted to the middle of the slot, clock drift and propagation delay that is less than half the size of the slot will not cause the pulse to encroach into an adjacent slot.

In FIG. 21B, the synchronization area is shown as having a number (Nsync) of pulse slots. In a simple case, Nsync is equal to 1, meaning that a single synchronization pulse is defined for the frame. When Nsync is greater than 1, each of the pulse positions will either include a synchronization pulse transmitted by the sink or will not contain a pulse.

In normal operation, each of the pulse positions may be occupied by a pulse. The sink may need to communicate data to the entire network at once, in which case some of the pulses may be absent. This provides a binary codeword for the sink to use when communicating with the entire network. In various implementations, the first pulse and last pulse within the synchronization area may always be transmitted. Therefore, the pulses in the middle can be used to transmit binary information. In these implementations, the sink can transmit $2^{Nsync-2}$ different messages per frame.

Although not shown in FIG. 21A, the binary codeword in the synchronization area may be used to indicate whether various portions of the frame will be omitted. For example only, one message transmitted in the synchronization area may instruct the nodes that discovery will be skipped for the current frame. The remaining areas of the frame may then shift earlier in time to occupy the nonexistent discovery area. In other implementations, the definition of the frame is invariable to prevent nodes from using an incorrect frame definition if they do not correctly receive the binary code in the synchronization area.

In FIG. 21C, the discovery area is seen to have a slot for a synchronization pulse from the sink as well as slots for each of the nodes. The sink can initiate route discovery by transmitting a pulse in the sink slot. This pulse is then received by neighboring nodes and in the following frame those nodes will transmit their own pulses within the respective slots of the discovery area.

Note that between the sink slot and the node slots are delay intervals. These intervals are chosen to allow a node's transceiver to transition from transmitting a pulse to receiving a pulse. For example, assume that node 1 has received a discovery pulse in the previous frame and therefore schedules transmission of a pulse in slot 1 of the discovery area of the current frame. After transmitting the pulse in slot 1 of the discovery area, node 1 should immediately change to listening in case node 2 transmits a pulse in the second slot. This delay interval is referred to as transceiver turn-around time and, if measured in units of slots, may be indicated as γ slots in length. Therefore, as indicated in FIG. 21A, the length of the discovery area is equal to one slot (for the sink) and M slots (one for each node) plus γ times M slots (the delay interval prior to each node slot) this can be written as (γ+1)*M+1.

The localization area is similar to the pulse forwarding section described above. Each node has a corresponding group of slots and an event that originated in a certain node is always transmitted within the group of slots corresponding to that node regardless of which node is currently transmitting the pulse. The slots within each group of slots indicate the destination (next hop) of the pulse. Therefore, there are M groups of slots corresponding to the M cells within which events may be detected. In each group of slots there are M+1 slots indicating the number of destinations (M nodes+1 sink) for each pulse to be transmitted.

Route Diversity

As described above, each node determines a next hop toward the sink based on the routing table. For example, the neighbor whose route discovery pulse was received first is likely the best (shortest) route back to the sink. To improve transport reliability, a node may transmit a pulse to multiple next hops. This is referred to as route diversity.

A variable δ defines the number of next hops to which a node will transmit a pulse. In the examples discussed above, δ is equal to 1, meaning that each pulse is only transmitted to a single next hop. If δ is greater than 1, the pulse will be forwarded to the best δ next hops. Because pulses that reach the sink are all received by the sink within the same group of slots, the sink is able to determine where the event occurred regardless of the route the pulse took in reaching the sink. As δ is increased, reliability is increased incrementally while energy use also increases.

Energy Management

Each node may alternate between three states: transmission, listening, and sleeping. During route discovery and pulse forwarding, each node begins in the listening state. During route discovery, a node switches from listening to transmitting for the slot assigned to that node in the discovery area. The node then transitions back to the listening state for the remainder of the discovery area.

During pulse forwarding (the localization area of the frame), the node enters the transmission state during the group of slots corresponding to that node. The node enters the listening state for the other groups of slots of the localization area. If the node has not transmitted a pulse during the localization area, the node may enter the sleep state during the response area. If the node does not have a pulse scheduled for transmission, the node may enter the sleep state for a new group of slots corresponding to that node in the localization area.

The control area of the uplink section of the frame has been added to allow nodes to enter the sleep state during portions of the localization area. The control area has M slots, one for each of the nodes in which an event can be detected. When a node is planning to transmit a pulse in the localization area corresponding to node X, a pulse is first transmitted in slot X of the control area. This pulse indicates to receivers that a pulse will be transmitted in the Xth group of slots of the localization area, and therefore the receivers should remain in the listening state during that group of slots.

The control area is therefore a cumulative representation of all the groups of slots in which a transmission will be made. Therefore, any slots of the control area in which a pulse was not received indicates to the node that the sleep state can be entered for the corresponding groups of slots. In addition to conserving energy by allowing intraframe sleeping, some false positive pulses will be filtered out. A false positive present in any of the groups of slots where a corresponding transmission is not announced in the control area will not be received because the nodes will be in a sleep state during those groups of slots.

Compression

As a power consumption enhancement, nodes may be programmed to delay transmitting a pulse for a randomly selected number of frames. Meanwhile, if a node detects that another node within the same cell has already transmitted a pulse indicating detection of an event, the detecting node recognizes that a pulse transmission is no longer necessary. This optimization will mean, depending on the number of nodes in a cell and the maximum delay interval, that most pulses detected by multiple nodes will only be transmitted by a single one of the nodes.

When a node detects multiple events in quick succession (e.g., detecting a moving target multiple times while it is within the detection range), it generates multiple pulses, each of which are independently forwarded to the sink. Temporal pulse compression can be used to remove this redundancy by ensuring that a node generates at most one pulse within a certain time duration, which is referred to as a Deactivation Period. Temporal compression is also applicable while pulse forwarding so that a node forwards at most one pulse originated from the same event area within a Deactivation Period.

False Positives

For additional protection against false positive pulses, a protection area R slots long is added to the frame. Each node that is transmitting a pulse in the localization area transmits one or more pulses in the protection area. The pulses in the protection area form an R-bit protection code. Because the transmissions of nodes within a transmission area overlap, the resulting pulses in the protection area are a logical OR of the R-bit protection codes generated by each node.

A receiver can calculate the R-bit protection codes that should have been transmitted based on pulses received in the localization area, and if a logical OR of the expected protection codes does not match the sequence of pulses actually received in the protection area, an error is declared. The error means that one or more pulses were lost and/or one or more false pulses were detected. As a result, all pulses received in the localization area are ignored based on the error.

The algorithm for determining the R-bit protection code can be as simple as, for each pulse to be transmitted in the localization area, taking the node number from which that pulse originated and performing a modulo R operation on that number. The resulting remainder from the modulo R operation determines a single bit to be set in the R-bit protection code.

The R-bit protection code is transmitted using a pulse to indicate a set bit, and an absence of a pulse to indicate a cleared bit. When a node is transmitting only a single pulse in the localization area, the node will similarly transmit only a single pulse within the protection area. Protection against a false positive pulses is increased as the ratio of R to number of nodes increases.

Acknowledgements

When a node transmits a pulse, there is no way for that node to know whether the pulse was received correctly. To provide this feedback, a response area has been added to the frame of FIG. 21A. The response area is divided into a reception sub-area and a source sub-area. When a node correctly receives a pulse in a frame, the node will schedule two pulses for transmission in the upcoming response area.

The first pulse is in the reception sub-area, and indicates the number of the node that correctly received that pulse. The second pulse is transmitted in the source sub-area, and corresponds to the originating node where an event was detected that lead to the received pulse. The reception sub-area includes a slot for each of the nodes that might receive a pulse, as well as the sink. The source sub-area includes M slots, one for each node that could have detected an event and originated a pulse. In various implementations, the number of slots in the source area is increased to one more than M.

When a sender detects expected pulses in the reception sub-area and the source sub-area indicating that the desired recipient correctly received the pulse, the sender may assume that the pulse is on its way to the sink. However, if a response is not received, the sender will retransmit the pulse in the following frame. After a certain number of retransmissions, the node may stop attempting to transmit the pulse in order to conserve energy. For example, the intended recipient node may have been damaged or depleted its power. Eventually another route discovery process will commence, and assuming there remains a route from the sink to the node, the node will be able to determine a new best route back to the sink.

Prioritized Routing

Instead of waiting for another route discovery process to be completed, nodes may use a prioritized routing strategy, where the first attempt of a transmission is made to the best next hop. If the best next hop does not provide a successful response, the node can next attempt a retransmission to the second-best next hop.

In a case where the diversity $\delta$ is greater than 1, this prioritized routing is performed in groups of $\delta$ next hops. In other words, the first attempted transmission is made to the $\delta$ best next hops. If no response is successfully received, the following $\delta$ next hops will be used for the following transmission. Once all of the potential hops in the routing table are exhausted, the attempted transmissions will wrap back to the best next hop.

For example only, consider a node that has five potential next hops in its routing table, in increasing distance from the sink, and $\delta$ is three. The node will first attempt transmission of a pulse to the first three next hops. If no response is successfully received, the node will then attempt retransmission using the fourth and fifth hops in the routing table as well as the first hop. If a response is still not successfully received, the node will attempt to retransmission to the second, third, and fourth hops.

Loop Avoidance

Figure 22:
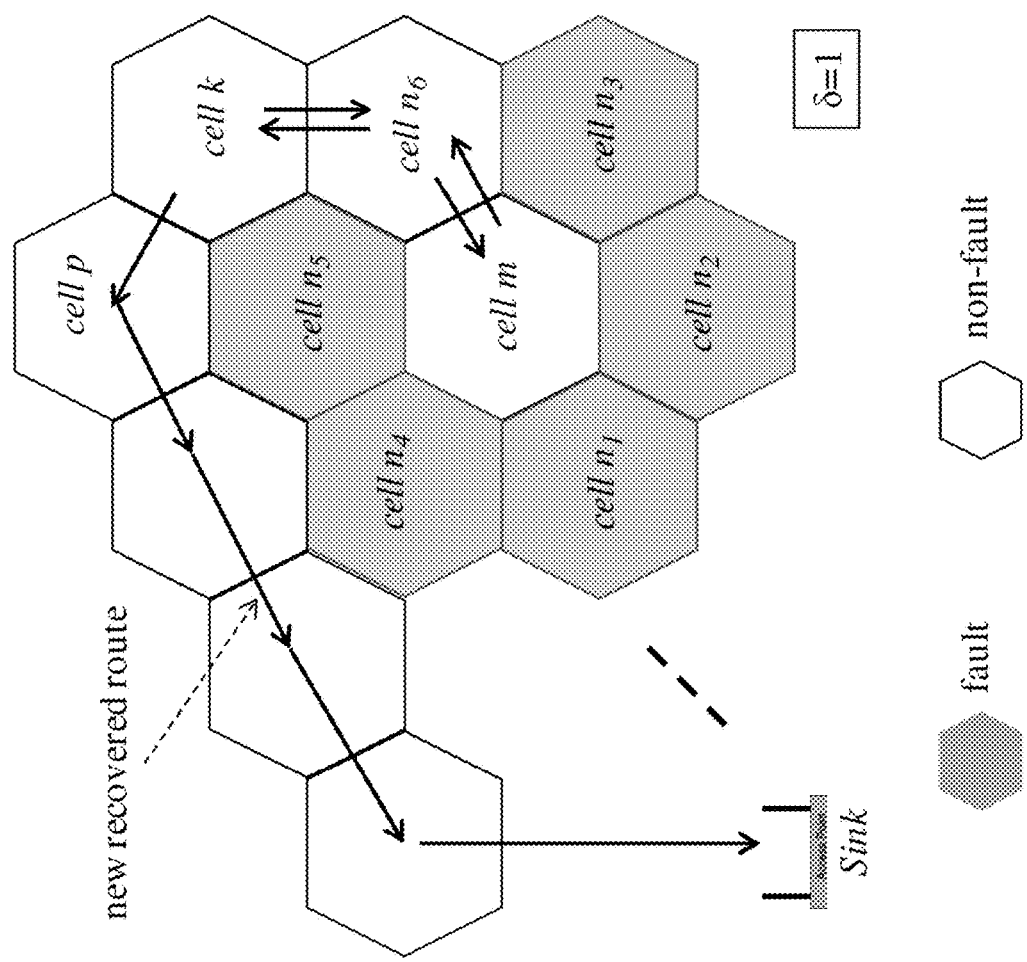
FIG. 22 is a graphical illustration of a routing loop problem and its resolution.

In FIG. 22, an example of a difficult routing situation is shown. At the moment in time depicted in FIG. 22, cells $n_1$, $n_2$, $n_3$, $n_4$, and $n_5$ are experiencing a fault, which may be temporary or permanent. Cell m is surrounded by cells $n_1$-$n_5$. Cell m may have previously had routes to the sink through a number of cells, including cell $n_1$ and cell $n_2$. Similarly, cell $n_6$, which is not in a fault condition, may have a best route to the sink via cell m.

If cell m detects an event and needs to transmit a pulse to the sink, cell m transmits a pulse to the best next hop, which may be cell $n_1$ in this case. However, because cell $n_1$ is experiencing a fault, no successful response is returned to cell m. Eventually, using prioritized routing, cell m will transmit the pulse to cell $n_6$.

When cell $n_6$ forwards that pulse, cell $n_6$ may attempt to forward that pulse back to cell m, as cell m may be the best next hop toward the sink. Cell $n_6$ is unaware of the failure of cell $n_1$. Cell m, however, will not provide a successful response to the pulse because cell m is in a transmit state when cell $n_6$ forwards the pulse. Further, cell m may be programmed not to respond to pulses resulting from events that originated in cell m.

Cell $n_6$, therefore, uses prioritized routing and eventually attempts to transmit the pulse to cell k. Cell k forwards the pulse to the best next hop, which in the case may be back to cell $n_6$. This creates a routing loop, preventing the pulse from reaching the sink. To resolve some of these loops, a flag area is added to the uplink area of the frame in FIG. 21A.

The flag area includes a single slot that is used as follows. In the routing table of a node (in this case, cell $n_6$), the node groups next hops into two groups, one that is closer to the sink than $n_6$ and one group that is further from the sink than $n_6$. When cell $n_6$ is going to transmit a pulse in the localization area, cell $n_6$ determines whether the destination (in this case, cell k) is further from the sink or closer to the sink.

In FIG. 22, cell k was likely further from the sink according to the routing table. Because a pulse is being transmitted to a node further from the sink, a pulse is also transmitted within the flag area slot. When the diversity number $\delta$ is greater than 1, if any of the destinations for the pulse are further from the sink than the transmitter, a pulse is transmitted during the flag area slot.

When cell k receives the pulse from cell $n_6$, with the flag being set by the transmitted pulse in the flag area, cell k will examine previous pulse transmission records. Each node may maintain pulse transmission records from within a specified period of time, which may be defined in units of frames. When a node receives a flagged event pulse, the node determines whether that pulse had already been sent to any of the next hops. If so, the node forwards the pulse to a different next hop or next hops. Otherwise, the node operates in the default manner, which is to initially send the pulse to the best next hop.

In the example of FIG. 22, cell k determines whether a pulse originating in cell m has been transmitted within the predetermined period. In the case of a routing loop, the answer will be yes because the pulse will have been transmitted from cell k to cell $n_6$. Because the answer is yes, cell k transmits the pulse to a further one of the next hops (in this case, cell p). This allows the pulse to escape from the routing loop, and in the example of FIG. 22, reach the sink along a new route.

When the route diversity number $\delta$ is greater than 1, a node determines whether a pulse has been sent to the first group of $\delta$ next hop cells, and if so, forwards the pulse to the following group of $\delta$ next hop cells. Eventually, the route discovery process should establish new routing table entries in which cell m recognizes the best next hop to the sink is through cell $n_6$, cell $n_6$ recognizes that the best next hop is cell k, and cell k recognizes that the best next hop is cell p.

Methods

Figure 23:
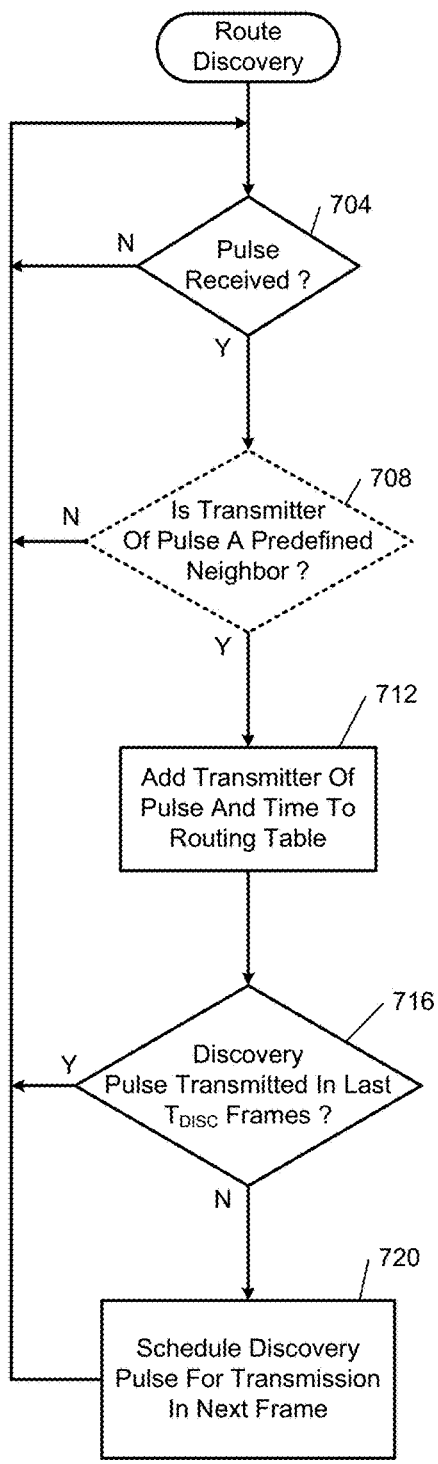
FIG. 23 is an example method of route discovery using the frame definition of FIGS. 21A-21C.

In FIG. 23, an example method of performing route discovery based on the frame definitions in FIGS. 21A-21C is shown. Control begins at 704, where control determines whether a pulse has been received. If so, control transfers to 708; otherwise, control remains at 704. At 708, control determines whether the transmitter of the discovery pulse is a predefined neighbor of the node. If so, control transfers to 712; otherwise, control returns to 704. In various implementations, neighbors may not be predefined, and therefore 708 is omitted, and control proceeds directly from 704 to 712.

At 712, control adds an entry into a routing table based on the transmitter of a discovery pulse. The entry also includes a time stamp where earlier time stamps indicate more direct routes to the sink. Control continues at 716, where control determines whether a discovery pulse has been transmitted within a predetermined number of prior frames. For example only, the predetermined number may be named $T_{DISC}$, which is equal to the number of frames between the sink's initiation of each discovery process.

At 716, if the node has already transmitted a discovery pulse within this window, control returns to 704; otherwise, control transfers to 720 to schedule transmission of the discovery pulse. The discovery pulse will be scheduled for transmission in the discovery area of the next frame. Control then returns to 704.

Figure 24A:
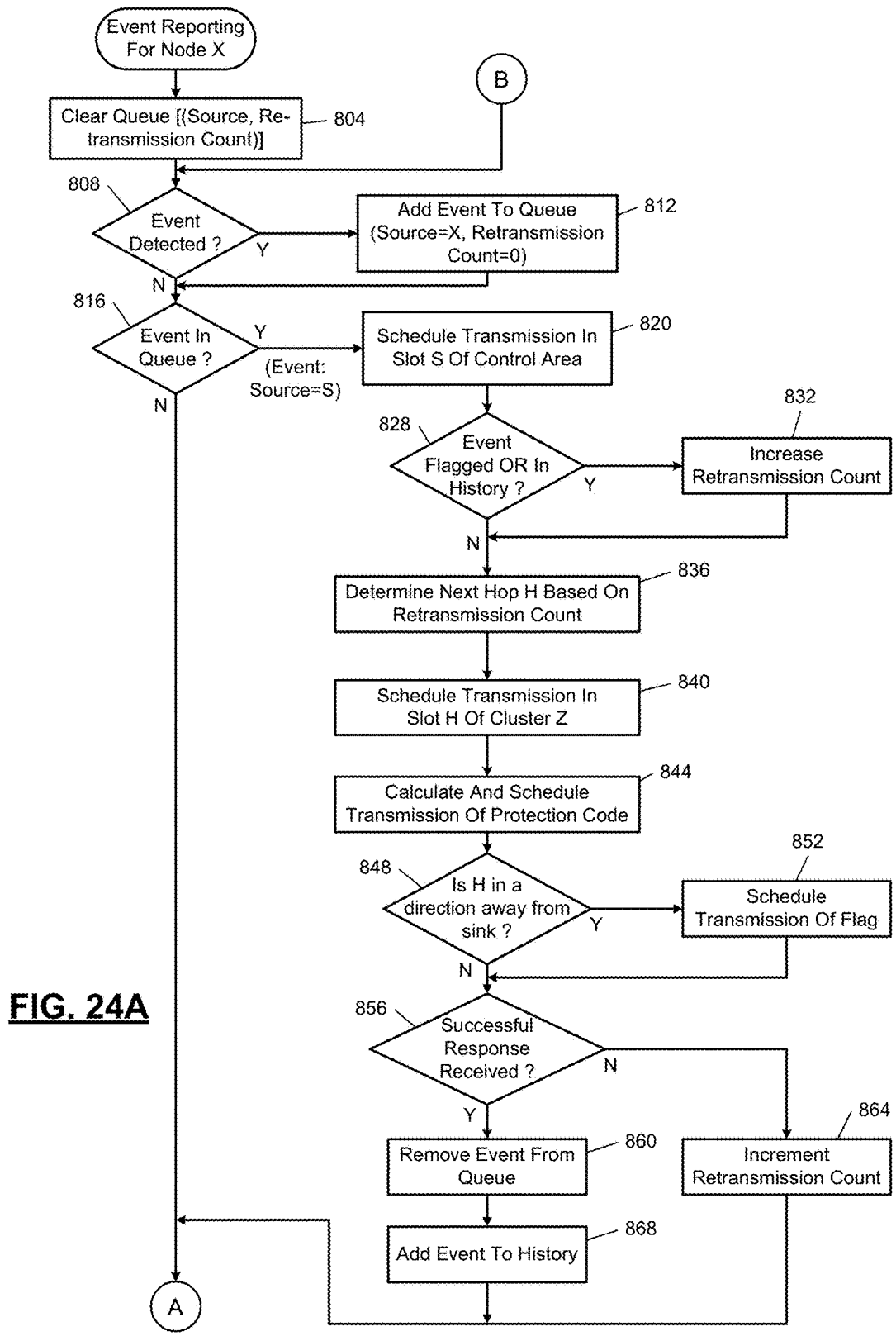
FIGS. 24A-24B are an example method of pulse generation and forwarding using the frame definition of FIGS. 21A-21C.
Figure 24B:
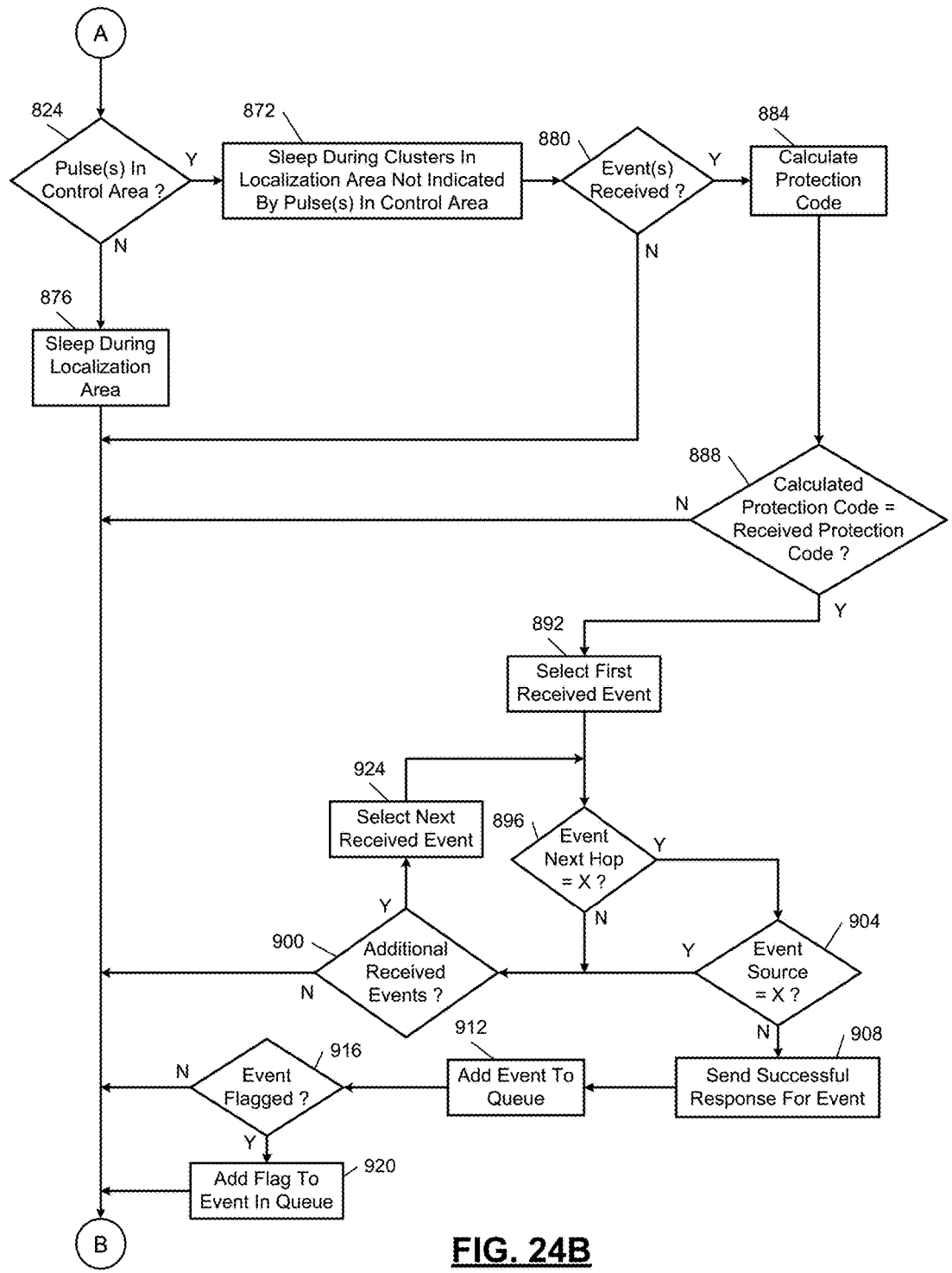

FIGS. 24A-24B together describe an example method of event reporting and forwarding according to the frame definitions of FIGS. 21A-21C. The method is described for a node labeled as node X. Control begins at 804, where a transmission queue is cleared. The queue is an array of tuples, with each tuple including a source node and a retransmission count.

Control continues at 808, where if an event is detected, control transfers to 812; otherwise, control transfers to 816. At 812, the event that was detected at node X is added to the queue. The source of the event is therefore X and the retransmission count is initially zero. Control then continues at 816. At 816, control determines whether there are any events in the queue. If so, control transfers to 820; otherwise, control transfers to 824 in FIG. 24B via the circled letter A.

At 820, the next event in the queue to be transmitted has a source stored in variable S. Therefore, at 820, control schedules transmission in slot S of the control area. This indicates to other nodes that they should be in a listening state during that cluster of slots of the localization area to receive the forwarded pulse.

Control continues at 828, where control determines whether the event that is about to be transmitted is within a recent history data structure or if the event as received was flagged. If so, control transfers to 832; otherwise, control transfers to 836. A flag indicates that a routing loop may be present, and therefore, instead of a standard next hop, an alternative next hop should be used to retransmit the pulse.

This may be accomplished by, for example, increasing the retransmission count. For example, the retransmission count may cause the node to iterate through a list of next hops. With a retransmission count of zero, a pulse may be transmitted to the best next hop. When the retransmission count is one, the pulse will be retransmitted to the second-best next hop. Therefore, if the history indicates that a pulse relating to the event was successfully transmitted to the best next hop as well as to the second-best next hop, control may set the retransmission count to two, which will cause the third-best next hop to be tried.

Even if the event transmission is not stored in recent history, if the event was received with a flag, control may set the retransmission count to one to attempt to avoid creating a routing loop. In various implementations, adjusting the retransmission count may be performed only when both the event is present in recent history and the event had been flagged. In any case, control then continues at 836.

At 836, control determines the next hop, labeled as H, based on the retransmission count. Although a single next hop is shown in the flowcharts, when the route diversity parameter δ is greater than 1, a pulse may be transmitted to multiple next hops at once. For example only, with a retransmission count of zero and a δ of two, the pulse may be transmitted to the best two next hop entries in the routing table. With a retransmission count of one, the pulse may be transmitted to the third and fourth entries in the routing table.

Control continues at 840, where control schedules transmission of a pulse in slot H of cluster S of the localization area. Control continues at 844, where control calculates a protection code and schedules transmission of that protection code following the localization area.

Control continues at 848, where control determines whether next hop H is located further away from the sink than is node X. For example only, this may be determined if the earliest entry in the routing table, with a next hop of H, is later than the best next hop in the routing table. If H is in a direction that is away from the sink, control transfers to 852 to schedule transmission of a pulse in the flag area of the frame. In either case, control continues at 856.

At 856, if an indication of successful response has been received that matches the transmitted pulse, control transfers to 860; otherwise, control transfers to 864. At 860, control removes the event from the queue and continues at 868, where the successful transmission of the event, along with the retransmission count at which success was achieved, is added to the history structure. Control then continues at 824 in FIG. 24B. At 864, control increments the retransmission count for the event, and control continues at 824 in FIG. 24B.

At 824, control determines whether one or more pulses were detected in the control area of the frame. If so, control transfers to 872; otherwise, control transfers to 876, where the transceiver can sleep during the upcoming localization area because no reception is expected. If a transmission is scheduled during one of the clusters, that control area will have a pulse and the transceiver will be in transmit mode during those clusters of the localization area. Control then continues at 808 in FIG. 24A via the circled letter B.

At 872, control sleeps during clusters in the localization area that were not indicated by corresponding pulses in the control area. Control continues at 880, where if one or more events are received in the localization area, control transfers to 884; otherwise, control continues at 808 in FIG. 24A.

At 884, control calculates protection codes for each of the events that were received, and creates a combined calculated protection code based on the logical OR of the individual protection codes. Control continues at 888. If the calculated protection code matches the received protection code, control continues at 892; otherwise, control returns to 808 of FIG. 24A.

At 892, control selects a first event of the received events, and continues at 896. At 896, control determines whether the next hop specified in the selected event is equal to X. If not, the event is discarded and control continues at 900; otherwise, control transfers to 904. At 904, control determines whether the source of the event is equal to X. If so, the pulse has returned in a loop back to node X, and is therefore discarded as control transfers to 900. If the source of the event is other than node X, control transfers to 908.

At 908, control sends an indication of a successful response for the selected event. Control continues at 912, where the received event is added to the queue for forwarding. Control continues at 916, where if a flag accompanied the event, control transfers to 920; otherwise, control returns to 808 in FIG. 24A. At 920, control adds a flag attribute to the event in the queue, and returns to 808 in FIG. 24A.

At 900, control determines whether there are additional received events to analyze. If so, control transfers to 924; otherwise, control returns to 808 in FIG. 24A. At 924, control selects the next one of the received events and continues at 896.

Point-to-Point Routing

Actuators

Figure 25:
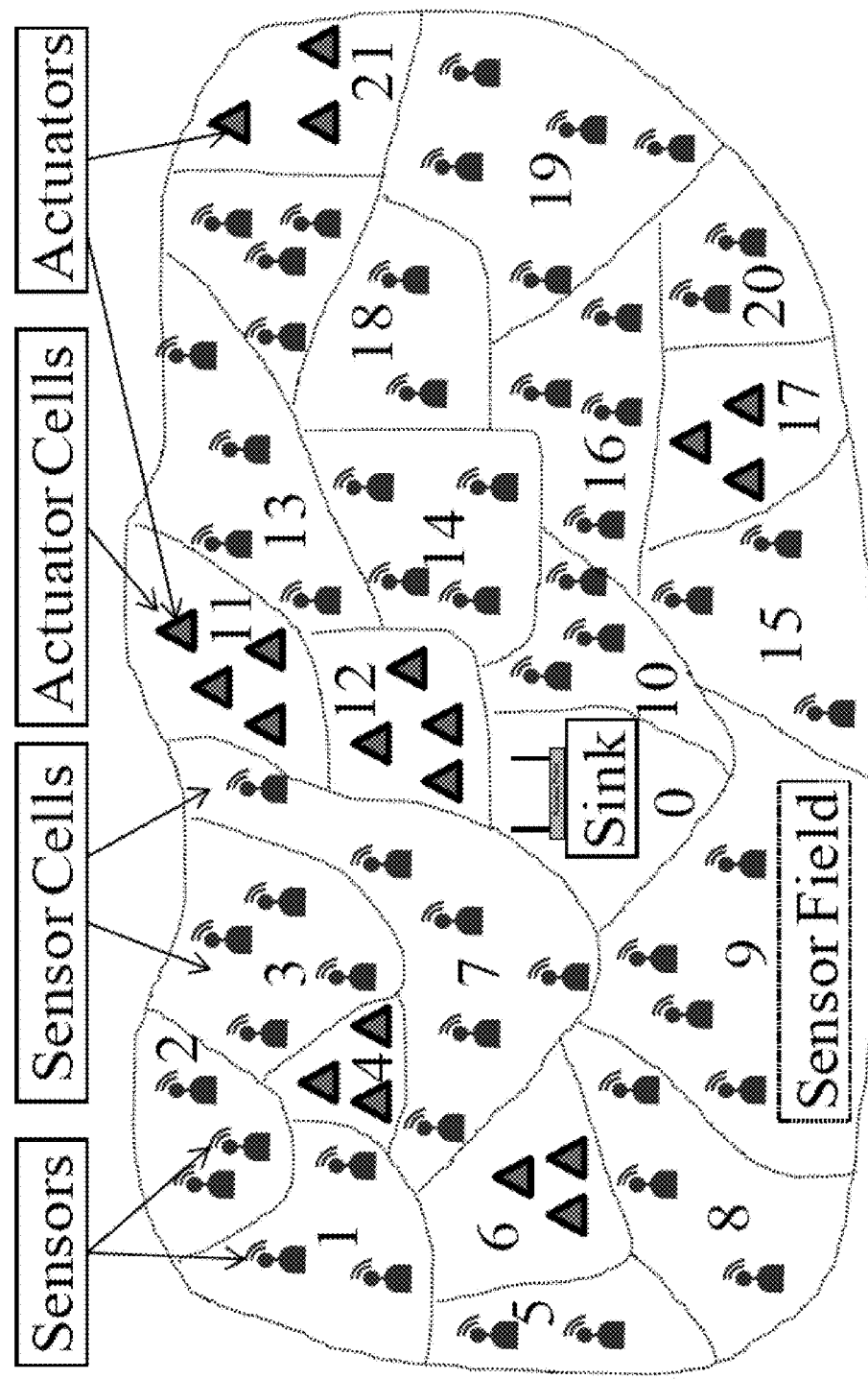
FIG. 25 is a graphical example of a cellular sensor network layout including both sensors and actuators.

FIG. 25 is an example wireless sensor network, including both sensor nodes and actuator nodes. In FIG. 25, each cell is shown as being a sensor cell containing only sensor nodes, or an actuator cell containing only actuator nodes. However, in various implementations, cells may include both sensor nodes and actuator nodes. According to the previously-described cellular routing, each sensor cell would communicate information to the sink, and the sink would send commands out to actuators. In other words, there would be no direct communication between sensors and actuators.

There may be applications where minimal hierarchical coordination and processing is required, meaning that sensors may be able to communicate directly to actuators. For example only, in a fire suppression system, fire detection sensors may communicate directly to sprinkler system actuators. The latency involved and potential disruption due to communication or device failure when sending data to the sink and then relaying commands back out to actuators might make the sink-oriented architecture less desirable in these applications. See also Q. Huo, B. Dong, and S. Biswas, "Self-Organized Pulse Switching for Binary Sensing and Actuation," Proceedings of the SPIE, Volume 8753 (2013), the entire disclosure of which is hereby incorporated by reference into this application.

Frame Definition

Figure 26A:
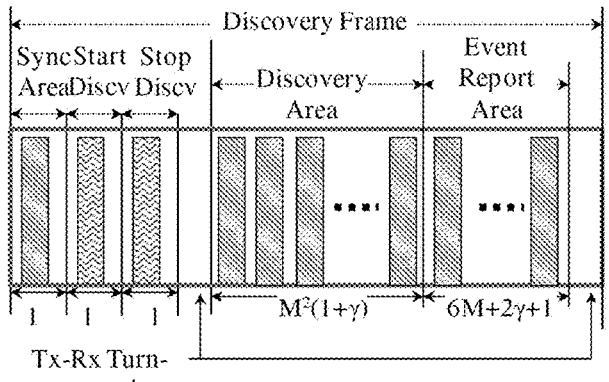
FIGS. 26A-26D are a graphical depiction of definitions for a pair of frames that allow direct point-to-point addressing.
Figure 26B:
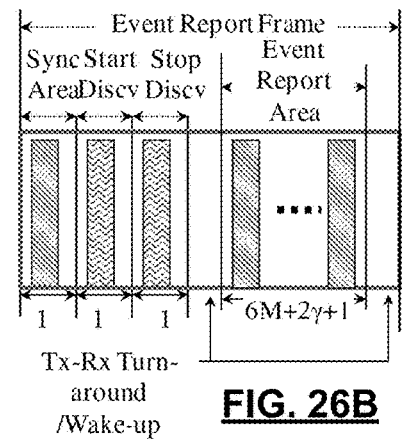

In FIGS. 26A-26D, an example frame format is discussed that permits one cell to communicate directly to another cell without relying on the sink—i.e., bypassing the sink unless the sink lies on a best path to the other cell. FIGS. 26A and 26B are alternative frame definitions that are alternately used based on instructions from the sink.

The frames in both FIGS. 26A and 26B begin with the same three slots. The first slot is a synchronization pulse for synchronizing all of the nodes in the network. The next two slots allow the sink to instruct the nodes whether the frame of FIG. 26A (a discovery frame) or the frame of FIG. 26B (an event reporting frame) will be used. The discovery frame allows for route discovery from each node to every other node. The event reporting frame allows nodes to report events to each other as well as to the sink. In various implementations, including the one shown in FIG. 26A, the discovery frame may also include an event reporting area so that events can report it even during a discovery process.

Following the synchronization slot is a start discovery slot, which is then followed by a stop discovery slot. When the sink transmits a pulse in the start discovery slot, the nodes are instructed to use the discovery frame definition up until the frame in which the sink sends a pulse in the stop discovery slot. In other words, a pulse in the start discovery slot indicates that the discovery frame of FIG. 26A will be used while a pulse in the stop discovery slot indicates that a slot in the event reporting frame of FIG. 26B will be used.

In some implementations, a single pulse will be sent in the start discovery slot to indicate that the discovery frame of FIG. 26A will be used until the nodes are instructed otherwise. A node that, for some reason, does not properly receive the start discovery pulse may not know to switch from the event reporting frame to the discovery frame. Therefore, in other implementations, the sink transmits a pulse in the start discovery slot during each frame that is defined as a discovery frame and transmits a pulse in the stop discovery slot for each frame defined as an event reporting frame.

Figure 26C:
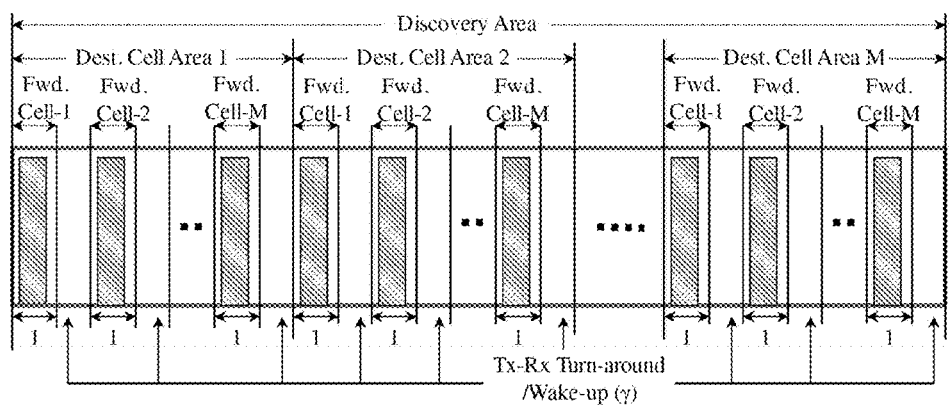

The sink initiates discovery periodically. The frequency of route discovery trades off rapid adaption to changing conditions against increased energy usage in performing route discovery. FIG. 26C shows an example of the discovery area of FIG. 26A. For a network having M cells (each cell having one or more sensors and/or one or more actuators) there are M clusters of M slots each.

In between each slot is a delay interval that allows node transceivers to switch from transmitting to receiving. When measured in increments of a slot, this delay is referred to as γ. Route discovery is essentially performed by having each node broadcast a signal unique to that node. As the unique signal propagates throughout the network, every other node can determine the direction of arrival of that signal, and therefore determine a route back to that node.

Because of the time multiplexing implemented in the discovery area of FIG. 26C, all of these unique signals can be broadcast simultaneously and can propagate simultaneously throughout the network. Using cell 1 as an example, cell 1 transmits a pulse in slot 1 of cluster 1 of the discovery area. Cluster 1 is dedicated to the unique signal from cell 1, and each node that relays that signal from cell 1 will relay the signal in cluster 1 of the discovery area of each frame.

When cells that are neighbors of cell 1 detect the pulse in cluster 1, the neighboring cells recognize that the pulse indicates a route to cell 1. The slot within the first cluster indicates what that route is. Because these cells are direct neighbors of cell 1, the pulse is in slot 1 and the neighbor cells recognize that a route to cell 1 is simply through cell 1. For example, cell 5 (a neighbor of cell 1 in the example of FIG. 25) will now have a routing table entry indicating that a pulse could be sent to cell 1 where the next hop is cell 1 itself.

In the discovery area of the following frame, cell 5 will forward on a pulse in cluster 1 indicating a route to cell 1. Node 5 will place the pulse in the fifth slot of the first cluster. In this way, when a neighbor of cell 5, such as cell 8, receives this pulse, cell 8 can determine that the route to cell 1 includes a next hop of cell 5. Each of the other clusters corresponds to the remaining nodes, and because each cluster is dedicated to routes to a specific node in each frame, any given node may identify a number of routes to other nodes as well as advertise a number of routes to various nodes.

Figure 26D:
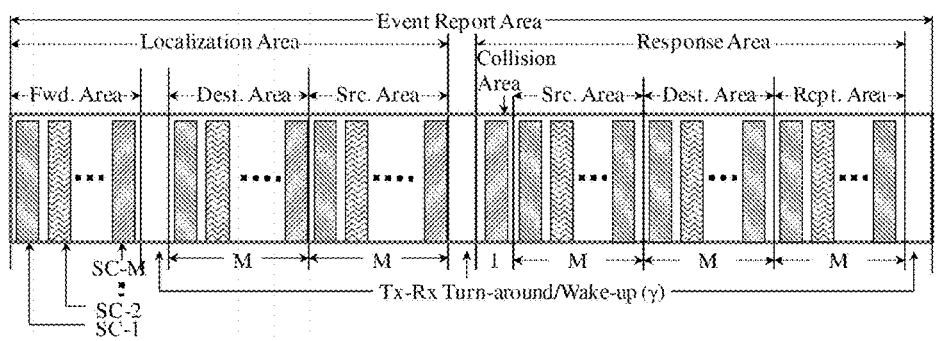

In FIG. 26D, the event reporting area of FIG. 26B is shown in detail. Because of the discovery process, each node knows one or more next hops through which to send a pulse to a specified destination. The event reporting area includes a localization area, which includes a forwarding sub-area, a destination sub-area, and a source sub-area.

When a node sends or forwards an event pulse the forwarding sub-area indicates the next hop to which the pulse is being sent. The destination sub-area indicates the final destination of the event pulse, and the source sub-area indicates the node that originated the event pulse. To allow communication to the sink, the destination sub-area and the forwarding sub-area can each be increased by one slot.

Similarly, to allow for transmissions by the sink, the source sub-area can be increased by one slot.

As a specific example of forwarding an event, consider node 5 transmitting an event to node 9 using a next hop of node 8, where the event originated at node 1. Node 5 would therefore transmit a pulse in the 8th slot of the forwarding sub-area, transmit a pulse in the 9th slot of the destination sub-area, and transmit a pulse in the 1st slot of the source sub-area.

In other words, to transmit an event, a node transmits three pulses with only one pulse in the forwarding sub-area, only one pulse in the destination sub-area, and only one pulse in the source sub-area. Nodes cannot transmit more than one event at a time because then two pulses would be present in each sub-area and there is no way of indicating which pulse in the forwarding sub-area corresponds to which pulse in the destination sub-area, and similarly which pulse in these areas corresponds to which pulse in the source sub-area. As a result, if nodes in close proximity each attempt to transmit an event a collision occurs, as discussed in more detail in FIG. 27A.

As shown in FIG. 26D, the event reporting area includes a response area. The response area is used by nodes who detected pulses in the localization area to respond as to whether an event was successfully received. A collision sub-area includes a slot that can be used by a receiving node to indicate that a collision has occurred. A node determines that a collision occurred if more than one pulse is received in any of the forwarding sub-area, the destination sub-area, or the source sub-area of the localization area. If no collision is detected, the node does not transmit a pulse in the type sub-area.

If a node has successfully received an event during the localization area, the node will transmit corresponding pulses in the response area. Specifically, the source sub-area of the response area indicates the originating source of the event that has just been received, the destination sub-area indicates the ultimate destination of the event that has been successfully received, and the reception area indicates the node number that has successfully received the event.

When a transmitting node receives a response matching the transmitted event, further retransmission is stopped. If no response is received, the node will attempt to retransmit, potentially using prioritized routing as described above to try different next hop nodes. However, if a transmitting node receives a pulse in the collision sub-area of the response area, this indicates that a collision has occurred and therefore the transmitting node will back off before attempting to retransmit.

This backoff may be randomized so that if multiple nodes are backing off from a collided transmission, the nodes are less likely to attempt to retransmit at the same time. The backoff interval can be expressed in number of frames and can be as low as one, indicating that retransmission will be attempted in the following frame, or up to an upper limit. The upper limit may be increased if more than one collision has occurred consecutively. Increasing the upper limit decreases the chances that yet another collision will occur.

Collisions

Figure 27A:
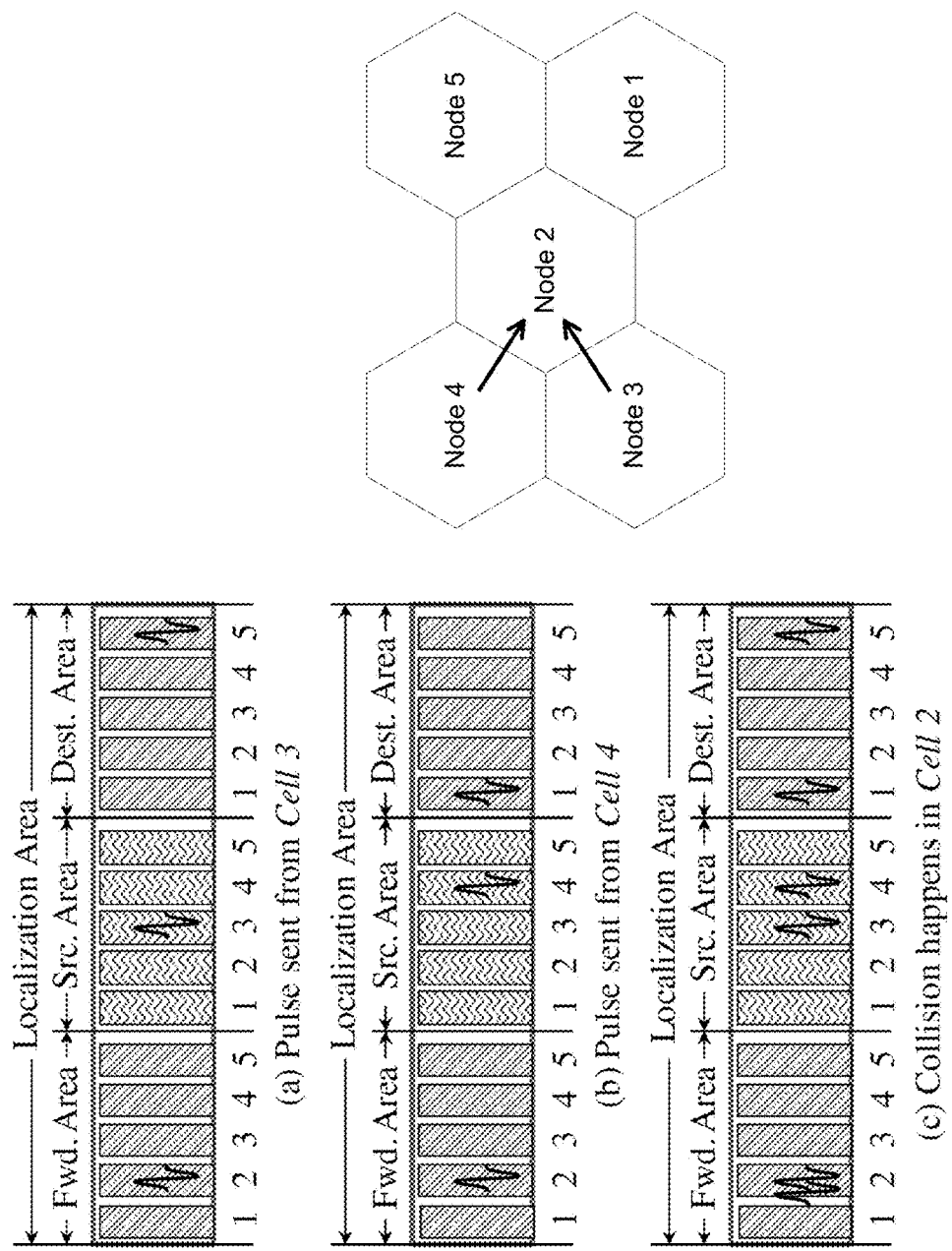
FIGS. 27A-27B are graphical examples of transmission collisions.

FIG. 27A is a graphical example of an example collision occurring. Cell 3 is attempting to transmit an event that originated in cell 3. For this reason, cell 3 transmits a pulse in the third slot of the source sub-area. The destination of the event is cell 5, and therefore cell 3 transmits a pulse in the fifth slot of the destination sub-area. The next hop in the routing table of cell 3 for a destination of cell 5 is cell 2. Therefore, cell 3 transmits a pulse in the second slot of the forwarding sub-area.

Meanwhile, cell 4 has detected an event, and therefore transmits a pulse in the fourth slot of the source sub-area. The destination of the event is cell 1, and therefore cell 4 transmits a pulse in the first slot of the destination sub-area. The next hop in the routing table of cell 4 for a destination cell of cell 1 is cell 2. Therefore, in the forwarding sub-area, cell 4 transmits a pulse in the second slot.

If cell 3 and cell 4 are each transmitting their respective events in the same frame, cell 2 receives a combination (essentially a logical OR) of the two events. In other words, a single pulse is received in the second slot of the forwarding sub-area. However, pulses are received in both the third and fourth slots of the source sub-area. Further, pulses are received in the first and fifth slots of the destination sub-area.

As a result, although cell 2 recognizes that at least two events were forwarded to cell 2, cell 2 is unable to identify which pulse in the source sub-area matches which pulse in the destination sub-area. Cell 2 therefore recognizes that a collision has occurred, and in the response area following the localization area transmits a pulse in the collision sub-area to indicate that a collision has occurred. Cells 3 and 4 will therefore choose a random number of frames to back off before retransmitting their respective events.

Figure 27B:
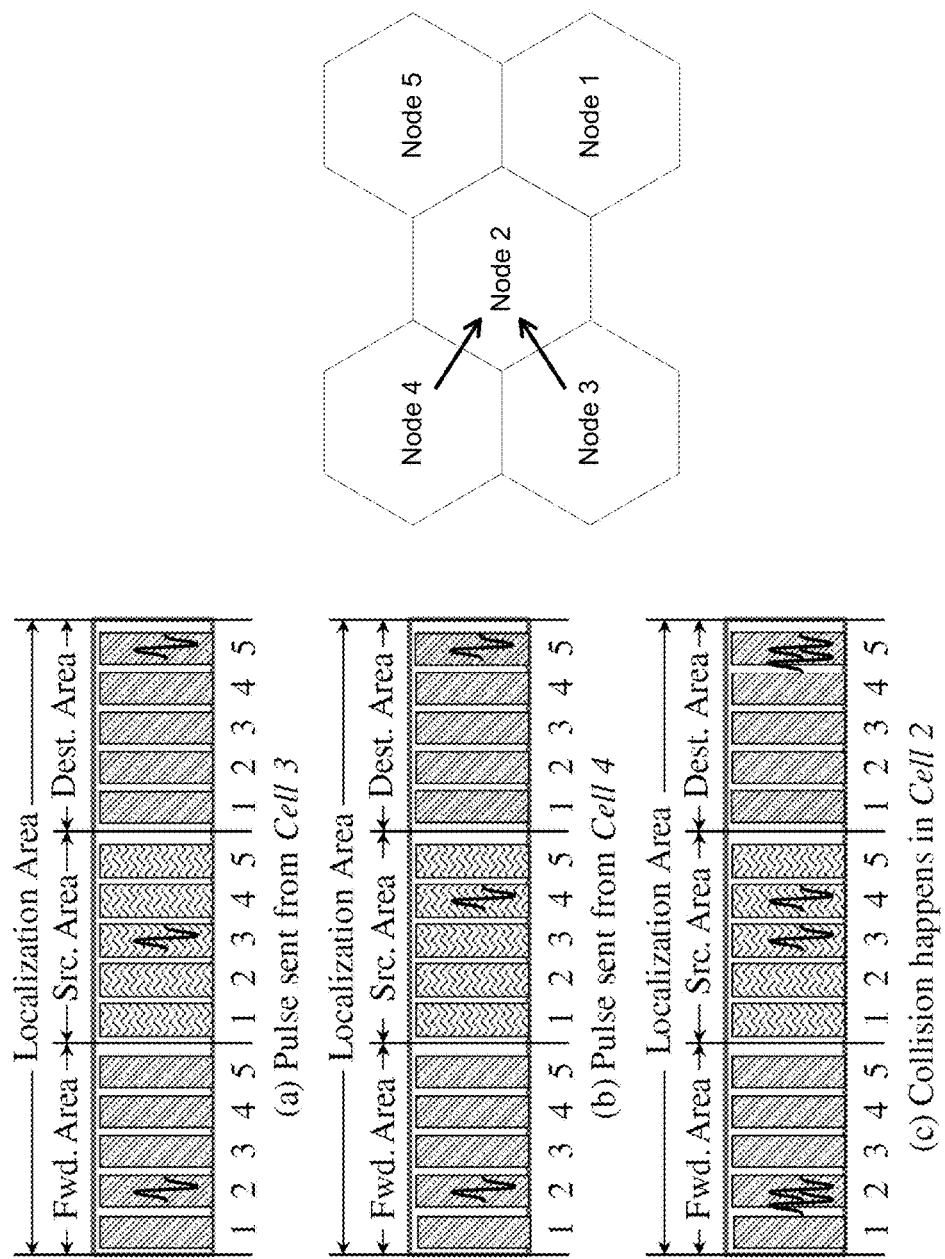

In various implementations, a collision may not be declared if multiple pulses are received in only one of the sub-areas. In other words, if only a single pulse is received in the other two sub-areas, the receiving node can uniquely identify the two events that were received simultaneously. For example only, see FIG. 27B, where both cells 3 and 4 are transmitting events to cell 5 via cell 2.

Therefore, cell 2 receives a single stacked pulse in the second slot of the forwarding sub-area and a single stacked pulse in the fifth slot of the destination sub-area. Meanwhile, in the source sub-area, cell 2 receives pulses in slots 3 and 4. Cell 2 can infer that two events, each having a destination of cell 5 and each being sent to cell 2, have corresponding sources of cell 3 and cell 4. This assumes that neither the pulse in cell 3 nor the pulse in cell 4 is a false pulse and also assumes that a second pulse was not lost in the forwarding sub-area and that a second pulse was not lost in the destination sub-area. To help justify these assumptions, protection mechanisms such as are described above, including a protection area, may be implemented.

Methods

Figure 28A:
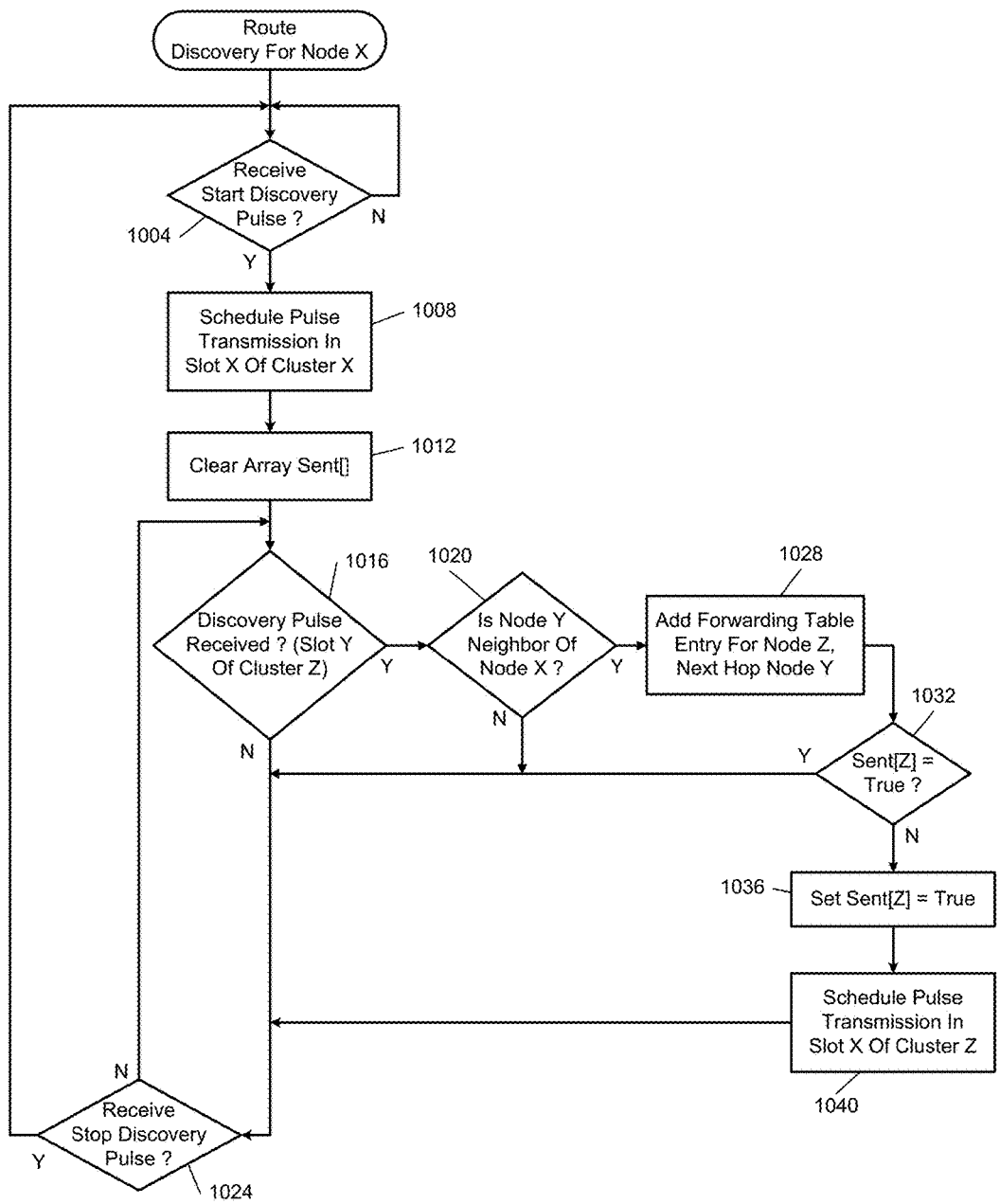
FIG. 28A is an example method of route discovery using the frame definition of FIGS. 26A-26D.

FIG. 28A is an example method for performing route discovery using the frames defined in FIGS. 26A-26D. Control begins at 1004, where if a start discovery pulse has been received, control transfers to 1008; otherwise, control remains at 1004. At 1008, control schedules a discovery pulse transmission. The current node is labeled in FIG. 28A as node X, and therefore the pulse transmission is scheduled to occur in slot X of cluster X of the discovery area of the frame.

Control continues at 1012, where an array named sent[] is cleared. The sent[] array tracks whether a discovery pulse has been sent during the present discovery phase for a given source node. Control continues at 1016, where control determines whether the discovery pulse has been received. If so, control transfers to 1020; otherwise, control transfers to 1024. At 1020, the slot during which the discovery pulse was received is stored as variable Y and the cluster in which the discovery pulse was received is stored in variable Z.

At 1020, control determines whether node Y is a neighbor of node X. If so, control transfers to 1028; otherwise, control ignores the discovery pulse and transfers to 1024. At 1028, control adds a routing table entry for node Z with the next hop being node Y. Control transfers to 1032, where if a discovery pulse has already been sent for node Z, control transfers to 1024. If, however, a discovery pulse has not yet been sent for node Z, control transfers to 1036 where the sent[ ] array is updated to indicate the transmission of the discovery pulse.

Control continues at 1040, where a pulse is scheduled for transmission in slot X of cluster Z. Control then continues at 1024. At 1024, if a stop discovery pulse has been received, control transfers to 1004; otherwise, control returns to 1016.

Figure 28B:
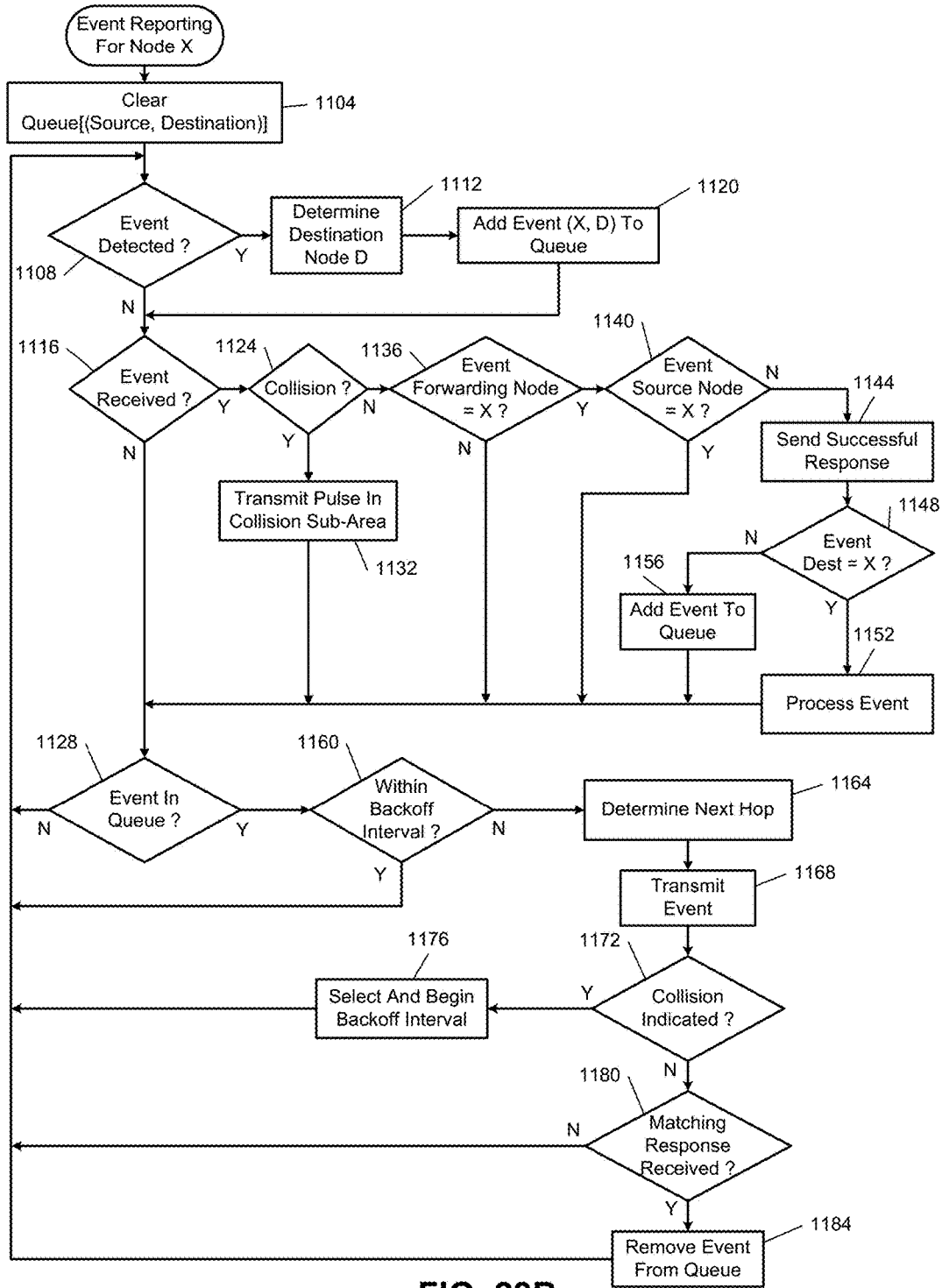
FIG. 28B is an example method of pulse generation and forwarding using the frame definition of FIGS. 26A-26D.

FIG. 28B is an example method of event reporting for a node (labeled node X) using the frames defined in FIGS. 26A-26D. Control begins at 1104, where a queue is cleared. Each element of the queue is a tuple of source and destination. The source is the original source of the event that resulted in a pulse being transmitted while the destination is the ultimate destination to which the event is being reported.

Control continues at 1108, where if an event is detected by node X, control transfers to 1112; otherwise, control transfers to 1116. At 1112, control determines a destination node (stored in variable D) to which to report the event. For example only, an event can be reported to the sink, which by convention in this example is a value of zero. Control continues at 1120, where an event is added to the queue with a source of X and a destination of D. Control then continues at 1116.

At 1116, control determines whether an event has been received. If so, control transfers to 1124; otherwise, control continues at 1128. At 1124, control determines whether a collision has occurred while the event was being received. If so, control transfers to 1132, where control transmits a pulse in the collision sub-area of the event reporting area of the frame. Control then continues at 1128. If no collision occurred, control transfers to 1136.

If the forwarding node specified in the received event is equal to node X, control continues at 1140; otherwise, control discards the event and continues at 1128. At 1140, control determines whether the source node of the received event is X. If so, that event originated at the present node and some form of loop has occurred. Therefore, if the source of the event is equal to X, control discards the event and transfers to 1128; otherwise, control continues at 1144.

At 1144, control transmits an indication of a successful response, and continues at 1148. At 1148, control determines whether the destination of the event is node X. If so, the event has reached its ultimate destination, and control continues at 1152; otherwise, control transfers to 1156. At 1152, the event is processed, which may include operating an actuator. Control then continues at 1128. At 1156, the event has not yet reached its final destination, and therefore the event is added to the queue. Control then continues at 1128.

At 1128, control determines whether there is an event in the queue. If so, control transfers to 1160; otherwise, control returns to 1108. At 1160, control determines whether a back-off interval is ongoing. If so, control is waiting to transmit due to a previous collision, and control therefore returns to 1108; otherwise, control transfers to 1164. At 1164, control determines a next hop for the next event in the queue, and at 1168, control transmits the event with the next hop specified in the forwarding sub-area.

Control continues at 1172, where if a collision indication has been received, control transfers to 1176; otherwise, control transfers to 1180. At 1180, control determines whether a response that matches the transmitted event has been received. If so, control transfers to 1184 and removes the event from the queue. Control then continues at 1108. If a matching response was not received, the event remains in the queue and control returns to 1108.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:
1. A sensor network comprising:
   a controller coupled to a substrate and configured to generate and transmit a periodic ultrasonic pulse on the substrate; and a plurality of sensor nodes, wherein each of the plurality of sensor nodes is coupled to the substrate and wherein a first sensor node of the plurality of sensor nodes is configured to:
receive the periodic ultrasonic pulse from the controller via the substrate,
synchronize an internal clock of the first sensor node to the controller based on the received periodic ultrasonic pulse,
selectively detect an event in a region surrounding the first sensor node, and
in response to detecting the event:
generate a first ultrasonic pulse synchronized to the internal clock of the first sensor node, and
transmit the first ultrasonic pulse toward the controller on the substrate.

2. The sensor network of claim 1 wherein:
the periodic ultrasonic pulse has a first transmission range,
the first ultrasonic pulse has a second transmission range, and
the first transmission range is greater than the second transmission range.

3. The sensor network of claim 2 wherein:
the controller is configured to transmit the periodic ultrasonic pulse using a first voltage,
the first sensor node is configured to transmit the first ultrasonic pulse using a second voltage, and
the first voltage is greater than the second voltage.

4. The sensor network of claim 3 wherein the first voltage is approximately double the second voltage.

5. The sensor network of claim 1 wherein a second sensor node of the plurality of sensor nodes is configured to:
receive the first ultrasonic pulse via the substrate, and
in response to receiving the first ultrasonic pulse, transmit a second ultrasonic pulse toward the controller on the substrate.

6. The sensor network of claim 1 wherein the first sensor node is configured to:
determine an arrival time of a first mode of the periodic ultrasonic pulse at the first sensor node,
determine an arrival time of a second mode of the periodic ultrasonic pulse at the first sensor node, and
estimate a propagation delay of the periodic ultrasonic pulse from the controller to the first sensor node based on the arrival time of the first mode and the arrival time of the second mode.

7. The sensor network of claim 6 wherein the first sensor node is configured to adjust synchronization of the internal clock of the first sensor node based on the propagation delay.

8. The sensor network of claim 6 wherein:
the first mode is a symmetric mode, and
the second mode is an asymmetric mode.

9. The sensor network of claim 1 wherein:
the sensor network is spatially divided into a plurality of cells, and
each sensor node of the plurality of sensor nodes is configured to be assigned to one of the plurality of cells.

10. The sensor network of claim 9 wherein each sensor node of the plurality of sensor nodes is assigned to one of the plurality of cells during a pre-programmed setup phase of the sensor network.

11. The sensor network of claim 1 further comprising an actuator node including a physical actuator.

12. The sensor network of claim 11 further comprising a plurality of actuator nodes including the actuator node.

13. The sensor network of claim 11 wherein the physical actuator is configured to operate in response to a command from the controller.

14. The sensor network of claim 11 wherein the physical actuator is configured to operate in response to data received from one or more of the plurality of sensor nodes.

15. The sensor network of claim 14 wherein the actuator node is configured to receive the data directly from the one or more of the plurality of sensor nodes, bypassing the controller.

16. The sensor network of claim 1 wherein the first sensor node includes an ultrasonic transducer coupled to the substrate.

17. The sensor network of claim 16 wherein the ultrasonic transducer includes a piezoelectric element.

18. The sensor network of claim 16 wherein:
the ultrasonic transducer is located between a first side of the substrate and a first magnet, and
a second magnet is located on an opposite side of the substrate from the ultrasonic transducer.

19. The sensor network of claim 18 wherein the ultrasonic transducer is secured to the first magnet with an epoxy.

* * * * *